US012066178B2

(12) United States Patent
Dir

(10) Patent No.: US 12,066,178 B2
(45) **Date of Patent: *Aug. 20, 2024**

(54) SYSTEM AND METHOD FOR PORTABLE, SAFETY LIGHTING

(71) Applicant: ARCHANGEL DEVICE LLC, Waukesha, WI (US)

(72) Inventor: Ronald R. Dir, Sturtevant, WI (US)

(73) Assignee: ARCHANGEL DEVICE LLC, Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,451

(22) Filed: Jun. 13, 2023

(65) Prior Publication Data

US 2023/0324038 A1 Oct. 12, 2023

Related U.S. Application Data

(63) Continuation of application No. 17/839,150, filed on Jun. 13, 2022, now Pat. No. 11,739,928, which is a (Continued)

(51) Int. Cl.
*F21K 9/66* (2016.01)
*F21L 4/02* (2006.01)
(Continued)

(52) U.S. Cl.
CPC ............ *F21V 33/0008* (2013.01); *F21K 9/66* (2016.08); *F21L 4/025* (2013.01); *F21L 4/027* (2013.01);
(Continued)

(58) Field of Classification Search
CPC ........ F21V 33/0008; F21V 21/08; F21V 7/05; F21K 9/66; F21K 9/62; F21K 9/68; F21K 9/69; F21L 4/02; F21L 4/027
See application file for complete search history.

(56) References Cited

U.S. PATENT DOCUMENTS 4,096,555 A * 6/1978 Lasker ...................... F21V 7/04 362/296.07
4,870,543 A 9/1989 Born et al.
(Continued)

FOREIGN PATENT DOCUMENTS

CN 102102847 A 6/2011
CN 209294854 U 8/2019
(Continued)

OTHER PUBLICATIONS

International Search Report and Written Opinion for International Application No. PCT/US2018/046185 dated Nov. 5, 2018 (7 pages).

*Primary Examiner* — William N Harris
(74) *Attorney, Agent, or Firm* — QUARLES & BRADY LLP

(57) ABSTRACT

A light system is provided. The light system includes a top housing, a bottom housing, and a side surface extending between the top housing and the bottom housing. An angled reflective surface is arranged between the top housing and the bottom housing and a lighting element is arranged between the top housing and the angled reflective surface. The lighting element is configured to direct light toward the bottom housing to reflect off of the angled reflective surface and out of the side surface.

20 Claims, 40 Drawing Sheets

Related U.S. Application Data continuation-in-part of application No. 17/192,131, filed on Mar. 4, 2021, now Pat. No. 11,397,002, which is a continuation of application No. 16/637,901, filed as application No. PCT/US2018/046185 on Aug. 10, 2018, now Pat. No. 10,976,046.

(60) Provisional application No. 62/543,533, filed on Aug. 10, 2017.

(51) Int. Cl.

| | |
|---|---|
| ***F21V 7/05*** | (2006.01) |
| ***F21V 21/08*** | (2006.01) |
| ***F21V 23/00*** | (2015.01) |
| ***F21V 33/00*** | (2006.01) |
| *F21W 111/00* | (2018.01) |
| *F21W 111/10* | (2006.01) |
| *F21W 121/06* | (2006.01) |
| *F21Y 113/20* | (2016.01) |
| *F21Y 115/10* | (2016.01) |

(52) U.S. Cl.

CPC ................ *F21V 7/05* (2013.01); *F21V 21/08* (2013.01); *F21V 23/005* (2013.01); *F21W 2111/00* (2013.01); *F21W 2111/10* (2013.01); *F21W 2121/06* (2013.01); *F21Y 2113/20* (2016.08); *F21Y 2115/10* (2016.08)

(56) References Cited

U.S. PATENT DOCUMENTS

| | | | | |
|---|---|---|---|---|
| 5,931,569 | A * | 8/1999 | Anderson | F21V 7/09 362/346 |
| 7,121,679 | B2 | 10/2006 | Fujimoto | |
| 7,293,903 | B2 | 11/2007 | Lo | |
| 7,566,157 | B2 | 7/2009 | Lo | |
| 7,771,076 | B1 | 8/2010 | Mattheis | |
| 8,283,844 | B2 | 10/2012 | Cho et al. | |
| 8,287,147 | B2 | 10/2012 | Tian et al. | |
| 8,469,563 | B2 | 6/2013 | Hwang et al. | |
| 8,917,187 | B2 | 12/2014 | Matte | |
| 9,366,419 | B2 | 6/2016 | Osborn | |
| 9,383,066 | B2 * | 7/2016 | Kwak | F21V 7/041 |
| 9,478,108 | B2 | 10/2016 | Matte et al. | |
| 9,835,319 | B2 | 12/2017 | Selevan et al. | |
| 10,190,746 | B1 | 1/2019 | Mao et al. | |
| 10,274,190 | B2 | 4/2019 | Matte et al. | |
| 10,344,924 | B1 | 7/2019 | Ganahl | |
| 10,443,828 | B2 | 10/2019 | Selevan et al. | |
| 10,677,450 | B2 | 6/2020 | Matte et al. | |
| 11,313,546 | B2 | 4/2022 | Selevan et al. | |
| 2007/0159819 | A1 | 10/2007 | Bayat et al. | |
| 2010/0117852 | A1 | 5/2010 | Matte | |
| 2010/0123397 | A1 | 5/2010 | Tian et al. | |
| 2014/0126187 | A1 | 5/2014 | Bennett et al. | |
| 2015/0292713 | A1 | 10/2015 | Branson et al. | |
| 2015/0338057 | A1 | 11/2015 | Kim et al. | |
| 2015/0369454 | A1 * | 12/2015 | Lee | G02F 1/133606 362/97.1 |
| 2019/0287383 | A1 | 9/2019 | Quick | |
| 2022/0325879 | A1 | 10/2022 | Selevan et al. | |

FOREIGN PATENT DOCUMENTS

| | | | |
|---|---|---|---|
| DE | 20 2006 019 347 | U1 | 5/2008 |
| EP | 2085680 | A1 | 8/2009 |
| EP | 2202445 | A1 | 6/2010 |
| EP | 3196536 | A1 | 7/2017 |
| EP | 3779905 | A1 | 2/2021 |
| JP | H0555402 | U | 7/1993 |
| JP | 2000149632 | A | 5/2000 |
| KR | 20160121241 | A | 10/2016 |
| KR | 200489720 | Y1 | 10/2019 |
| KR | 102450723 | B1 | 10/2022 |

* cited by examiner

SYSTEM AND METHOD FOR PORTABLE, SAFETY LIGHTING

CROSS-REFERENCE TO RELATED APPLICATIONS

This application is a continuation of U.S. application Ser. No. 17/839,150, filed on Jun. 13, 2022, which is a continuation-in-part of U.S. application Ser. No. 17/192,131, filed on Mar. 4, 2021 and issued as U.S. Pat. No. 11,397,002, which is a continuation of U.S. application Ser. No. 16/637,901, filed on Feb. 10, 2020 and issued as U.S. Pat. No. 10,976,046, which is a national stage entry of PCT/US2018/046185, filed on Aug. 10, 2018, which claims priority from U.S. Provisional App. No. 62/543,533, filed on Aug. 10, 2017. All of these applications are incorporated by reference herein in their entireties.

BACKGROUND

The present disclosure relates to a safety light.

Individuals are frequently in situations in which a light may facilitate the individual's safety. For example, safety workers (e.g., law enforcement officers, firefighters, medical personnel, military personnel, and security personnel) walking on the side of a road may carry a light to warn oncoming traffic of their presence. Workers in other industries, such as construction, transportation, power, airports, crossing guards, and towing are also known to carry and wear lights and/or reflective gear to make themselves more visible in the dark. Additionally, individuals engaged in outdoor activities, such as hunting, fishing, boating, camping, rock climbing, and hiking are known to carry and wear lights and/or reflective gear to make themselves more visible.

However, the need to carry a light, such as a flashlight or a lantern, is a hindrance because it requires use of an individual's hand. Conventional wearable lights, such as head lamps, free up the individual's hand, but are limited in the direction it can project light. Namely, head lamps only project light in front of the user. However, a need exists for a light that can project light in multiple directions at one time.

Conventional wearable lights are also bulky due to replaceable batteries and a light source directed out towards the front lens of the wearable light. Bulky lights tend to cause discomfort for a user because of their weight and high likelihood of becoming displaced on a user.

The art recognizes a need for a multi-directional safety light that is portable and small in size, and has a low weight.

The art further recognizes the need for a multi-directional safety light that is wearable and small in size, and has a low weight.

SUMMARY

The present disclosure provides a light system (e.g., a safety light) that is configured to couple to a support structure. The light system can include a top housing and a bottom housing, with a lens and a reflective surface arranged therebetween (e.g., in a sandwiched configuration). A lighting element can be secured to a circuit board that can be secured to the top housing so that the lighting element emits light to reflect of the reflective surface and out of lens (e.g., out of the sides of the light system).

In accordance with one aspect of the present disclosure, a light system is provided. The light system can include a top housing, a bottom housing, and a side surface extending between the top housing and the bottom housing. An angled reflective surface can be arranged between the top housing and the bottom housing, and a lighting element arranged between the top housing and the angled reflective surface. The lighting element can be configured to direct light toward the bottom housing to reflect off of the angled reflective surface and out of the side surface.

In some non-limiting examples, the light system can further include a lens arranged between the top housing and the bottom housing, and defining the side surface. The side surface can be one of a plurality of side surfaces defined by the lens, which can form a perimeter of the lens. In some cases, the angled reflective surface can be integrally formed with the lens.

In some non-limiting examples, the lighting element can be secured to a printed circuit board assembly, which can be configured to couple to the top housing. The printed circuit board assembly can include an opening configured to receive a threaded connector of the top housing. A fastener can be configured to extend through a bottom opening formed in the bottom housing and through the opening in the printed circuit board assembly to couple with the threaded connector of the top housing.

In some cases, the printed circuit board assembly can include a control button configured to activate the lighting element and the top housing can define an opening configured to receive the control button. The control button can include a button pad configured to be received by the opening in the top housing. The button pad can be a gasket configured to form a seal with the top housing.

In some non-limiting examples, the bottom housing includes one or more attachments configured to couple to a support structure.

In accordance with another aspect of the present disclosure, a light system is provided. The light system can include a top housing, a bottom housing, and a lens arranged between the top housing and the bottom housing. The lens can define a perimeter that includes a plurality of side surfaces extending between the top housing and the bottom housing. A reflective surface can be arranged between the top housing and the bottom housing, and a lighting element can be arranged between the top housing and the reflective surface. The lighting element can be configured to direct light toward the bottom housing to reflect off of the reflective surface and out of at least one of the plurality of side surfaces.

In some non-limiting examples, the reflective surface can be a planar reflective surface that is angled relative to a bottom surface of the lens at an angle that is between 110 degrees and 150 degrees, and more specifically, 135 degrees. The reflective surface can be one of a plurality of reflective surfaces. Each of the plurality of reflective surfaces can be aligned with a corresponding one of the plurality of side surfaces.

In some non-limiting examples, the light system can further include a rechargeable power source. The bottom housing can define a recharging port opening that can be configured to receive a recharging port for recharging the rechargeable power source.

In accordance with yet another aspect of the present disclosure, a light system is provided. The light system can include a top housing, a bottom housing, and a lens arranged between the top housing and the bottom housing. The lens can define a side surface between the top housing and the bottom housing. A printed circuit board assembly can be arranged between the top housing and the lens, and can include a first opening configured to receive the connector.

A lighting element can be coupled to the printed circuit board assembly and can be configured to direct light out of the side surface.

In some non-limiting examples, the connector can be configured to receive a fastener to secure the lens between the top housing and the bottom housing. The fastener can extend though a second opening formed in the bottom housing to engage with the connector. In some cases, a magnet can be coupled to the bottom housing.

In some non-limiting examples, a reflective surface can be arranged between the top housing and the bottom housing. The lighting element can be arranged to direct light to reflect off of the reflective surface and out of the side surface.

DEFINITIONS

Figure 1:
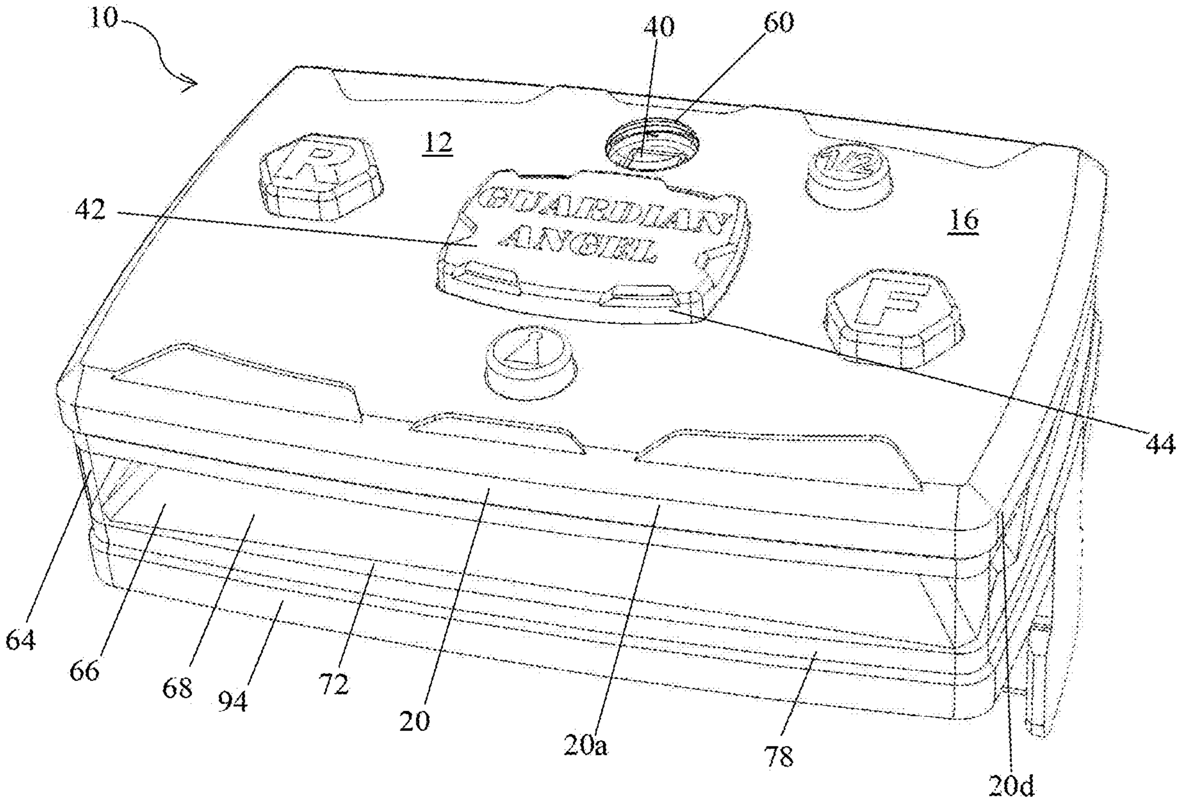
FIG. 1 is a perspective view of a safety light in accordance with an embodiment of the present disclosure.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually, as well as in any combination. Use of the singular includes use of the plural and vice versa.

Any reference to the Periodic Table of Elements is that as published by CRC Press, Inc., 1990-1991. Reference to a group of elements in this table is by the new notation for numbering groups.

Unless stated to the contrary, implicit from the context, or customary in the art, all parts and percentages are based on weight and all test methods are current as of the filing date of this disclosure.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

A "polymer" is a macromolecular compound prepared by polymerizing monomers of the same or different type. "Polymer" includes homopolymers, copolymers, terpolymers, interpolymers, and so on. An "interpolymer" is a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "multi-directional safety light" is a light that is capable of projecting light in at least two, or at least three, or at least four directions. In an embodiment, the multi-directional safety light is capable of projecting light in from 2 to 3, or 4, or 6, or 7, or 8, or 9, or 10, or 14, or 16, or 18, or 20, or 22, or 24, or 26 directions. In an embodiment, the multi-directional safety light is capable of projecting light in at least four directions.

DETAILED DESCRIPTION

The present disclosure provides a safety light 10, as shown in FIG. 1. The safety light 10 includes a top housing 12 having a wall and a printed circuit board assembly coupled to the top housing 12, the printed circuit board assembly having a top surface and a bottom surface. The safety light 10 also includes a plurality of light elements coupled to the bottom surface of the printed circuit board assembly and the printed circuit board assembly is programmed to energize the plurality of light elements following depression of a first control button 42. The safety light 10 includes a lens 64 coupled to the bottom surface of the printed circuit board assembly and the plurality of light elements, the lens 64 having a first angled reflective surface 66 and a plurality of side surfaces 68. The safety light 10 also includes a bottom housing 94 coupled to the lens 64. Accordingly, the lens 64 is arranged between top housing 12 and the bottom housing 94 so that the side surfaces 68 extend between the top housing 12 and the bottom housing 94. Together, the top housing 12, the bottom housing 94 and the lens 64 form a main housing of the safety light 10. The plurality of lighting elements emit light toward the bottom housing 94 and the light is transmitted out of the side surfaces 68 by the lens 64.

A. Top Housing

The safety light 10 includes a top housing 12, as shown in FIGS. 1-9.

Figure 2:
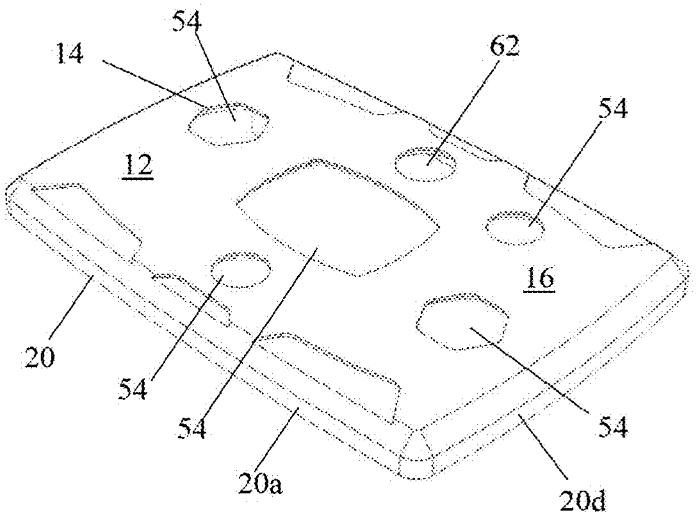
FIG. 2 is a perspective view of a top housing in accordance with an embodiment of the present disclosure.

The top housing 12 includes a wall 14, as shown in FIG. 2.

The top housing 12 is formed from one or more rigid materials. Nonlimiting examples of suitable rigid materials include high impact polymers, thermoplastic polymers, thermoset polymers, composites, metals, glass, ceramics, cellulose, combinations thereof, and/or the like. A "thermoplastic" polymer can be repeatedly softened and made flowable when heated and returned to a hard state when cooled to room temperature. In addition, thermoplastics can be molded or extruded into articles of any predetermined shape when heated to the softened state. A "thermoset" polymer, once in a hard state, is irreversibly in the hard state.

Figure 8:
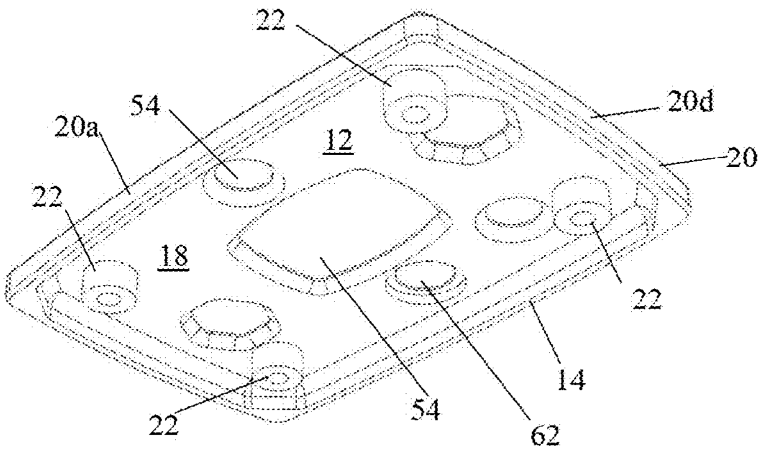
FIG. 8 is a bottom perspective view of the top housing.

In an embodiment, the top housing 12 has two opposing surfaces, including a top surface 16 and a bottom surface 18, as shown in FIGS. 2 and 8.

In an embodiment, the top housing 12 includes a plurality of side surfaces 20. In an embodiment, the side surfaces 20 include a front surface 20*a*, a rear surface 20*b*, a left surface 20*c*, and a right surface 20*d*, as shown in FIGS. 4, 5, 6 and 7.

Figure 3:
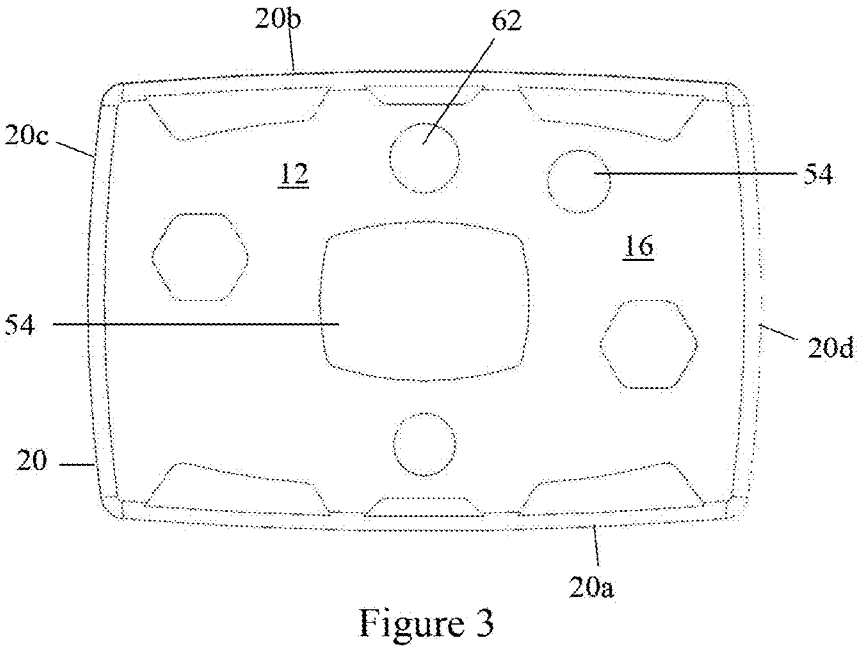
FIG. 3 is a top plan view of the top housing.
Figure 4:
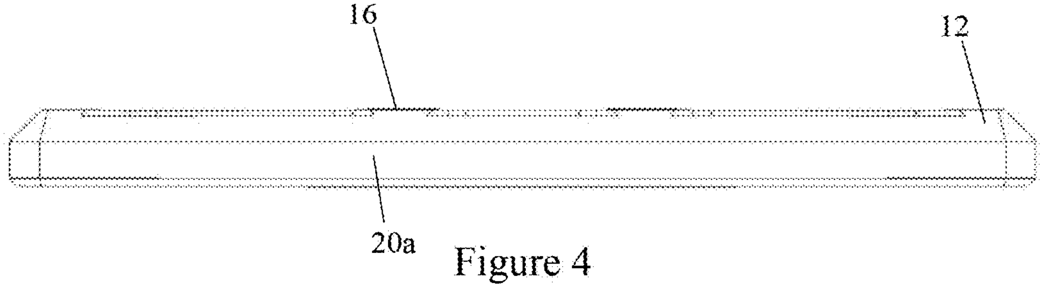
FIG. 4 is a front elevation view of the top housing.
Figure 5:
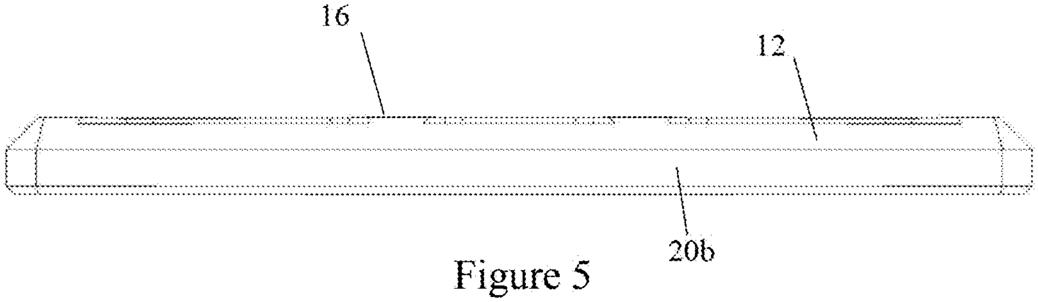
FIG. 5 is a rear elevation view of the top housing.
Figure 6:
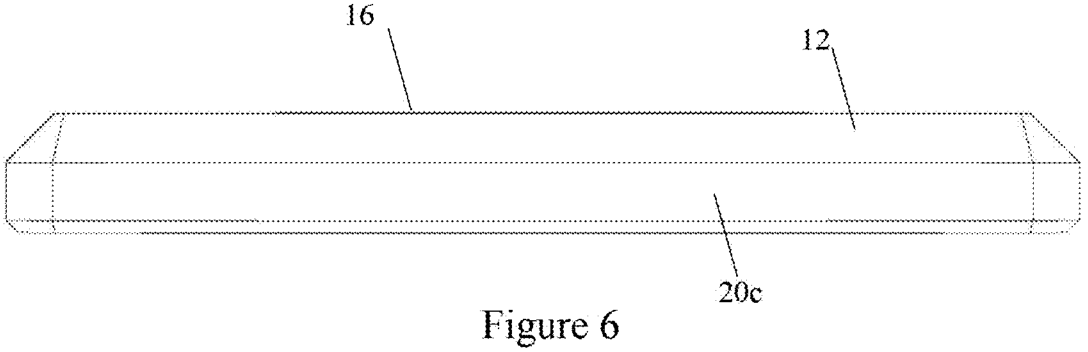
FIG. 6 is a left elevation view of the top housing.
Figure 7:
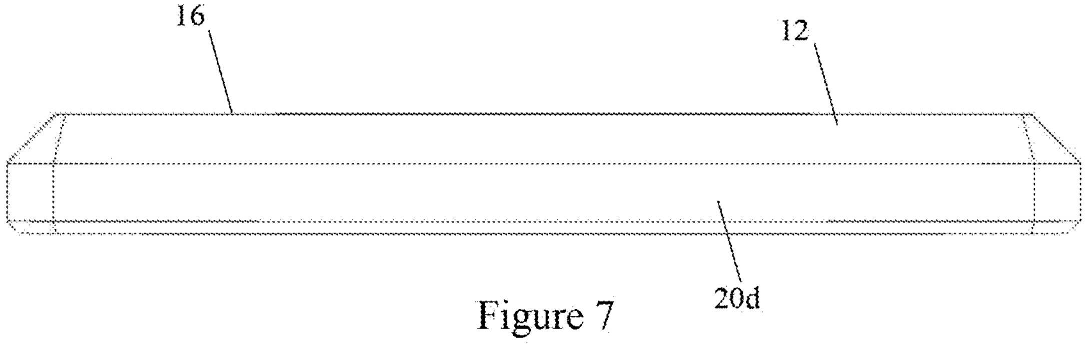
FIG. 7 is a right elevation view of the top housing.

The top housing 12 has a cross-sectional shape. Nonlimiting examples of suitable cross-sectional shapes include polygon, circle, and oval. In an embodiment, the top housing has a polygon cross-sectional shape. A "polygon" is a closed-plane figure bounded by at least three sides. The polygon can be a regular polygon, or an irregular polygon having three, four, five, six, seven, eight, nine, ten or more sides. Nonlimiting examples of suitable polygonal shapes include triangle, square, rectangle, diamond, trapezoid, parallelogram, hexagon and octagon. FIG. 3 depicts a top housing 12 with a rectangle cross-sectional shape.

Figure 9:
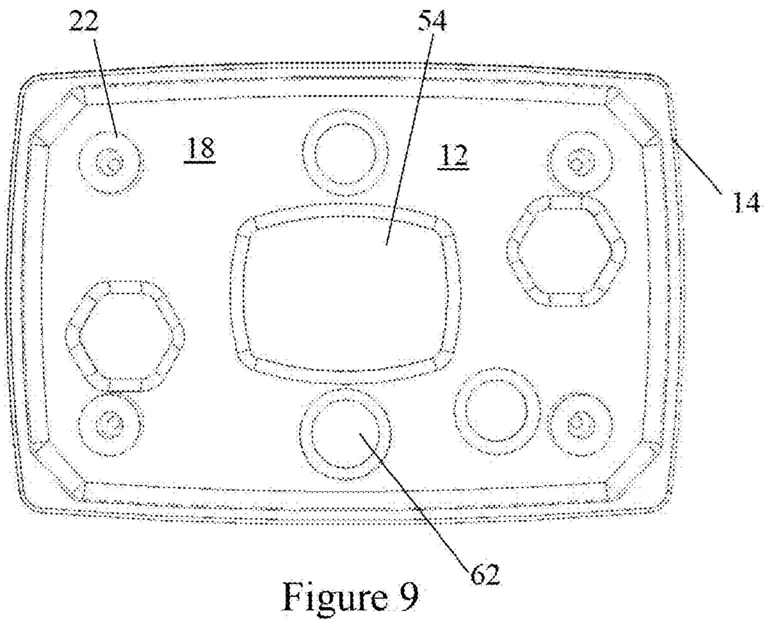
FIG. 9 is a bottom plan view of the top housing.

In an embodiment, a plurality of threaded connectors 22 are coupled to the bottom surface 18 of the top housing 12, as shown in FIGS. 8 and 9. A "threaded connector" is a protrusion sized to receive a threaded fastener 114, such as a screw. The top housing 12 and the threaded connectors 22 may have an integral design or a composite design. A top housing 12 with threaded connectors 22 having an "integral design" is formed from one piece of rigid material, such as a molded piece. A top housing 12 with threaded connectors 22 having a "composite design" is formed from more than one distinct piece (or part), which upon assembly are combined. In an embodiment, the safety light 10 includes from 2, or 3 to 4, or 5, or 6 threaded connectors 22 coupled to the bottom surface 18 of the top housing 12. In another embodiment, the safety light 10 includes four threaded connectors 22 coupled to the bottom surface 18 of the top housing 12

The top housing 12 may comprise two or more embodiments disclosed herein.

B. Printed Circuit Board Assembly

The safety light 10 includes a printed circuit board assembly 24 coupled to the top housing 12, as shown in FIGS. 10-15B.

A "printed circuit board assembly" or "PCBA" is a component that mechanically supports and electrically connects the electronic components of the safety light. The PCBA 24 has two opposing surfaces, including a top surface 26 and a bottom surface 28, as shown in FIGS. 10 and 11.

In an embodiment, the PCBA 24 includes a plurality of side surfaces 30. In an embodiment, the side surfaces 30 include a front surface 30*a*, a rear surface 30*b*, a left surface 30*c*, and a right surface 30*d*, as shown in FIGS. 10, 11, 15A, and 15B.

Figure 10:
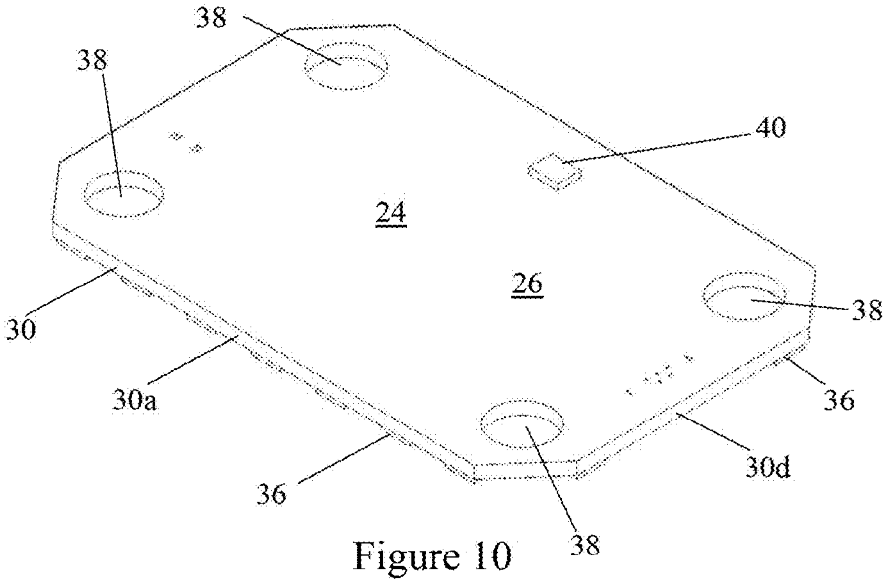
FIG. 10 is a top perspective view of a printed circuit board assembly (PCBA) in accordance with an embodiment of the present disclosure.
Figure 11:
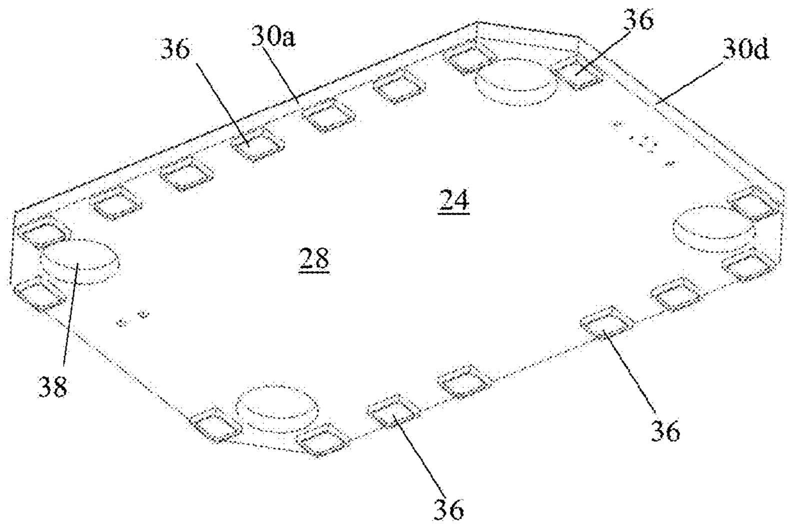
FIG. 11 is a bottom perspective view of the PCBA.

In an embodiment, the PCBA 24 includes a plurality of threaded openings 38, as shown in FIGS. 10 and 11. A "threaded opening" is a void in the PCBA sized to receive a threaded fastener 114, such as a screw. The threaded opening 38 allows the threaded fastener 114 to extend through the PCBA 24. In an embodiment, the PCBA 24 includes from 2, or 3 to 4, or 5, or 6 threaded openings 38. In an embodiment, the PCBA 24 includes four threaded openings 38.

In an embodiment, the PCBA 24 includes a rechargeable power source 32, as shown in FIGS. 12, 13, 15A and 15B. In an embodiment, the rechargeable power source 32 is a rechargeable battery. The rechargeable power source 32 is electrically connected to the PCBA 24. The rechargeable power source 32 is advantageously smaller than conventional replaceable batteries and avoids the need to disassemble the safety light 10 when the power source runs out of power.

Figure 41:
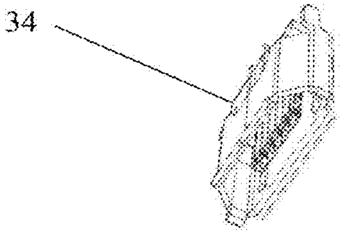
FIG. 41 is a perspective view of a recharging port in accordance with an embodiment of the present disclosure.
Figure 65:
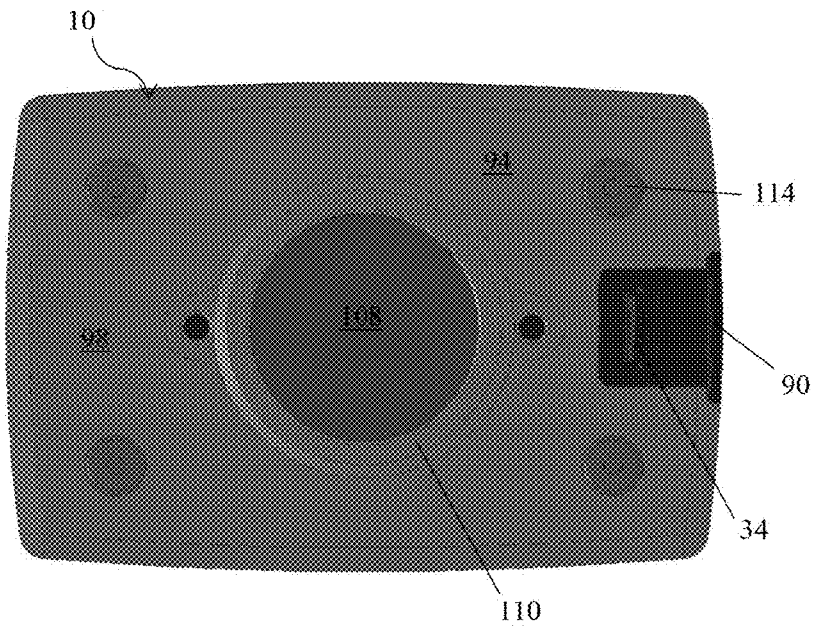
FIG. 65 is a bottom plan view of the safety light.
Figure 66:
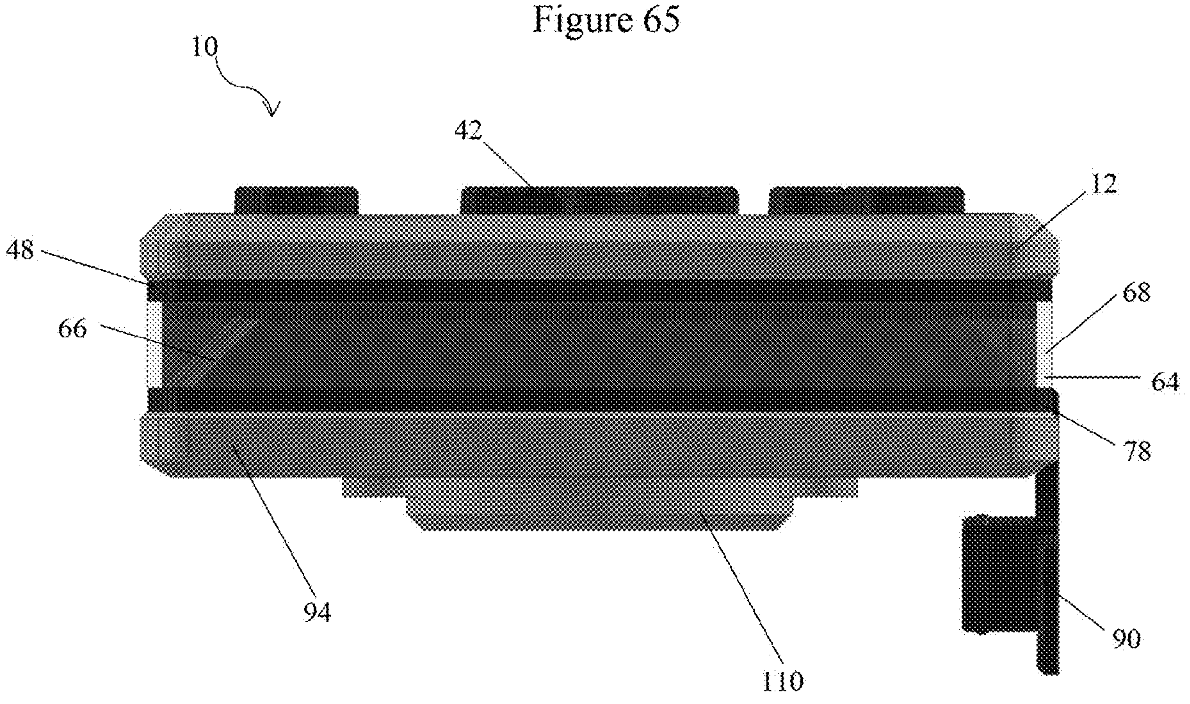
FIG. 66 is a front elevation view of the safety light.
Figure 67:
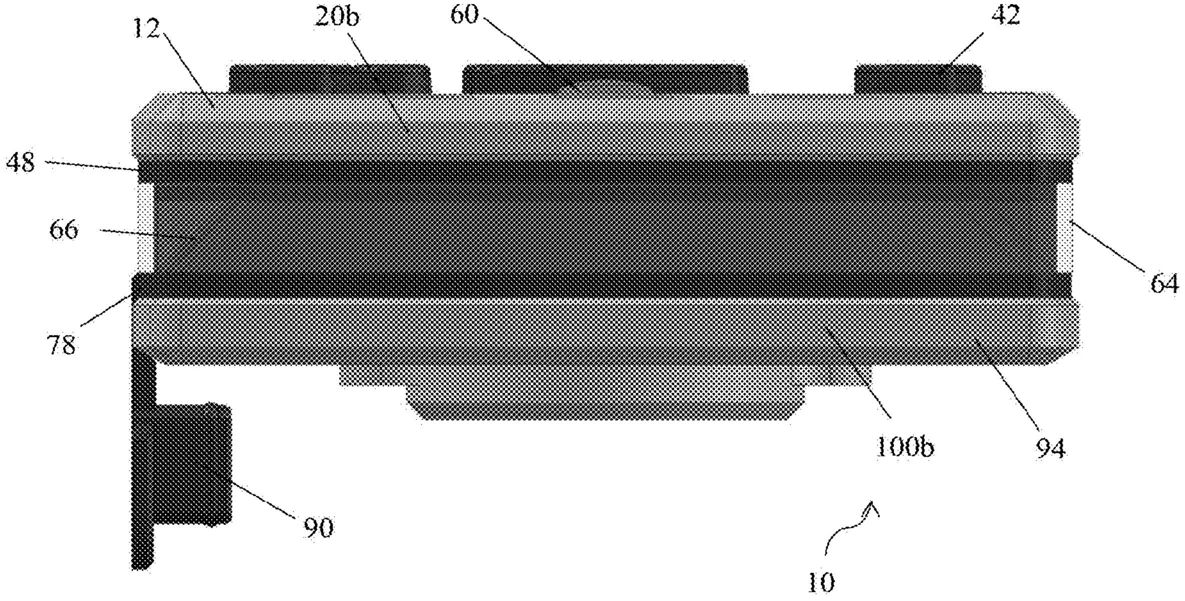
FIG. 67 is a rear elevation view of the safety light.
Figure 82:
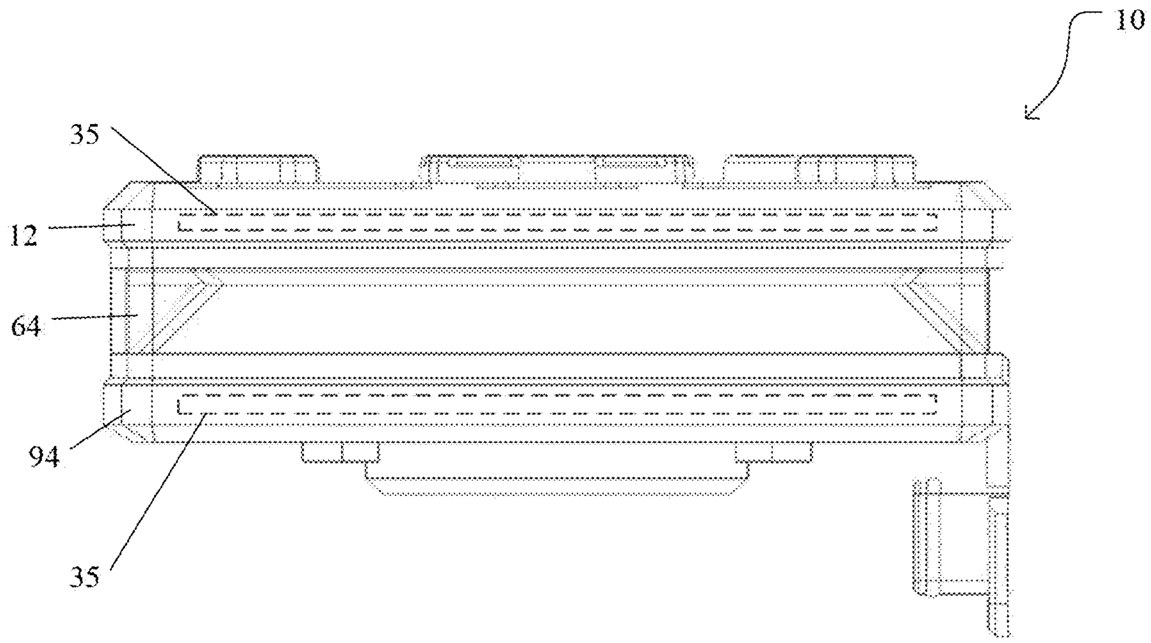
FIG. 82 is a partial schematic rear elevation view of the safety light with an inductive coupling in accordance with another embodiment of the present disclosure.

The rechargeable power source 32 may be recharged via an inductive coupling or a port, such as a recharging port 34, as shown in FIGS. 41 and 65. In an embodiment, the safety light 10 includes a recharging port 34 such that a user may recharge the rechargeable power source 32 through a power cord connected to a power supply such as a standard AC power outlet, via an adapter. In another embodiment, the rechargeable power source 32 may be recharged via a power coupling 35 (see FIG. 82) that can be configured to transfer power, communications, and or data between the safety light 10 and an external device. As one particular non-limiting example, the power source 35 can be configured as an inductive coupling (i.e., for wireless power transfer, for example to be used for wireless charging, see FIG. 82) through the wall 14 of the top housing 12 and/or the wall 104 of the bottom housing 94 to a wireless power supply connected to an AC outlet. A power coupling may be included both where a safety light includes a magnet, as describe below, and where the safety light does not include a magnet.

Figure 40:
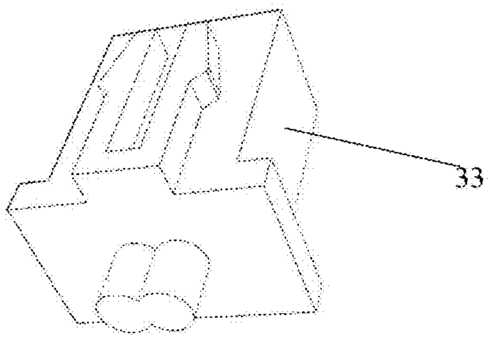
FIG. 40 is a perspective view of a rechargeable power source connector in accordance with an embodiment of the present disclosure.

In an embodiment, a rechargeable power source connector 33, as shown in FIG. 40, is positioned within, or within a portion of, the rechargeable power source 32. The rechargeable power source connector 33 may be a Universal Serial Bus (USB) or a micro USB. The rechargeable power source connector 33 may be configured to charge the rechargeable power source 32, to provide software updates to the safety light 10, to transfer data from the safety light 10 to another device (e.g., a computer), to transfer testing analytics of the safety light 10 to another device (e.g., a computer), and combinations thereof. Correspondingly, the port 34 can be configured as a communication port. The communication port 34 can be configured to allow an external device (e.g., a computer, a portable electronic device, a data storage device, etc., not shown) to communicate with the PCBA 24, e.g., to control a lighting element 36, 40 or another function of the safety light 10, or to transfer data between the PCBA 24 and the external device). Alternatively or additionally, the power coupling 35 can also be configured to communicate with the PCBA 24 to allow for wireless communication with the PCBA 24 (e.g., to wireless transmit data or other types of signals between the safety light 10 and an external device) or to control of one or functions of the safety light 10 (e.g., to control a lighting element 36, 40, or another function).

In an embodiment, the PCBA 24 is configured to provide Global Positioning System (GPS) capability to the safety light 10.

In an embodiment, the PCBA 24 is configured to generate, collect, store, and/or transfer data. Nonlimiting examples of data that the PCBA 24 may be configured to generate, collect, store, and/or transfer include safety light 10 usage data (e.g., duration of battery life; duration of time that a light, such as the plurality of light elements 36 and/or the beacon light element 40, is emitting light; location information, such as locations derived from GPS; and combinations thereof); testing analytics of the safety light 10 (e.g., detection of faulty components, detection of light outages, detection of software errors, and combinations thereof); biometric data (e.g., heartrate, temperature, facial recognition, and/or facial expression information on a user wearing the safety light 10 and/or an individual in proximity to the safety light 10); camera images; video; sound recordings; and combinations thereof.

Figure 83:
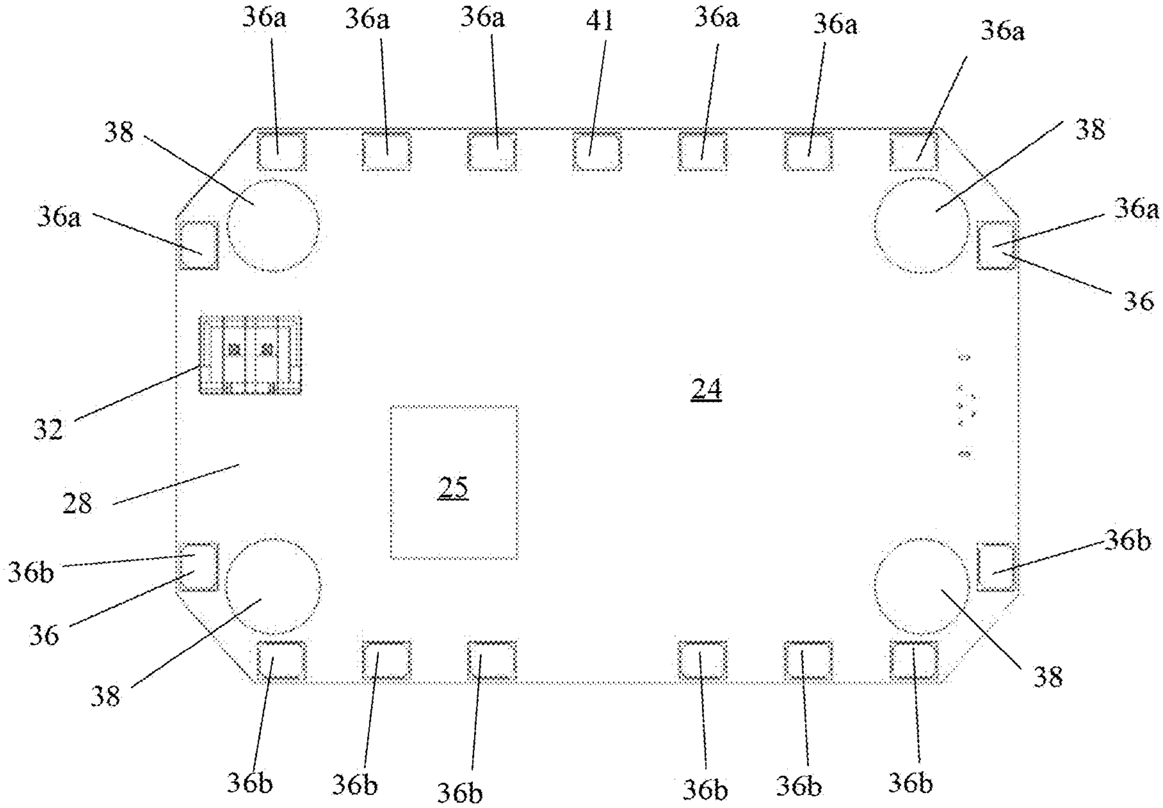
FIG. 83 is a bottom plan view of the PCBA with a communication module in accordance with another embodiment of the present disclosure.

In an embodiment, the PCBA 24 is configured to wirelessly connect, including sending and receiving wireless communications, with a wireless device, such as a cell phone, a remote (e.g., a central control system or main server), signal repeaters, or another safety light, or other external devices. In that regard, the PCBA 24 can include at least one communication module 25 (see FIG. 83) that can be configured to send and receive wireless communications via one or more wireless connections. Nonlimiting examples of suitable wireless connections include GPS, Bluetooth, radio frequency (RF), and Wireless Fidelity (WiFi).

In an embodiment, the PCBA 24 is configured to energize the plurality of light elements 36 and/or the beacon light element 40 via (e.g., in accordance with) a wireless communication from a wireless device. As one particular non-limiting example, the PCBA 24 can pair with an external device, such as a cell phone. tablet, or other mobile device, to allow a user to control the safety light 10 (e.g., to energize or deenergize one or more lighting elements 36, 40) from the external device. That is, an external device can run an application that can allow a user to interact with the device, for example, by displaying a virtual device to the user, which may mimic a control button layout, of the connected safety light 10, as described in greater detail below. Additionally, a PCBA 24 can be configure to pair with an external device to allow automatic control of the safety light 10 using one or more sensors of the external device. For example, a PCBA 24 may be configured to energize one or more lighting elements in response to a signal from an accelerometer or GPS module of the external device (e.g., a signal indicative of a braking or slowing event, or upon entering or exiting a geofenced area). Similarly, a PCBA 24 may be configured to communicate with an external device (e.g., a vehicle) to determine a proximity to the external device, and to control one or more lighting elements 36, 40 accordingly, for example, to energize a lighting element upon exiting a vehicle and to deenergize a lighting element when entering a vehicle.

In an embodiment, software, firmware, usage data, testing analytics of the safety light, biometric data, camera images, video, sound recordings, and combinations thereof may be wirelessly transferred as a wireless communication. As one particular non-limiting example, a PCBA 24 of a safety light 10 can be configured to communicate geolocation data of the safety light 10 to a central server or another external device, which can allow a user to see location data of the safety light 10, as well as any other safety lights that are in communication with the central server (e.g., each safety light in a network of safety lights). Relatedly, where a safety light 10 is in communication with a central server, a user can upload, for example, (custom) firmware or software) to the safety light 10, as a well as any other safety lights that are connected to the server, either individually or simultaneously.

The PCBA 24 may comprise two or more embodiments disclosed herein.

C. Plurality of Light Elements

The safety light 10 includes a plurality of light elements 36 coupled to the bottom surface 28 of the PCBA 24, as shown in FIGS. 11-15B.

A "light element" is a component capable of emitting a light, such as a visible light, ultraviolet (UV) light, infrared (IR) light, black light, or combinations thereof. In an embodiment, each light element is capable of emitting a visible light. Nonlimiting examples of suitable visible light include white light, red light, orange light, yellow light, green light, indigo light, blue light, violet light, and combinations thereof. Each light element may be capable of emitting the same type of light or a different type of light. For example, the safety light 10 may include a plurality of light elements 36, wherein each light element 36 is capable of emitting white, blue, and red visible light.

Nonlimiting examples of suitable light elements 36 include light emitting diodes (LEDs), fluorescent lamps, xenon lamps, incandescent lamps, halogen lamps, fiber optics, and combinations thereof. In an embodiment, each light element 36 is a LED.

Each light element 36 coupled to the bottom surface 28 of the PCBA 24 emits a light directed away from, or in opposite direction from, the bottom surface 28 of the PCBA 24. In an embodiment, each light element 36 coupled to the bottom surface 28 of the PCBA 24 emits a light directed away from, or in opposite direction from, the top housing 12. In an embodiment, each light element 36 coupled to the bottom surface 28 of the PCBA 24 emits a light at an angle of from 70°, or 75°, or 80°, or 85° to 90°, or 95°, or 100°, or 105°, or 110° relative to the bottom surface 28 of the PCBA 24. In another embodiment, each light element 36 coupled to the bottom surface 28 of the PCBA 24 emits a light at an angle of 90° relative to the bottom surface 28 of the PCBA 24.

The light elements 36 are electrically connected to the PCBA 24.

Figure 12:
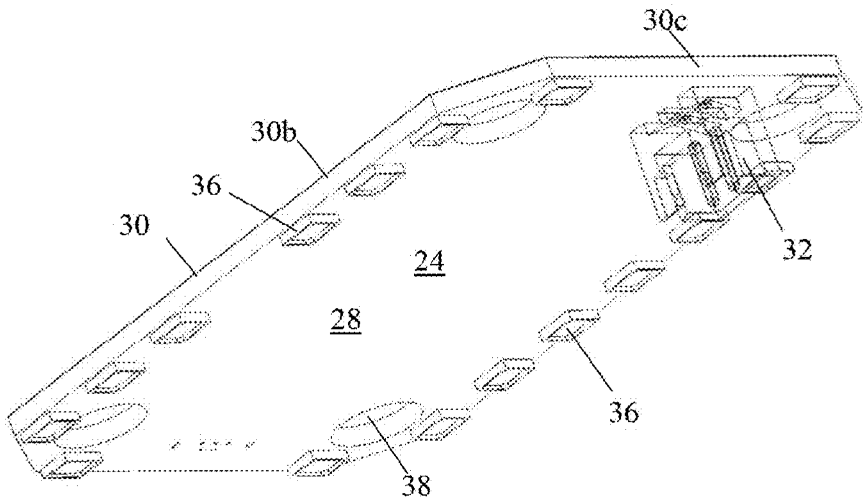
FIG. 12 is a left bottom perspective view of the PCBA and a rechargeable power source in accordance with an embodiment of the present disclosure.
Figure 13:
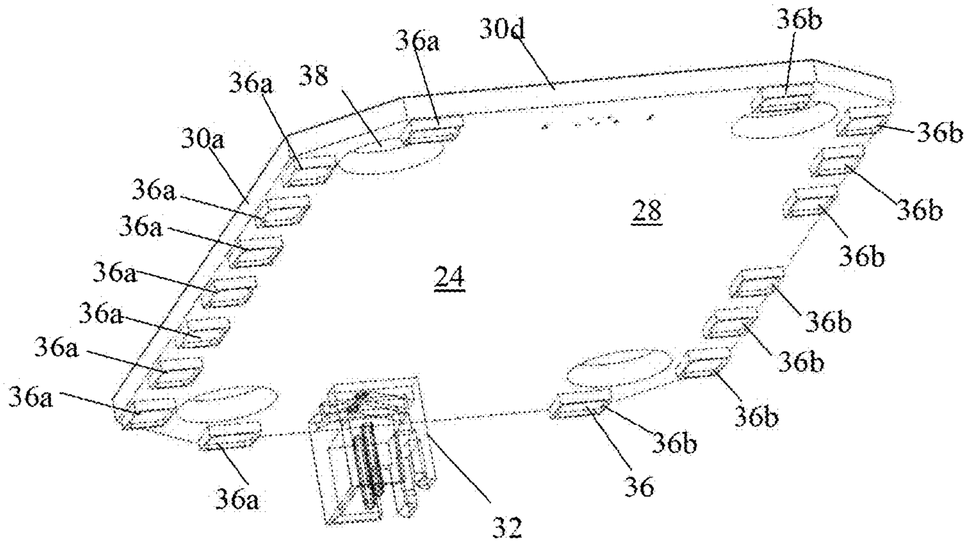
FIG. 13 is a right bottom perspective view of the PCBA and the rechargeable power source.
Figure 14:
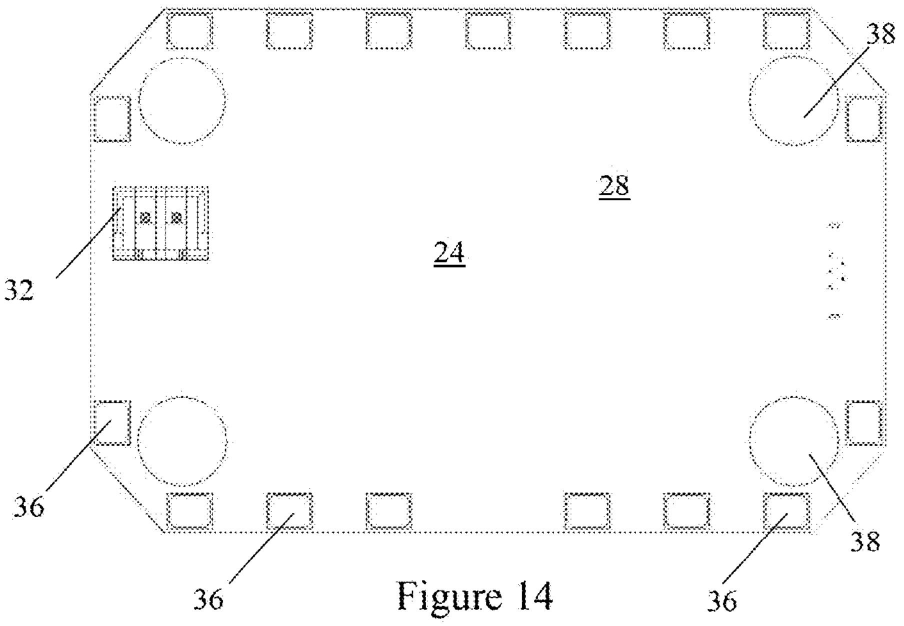
FIG. 14 is a bottom plan view of the PCBA and the rechargeable power source in accordance with an embodiment of the present disclosure.

In an embodiment, the light elements 36 are coupled to the bottom surface 28 of the PCBA 24 and are positioned adjacent to the side surfaces 30 of the PCBA 24, as shown in FIGS. 11, 12 and 13. In an embodiment, from 1, or 2 to 3, or 4, or 5, or 6, or 7, or 8, or 9, or 10 light elements 36 are positioned adjacent to the front side surface 30*a* of the PCBA 24; from 1, or 2 to 3, or 4, or 5, or 6, or 7, or 8, or 9, or 10 light elements 36 are positioned adjacent to the rear side surface 30*b* of the PCBA 24; from 1, or 2 to 3, or 4, or 5, or 6 light elements 36 are positioned adjacent to the left side surface 30*c* of the PCBA 24; and from 1, or 2 to 3, or 4, or 5, or 6 light elements 36 are positioned adjacent to the right side surface 30*d* of the PCBA 24. In another embodiment, 7 light elements 36 are positioned adjacent to the front side surface 30*a* of the PCBA 24; 6 light elements 36 are positioned adjacent to the rear side surface 30*b* of the PCBA 24; 2 light elements 36 are positioned adjacent to the left side surface 30*c* of the PCBA 24; and 2 light elements 36 are positioned adjacent to the right side surface 30*d* of the PCBA 24, as shown in FIGS. 13 and 14.

The plurality of light elements 36 may comprise two or more embodiments disclosed herein.

D. Beacon Light Element

Figure 15A:
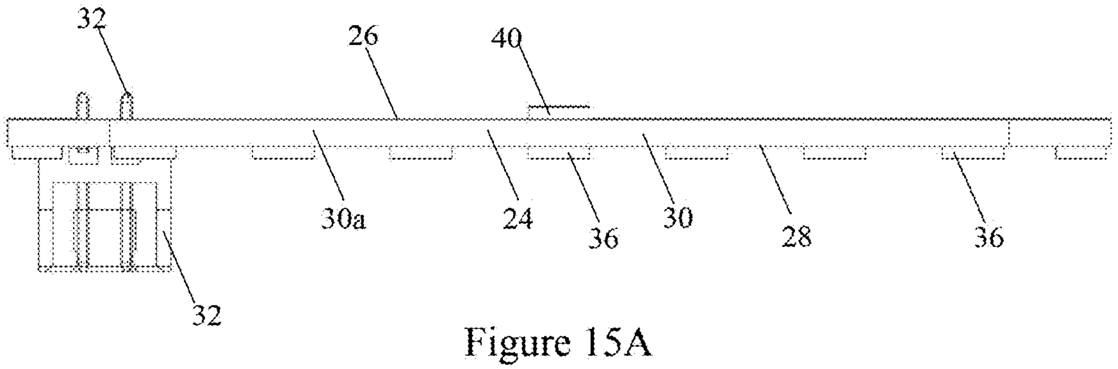
FIG. 15A is a front elevation view of the PCBA and the rechargeable power source.
Figure 15B:
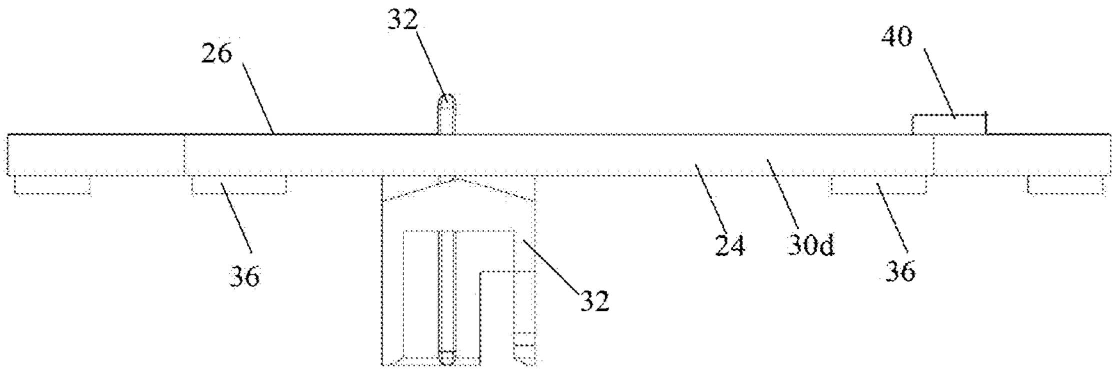
FIG. 15B is a right elevation view of the PCBA and the rechargeable power source.

In an embodiment, the safety light 10 includes a beacon light element 40 coupled to the top surface 26 of the PCBA 24, as shown in FIGS. 10, 15A, and 15B.

The beacon light element 40 can be any light element disclosed herein. In an embodiment, the beacon light element 40 is a LED.

The beacon light element 40 coupled to the top surface 26 of the PCBA 24 emits a light directed away from, or in opposite direction from, the top surface 26 of the PCBA 24. In an embodiment, the beacon light element 40 coupled to the top surface 26 of the PCBA 24 emits a light directed away from, or in opposite direction from, the bottom housing 94. In an embodiment, the beacon light element 40 coupled to the top surface 26 of the PCBA 24 emits a light at an angle of from 75°, or 80°, or 85° to 90°, or 95°, or 100°, or 105° relative to the top surface 26 of the PCBA 24. In another embodiment, the beacon light element 40 coupled to the top surface 26 of the PCBA 24 emits a light at an angle of 90° relative to the top surface 26 of the PCBA 24.

In an embodiment, the beacon light element 40 emits a light in the opposite direction from the light emitted from the plurality of light elements 36.

The beacon light element 40 is electrically connected to the PCBA 24.

In an embodiment, the safety light 10 includes from 1 to 2, or 3, or 4 beacon light elements 40. In an embodiment, the safety light 10 includes one and only one beacon light element 40.

The beacon light element 40 may comprise two or more embodiments disclosed herein.

E. Control Button

Figure 16:
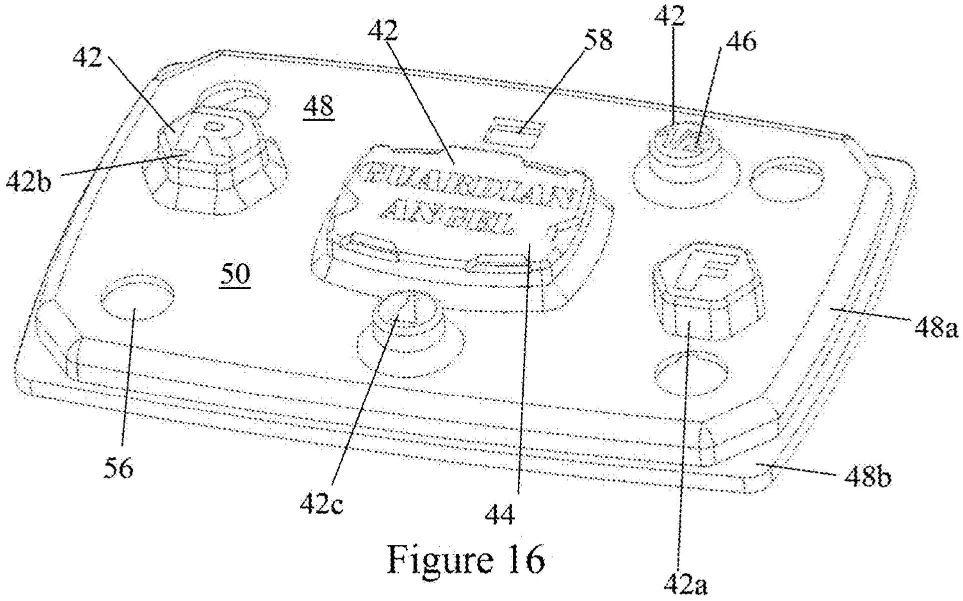
FIG. 16 is a top perspective view of a button pad in accordance with an embodiment of the present disclosure.
Figure 17:
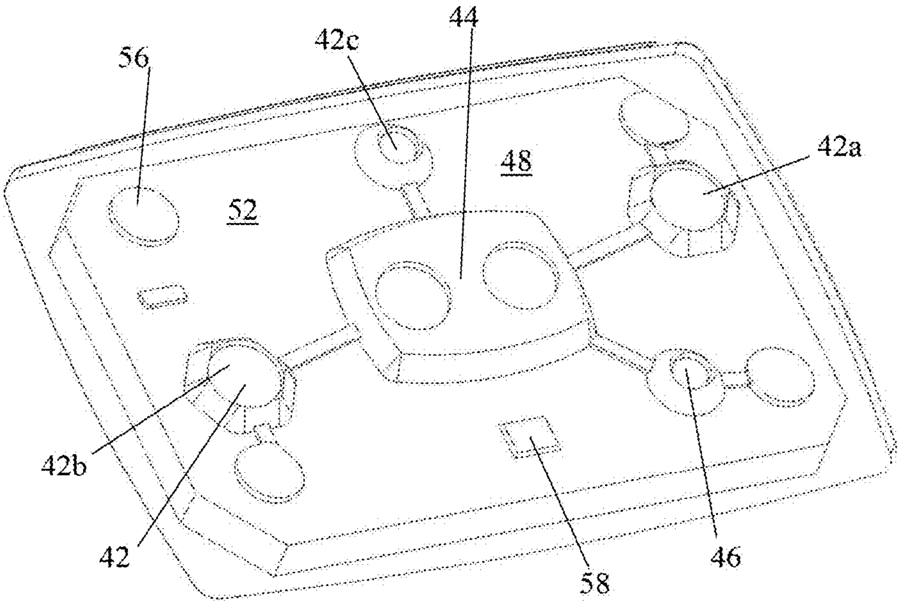
FIG. 17 is a bottom perspective view of the button pad.

The safety light 10 includes at least one control button 42, as shown in FIGS. 1, 16 and 17.

In an embodiment, the safety light 10 includes a plurality of control buttons 42. In an embodiment, the safety light 10 includes from 1, or 2 to 3, or 4, or 5, or 6 control buttons 42.

Each control button 42 is connected to the PCBA 24 via a mechanical connection, an electrical connection, or a combination thereof.

Nonlimiting examples of suitable control buttons 42 include depression buttons, depression switches, toggle switches, touch switches, wireless switches, and combinations thereof. In an embodiment, each control button 42 is a depression button.

In an embodiment, the PCBA 24 is programmed to energize the plurality of light elements 36 and/or the beacon light element 40 following depression of a control button 42. In an embodiment, the PCBA 24 is programmed to stop energy to the plurality of light elements 36 and/or the beacon light element 40 following another depression of the control button 42, such that a first depression energizes the light element (36 and/or 40) and a second depression stops energy to the light element (36 and/or 40). When energy is stopped, the light element (36 and/or 40) does not emit light, i.e., the light element is "off." When a light element (36 and/or 40) is energized, it emits a light, i.e., the element is "on."

In an embodiment, the control button 42 is a touch switch. A "touch switch" enables a user to tap the safety light 10, such as on the top housing's top surface 16, to activate or de-activate a sensor, thereby energizing or stopping energy to (respectively) the plurality of light elements 36 and/or the beacon light element 40. For example, a touch switch can be configured as a capacitive switch, a resistive switch, a piezo switch, etc.

In an embodiment, the PCBA 24 is programmed to energize the plurality of light elements 36 following depression of a first control button 42*a*. In another embodiment, the PCBA 24 is programmed to energize the beacon light element 40 following depression of a second control button 42*b*.

In an embodiment, the PCBA 24 is programmed to energize a first group of the plurality of light elements 36*a* following depression of a first control button 42*a* and a second group of the plurality of light elements 36*b* following depression of a second control button 42*b*. In an embodiment, the first group of the plurality of light elements 36*a* are those light elements 36 near the front surface 30*a* of the PCBA 24 and the second group of the plurality of light elements 36*b* are those light elements 36 near the rear surface 30*b* of the PCBA 24, as shown in FIG. 13. In another embodiment, the PCBA 24 is programmed to energize the beacon light element 40 following depression of a third control button 42*c*. Alternatively or additionally, the PCBA 24 is programmed to energize the flashlight light element 41 (see FIG. 83) following the depression of the third control button 32*c*. The flashlight light element 41 can be configured to emit a light out of the lens 64 or a separate flashlight lens (not shown). Relatedly, the lens 64 can be shaped differently around the flashlight element 41 to provide a specific light output or beam pattern. For example, the lens 64 can be configured to provide a beam of light from the flashlight light element 41, while providing a diffuse light from the first group of the plurality of light elements 36*a*.

In an embodiment, the PCBA 24 is programmed to energize the plurality of light elements 36 and/or the beacon light element 40 following depression of a control button 42 to cause the light element (36 and/or 40) to emit a certain type of light, a certain color of light, or combinations thereof.

In an embodiment, the PCBA 24 is programmed to energize the plurality of light elements 36 and/or the beacon light element 40 following depression of a control button 42 to cause the light element (36 and/or 40) to emit light in a pattern, such as in a strobe pattern, a timed flash pattern, a running pattern, an alternating color pattern, or combinations thereof.

In an embodiment, the PCBA 24 is programmed to energize the plurality of light elements 36 and the beacon light element 40 following depression of a single control button 42.

In an embodiment, the PCBA 24 includes a control button 42 that is an emergency button 44, as shown in FIG. 1. An "emergency button" is capable of energizing all light elements (36 and/or 40) following a depression and stopping all energy to all light elements (36 and/or 40) following a second depression. In an embodiment, the emergency button 44 is centrally positioned in the top housing 12, as shown in FIG. 1.

In an embodiment, the PCBA 24 includes a control button 42 that is a power-saver button 46, as shown in FIG. 16. A "power-saver button" energizes only a portion of the light elements (36 and/or 40) to energize. In an embodiment, the power-saver button energizes from 10%, or 20%, or 30%, or 40% to 50%, or 60%, or 70%, or 80% of the light elements (36 and 40) of the safety light 10.

In an embodiment, a control button 42, in conjunction with a PCBA 24, can be configured to provide a different function or control a safety light in a specific way depending on how the button 42 is pressed (e.g., depending on sequence of button presses or a duration of a button press). For example, when at least one lighting element 36, 40 is powered, a "short" press (e.g., a press duration of less than one second) of the power saver button 46 can (sequentially) energize the at least one lighting element 36, 40 from 10%, or 20%, or 30%, or 40% to 50%, or 60%, or 70%, or 80%, or 90%, or 100%. Alternatively, if no lighting elements are energized a "short" press of the power saver button 46 may do nothing, while a "long" press (e.g., a press duration of greater than or equal to one second) may cause one or more lighting elements 36, 40 to become energized, for example to flash in an "S.O.S." pattern.

Figure 84:
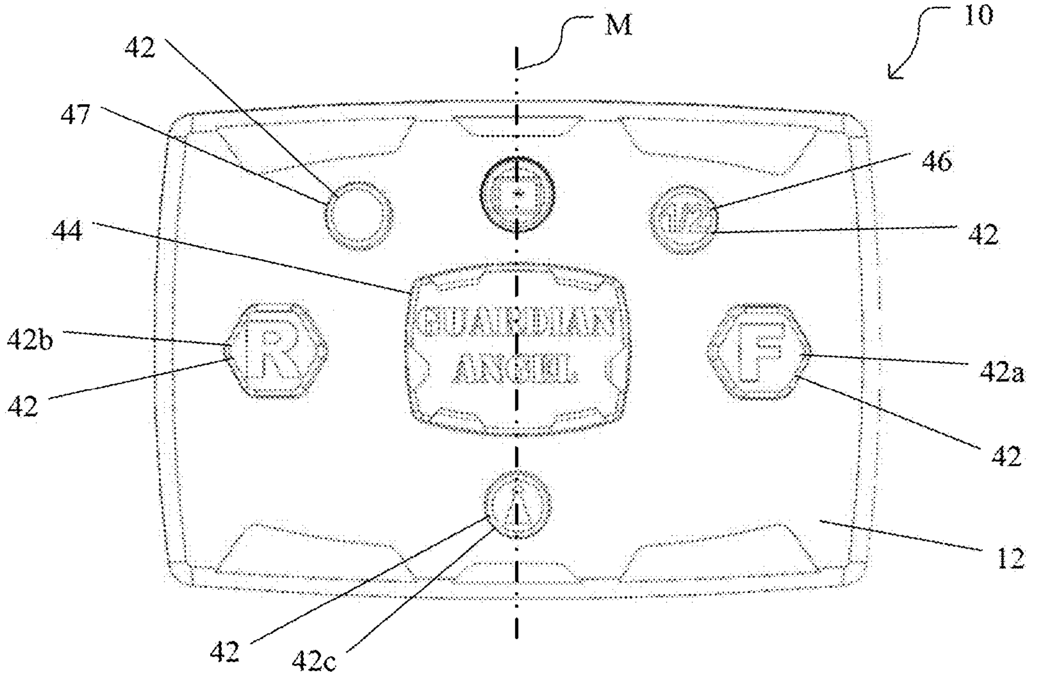
FIG. 84 is a top plan view of the safety light with a multi-function button in accordance with another embodiment of the present disclosure.

In an embodiment, the PCBA 24 may also include one or more buttons 42 that are configured to control one or more functions that may or may not be related to energizing one of the lighting elements 36, 40. For example, as shown in FIG. 84, an embodiment includes a control button 42 that is configured as a multi-function control button 47 that can be configured to carry out one or more functions of the safety light 10. As one particular nonlimiting example, a "short"

press of the button 47 can energize or deenergize the beacon light element 40, while a "long" press can control the PCBA 24 to control one or more communication modules 25 (e.g., to enter a Bluetooth pairing mode, or to send another type of wireless communication, or wirelessly transmit data).

Relatedly, in an embodiment, buttons 42 can be symmetrically arranged (e.g., mirrored about plane M, see FIG. 84) with one or more types of symmetry, or non-symmetrically arranged (see FIG. 16).

The control buttons (e.g., buttons 42, 44, 46) are formed from one or more flexible materials. A nonlimiting example of a suitable flexible material is rubber.

In an embodiment, the control buttons (42, 44, 46) are formed from a button pad 48, as shown in FIGS. 16 and 17. In an embodiment, the button pad 48 has an integral design such that the control buttons (42, 44, 46) are formed from one piece of flexible material. The button pad 48 has two opposing surfaces, including a top surface 50 and a bottom surface 52. As shown in FIG. 16, the control buttons (42, 44, 46) protrude from the top surface 50 of the button pad 48.

The button pad 48 has a cross-sectional shape. The cross-sectional shape may be any cross-sectional shape disclosed herein. The cross-sectional shape of the button pad 48 is the same cross-sectional shape as the top housing 12. FIGS. 16 and 17 depict a button pad 48 with a rectangle cross-sectional shape.

In an embodiment, the button pad 48 includes a plurality of threaded openings 56, as shown in FIGS. 16 and 17. A "threaded opening" is a void in the button pad 48 sized to receive a threaded fastener 114, such as a screw. The threaded opening 56 allows the threaded fastener 114 to extend through the button pad 48. In an embodiment, the threaded openings 56 of the button pad 48 align with the threaded openings 38 of the PCBA 24, which align with the threaded connector 22 of the top housing 12 such that a threaded fastener 114 may extend through the PCBA 24 and the button pad 48 and connect to the top housing 12. In an embodiment, the button pad 48 includes from 2, or 3 to 4, or 5, or 6 threaded openings 56. In an embodiment, the button pad 48 includes four threaded openings 56.

In an embodiment, the button pad 48 has a top portion **48*a* and a bottom portion 48*b*, as shown in FIG. 16. In an embodiment, the top housing 12 is sized to receive the top portion 48*a* of the button pad 48**.

Figure 59:
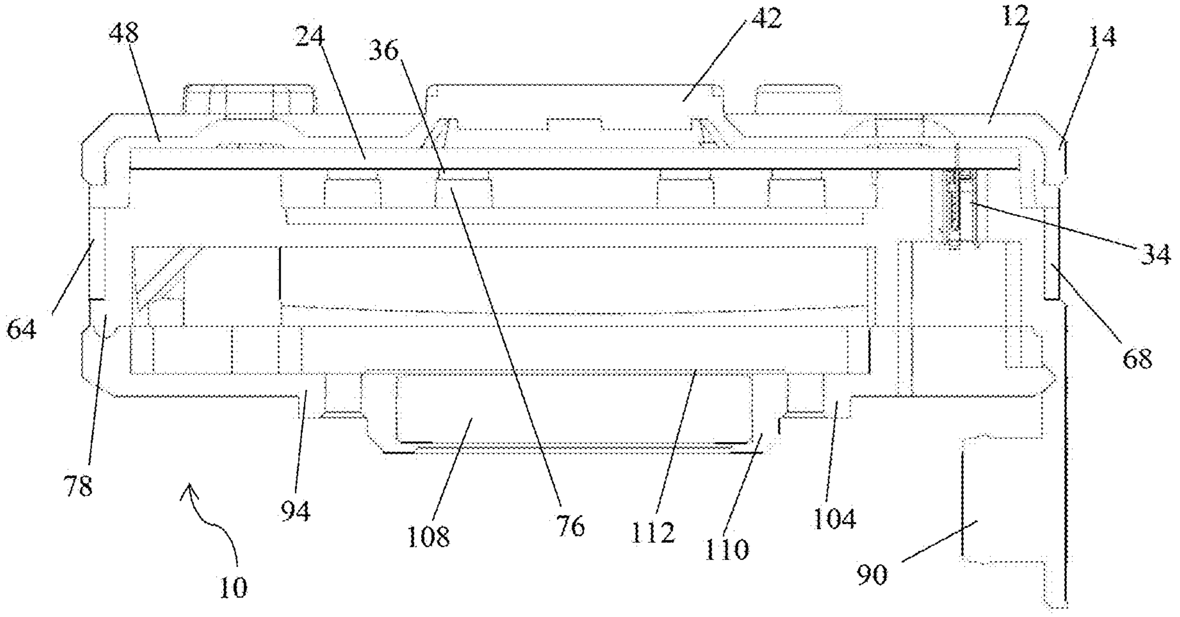
FIG. 59 is a cross-sectional view of the safety light taken along line A-A of FIG. 56.

In an embodiment, the top housing 12 includes a plurality of button openings 54, as shown in FIG. 2. A "button opening" is a void in the wall 14 of the top housing 12 such that a control button (42, 44, 46) may extend through the wall 14, as shown in FIGS. 1 and 59. In an embodiment, the top housing 12 includes a plurality of button openings 54, wherein each button opening 54 is aligned with a control button (42, 44, 46) of the button pad 48. The number of control buttons (42, 44, 46) on the button pad 48 is the same number of button openings 54 in the top housing 12.

In an embodiment, the button pad 48 includes a beacon opening 58, as shown in FIGS. 16 and 17. A "beacon opening" is a void in the button pad 48 sized to receive the beacon light element 40 such that the beacon light element 40 may extend through the button pad 48.

In an embodiment, the bottom portion **48*b* of the button pad 48 serves as a rubberized gasket that forms a watertight or semi-watertight seal between the lens 64 and the top housing 12**.

The control button 42 may comprise two or more embodiments disclosed herein.

The button pad 48 may comprise two or more embodiments disclosed herein.

F. Beacon Light Lens

In an embodiment, the safety light 10 includes a beacon light lens 60, as shown in FIGS. 1, 18-20, and 70. The beacon light lens 60 is coupled to the beacon light element 40.

The beacon light lens 60 is formed from one or more rigid materials through which light may pass through. Nonlimiting examples of suitable rigid materials include high impact polymers, thermoplastic polymers, thermoset polymers, composites, glass, ceramics, cellulose, acrylics, combinations thereof, and/or the like. In an embodiment, the beacon light lens 60 is formed from glass, polymethyl methacylate, a polycarbonate resin, a polystyrene resin, a styrene-acrylonitrile resin, cellulose acetate, polypropylene, nylon, polychlorotrifluoroethylene, ethylene-tetrafluoroethylene copolymer, polyvinylidene chloride, fluorinated ethylene/propylene copolymer, polyethylene telephthaleate, silica class, or combinations thereof. In an embodiment, the beacon light lens 60 is formed from a transparent material or a translucent material. A "transparent" material allows all light, or 100% of light, to pass through the material. A "translucent" material allows from greater than 0% to less than 100% of light to pass through the material.

Figure 19:
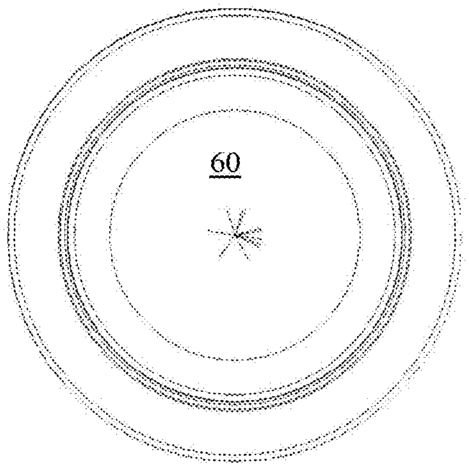
FIG. 19 is a top plan view of the beacon light lens.
Figure 20:
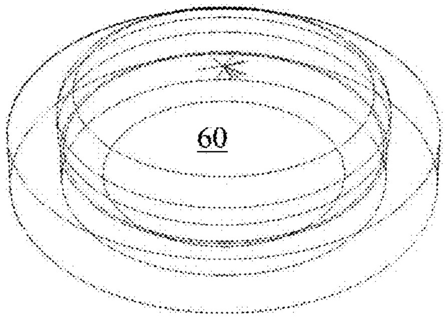
FIG. 20 is a first top perspective view of the beacon light lens.

The beacon light lens 60 has a cross-sectional shape. The cross-sectional shape may be any cross-sectional shape disclosed herein. FIG. 19 depicts a beacon light lens 60 with a circular cross-sectional shape.

In an embodiment, the beacon light lens 60 is coupled to the beacon light element 40 and the button pad 48. In a further embodiment, the beacon light lens 60 is coupled to the beacon light element 40 and the top surface 50 of the button pad 48.

The beacon light lens 60 is aligned with the beacon light element 40 such that light emitted from the beacon light element 40 passes through the beacon light lens 60.

In an embodiment, the top housing 12 has a beacon light lens opening 62, as shown in FIG. 2. A "beacon light lens opening" is a void in the wall 14 of the top housing 12 sized to receive the beacon light lens 60 such that at least a portion of the beacon light lens 60 may extend through the top housing 12.

Figure 18:
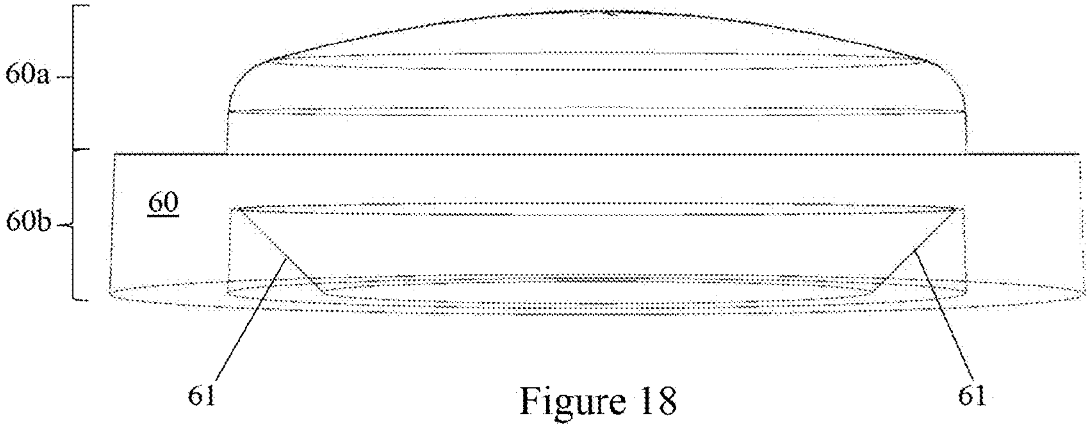
FIG. 18 is a front elevation view of a beacon light lens in accordance with an embodiment of the present disclosure.

In an embodiment, the beacon light lens 60 has a top portion **60*a* and a bottom portion 60*b*, as shown in FIG. 18. The top portion 60*a* has a diameter that is less than (<) the diameter of the bottom portion 60*b***.

In an embodiment, the beacon light lens 60 has a reflective surface 61 in the bottom portion **60*b*, as shown in FIG. 18. A "reflective surface" is a plane capable of reflecting light. In an embodiment, the plane is coated with a reflective material, such as a metal (e.g., nickel, chromium, aluminum, gold, silver, and combinations thereof) or a polymeric material to form a reflective surface. In an embodiment, the reflective material is vacuum-deposited on the plane to form a reflective surface. In an embodiment, the reflective surface 61 has a conical shape, as shown in FIG. 18. Light emitted from the beacon light element 40 reflects off of the reflective surface 61 and projects through the top portion 60*a* of the beacon light lens 60**.

In an embodiment, the top housing 12 has a beacon light lens opening 62 sized to receive the top portion **60*a* of the beacon light lens 60, but not the bottom portion 60*b* of the beacon light lens 60. Consequently, the bottom portion 60*b* of the beacon light lens 60 is contained within the safety light 10 below the bottom surface 18 of the top housing 12. In an embodiment, the bottom portion 60*b* of the beacon light lens 60 is contained within the safety light 10 below the bottom surface 18 of the top housing 12 and above the top surface 50 of the button pad 48. In other words, the bottom portion 60***b* of the beacon light lens 60 is positioned between the button pad 48 and the top housing 12, and the top portion 60*a* of the beacon light lens 60 extends through the wall 14 of the top housing 12.

Figure 60:
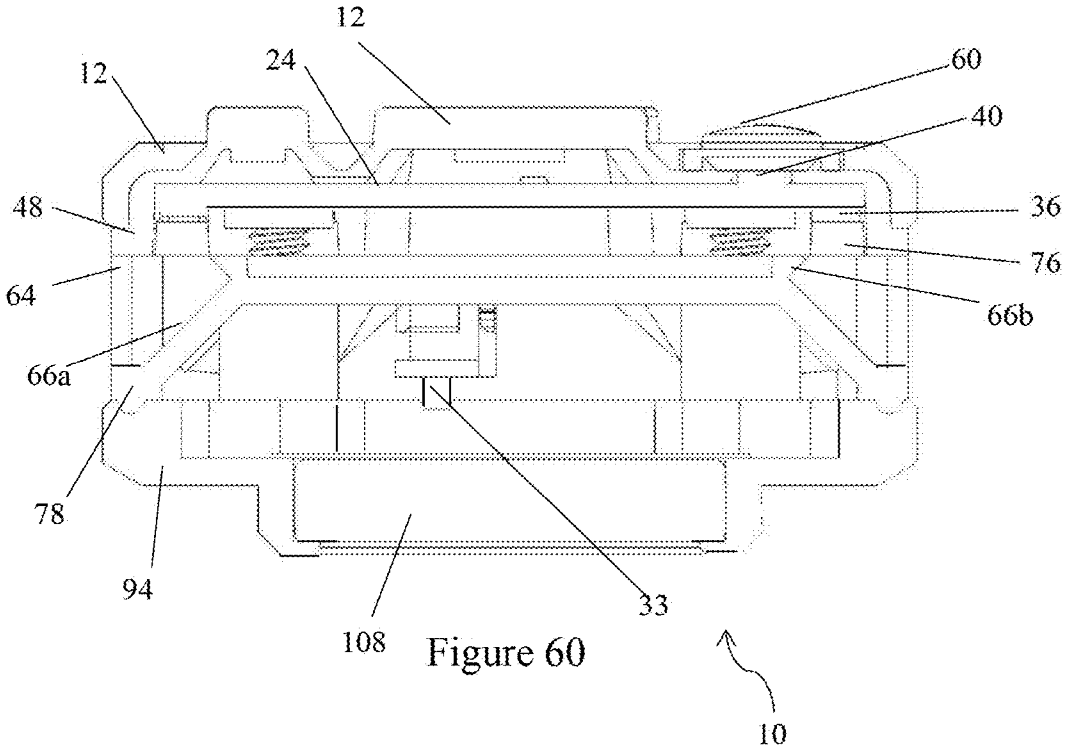
FIG. 60 is a right cross-sectional view of the safety light taken along line B-B of FIG. 56.
Figure 68:
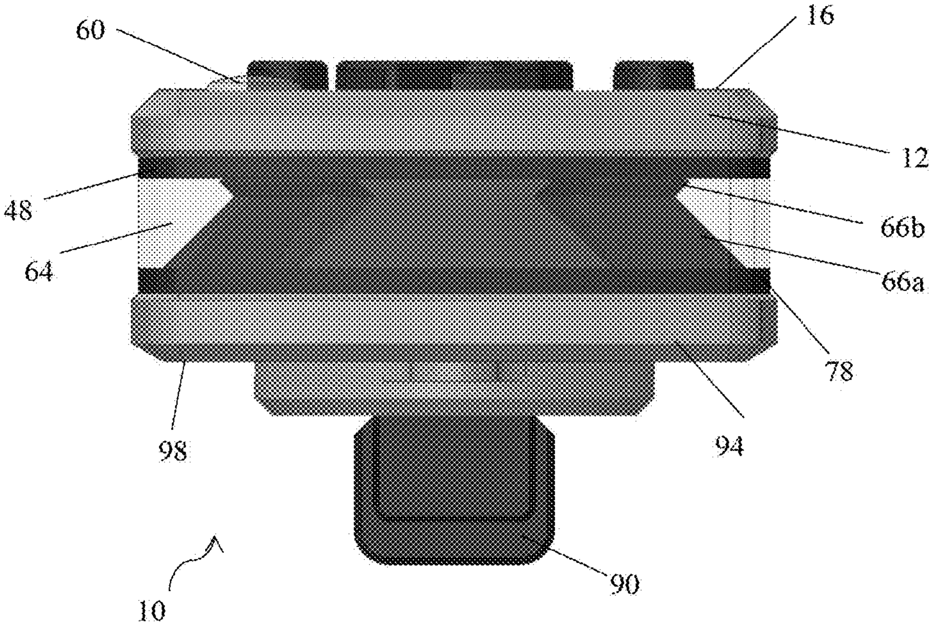
FIG. 68 is a left elevation view of the safety light.
Figure 69:
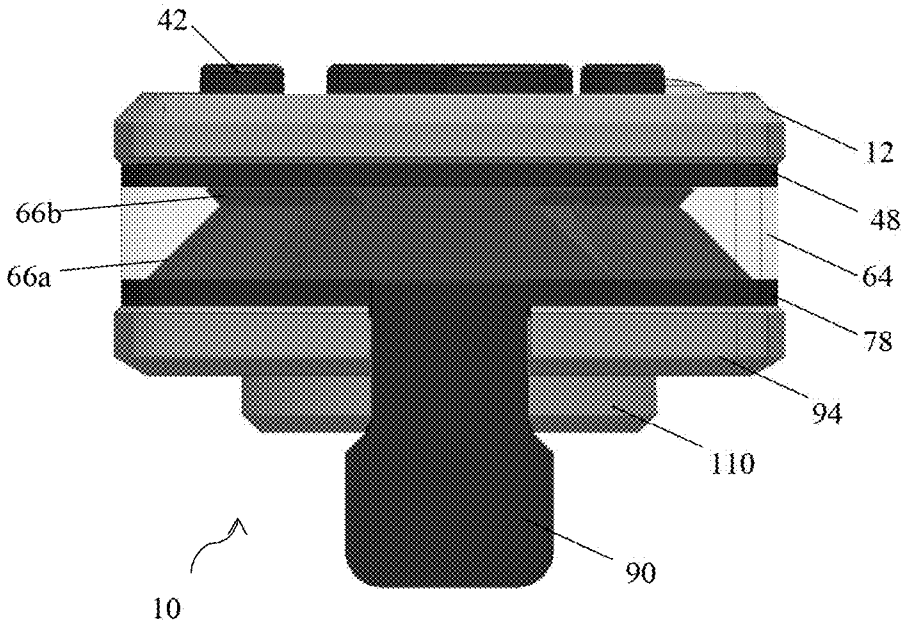
FIG. 69 is a right elevation view of the safety light.
Figure 70:
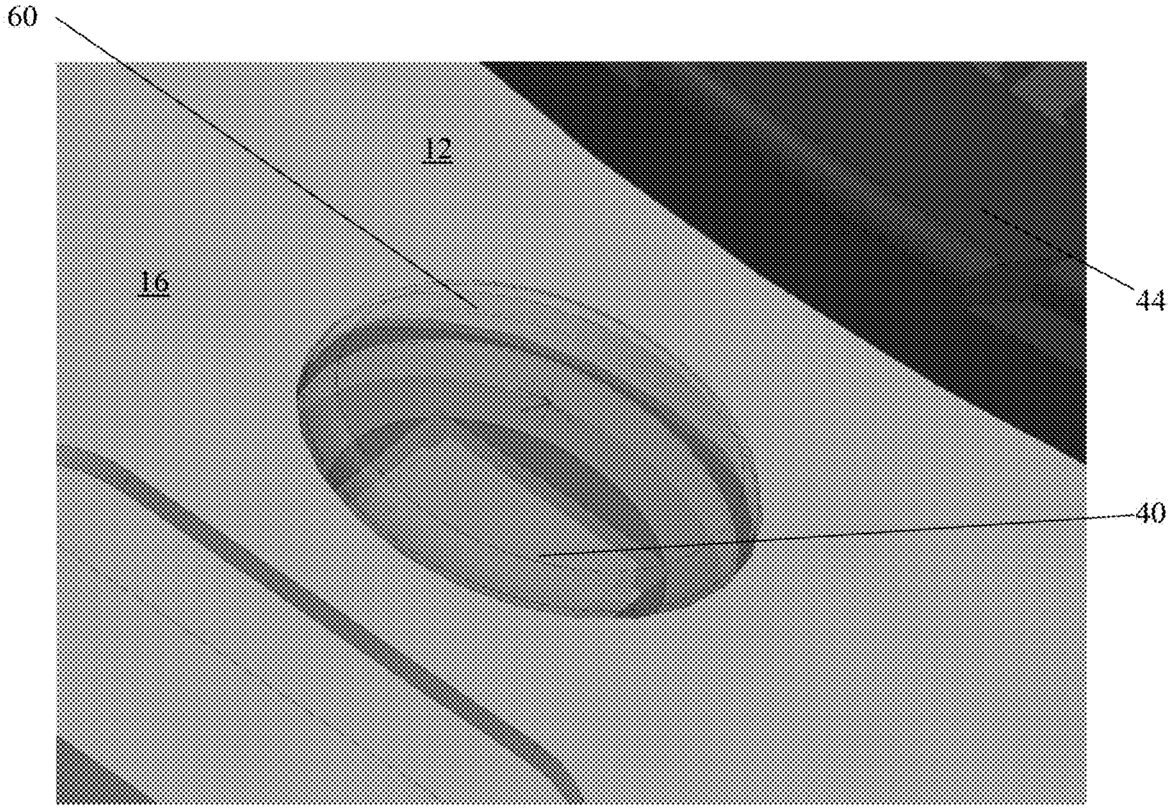
FIG. 70 is an enlarged rear view of Area A of the safety light of FIG. 62.

The beacon light lens 60 may or may not protrude past the top surface 16 of the top housing 12. In an embodiment, the beacon light lens 60 protrudes past the top surface 16 of the top housing 12, as shown in FIGS. 1, 60, and 68.

The safety light 10 includes the same number of beacon light elements 40 and beacon light lenses 60. In an embodiment, the safety light 10 includes from 1 to 2, or 3, or 4 beacon light lenses 60. In an embodiment, the safety light 10 includes one and only one beacon light lens 60.

The beacon light lens 60 may comprise two or more embodiments disclosed herein.

G. Lens

The safety light 10 includes a lens 64 coupled to the bottom surface 28 of the PCBA 24 and the plurality of light elements 36, the lens 64 having an angled reflective surface 66 and a plurality of side surfaces 68, as shown in FIGS. 1 and 21-29.

The lens 64 may be formed from any lens material disclosed herein. In an embodiment, the lens 64 is formed from a transparent material or a translucent material. In an embodiment, the lens 64 is a monolithic lens, but can also be configured differently, for example, as a hollow lens.

Figure 21:
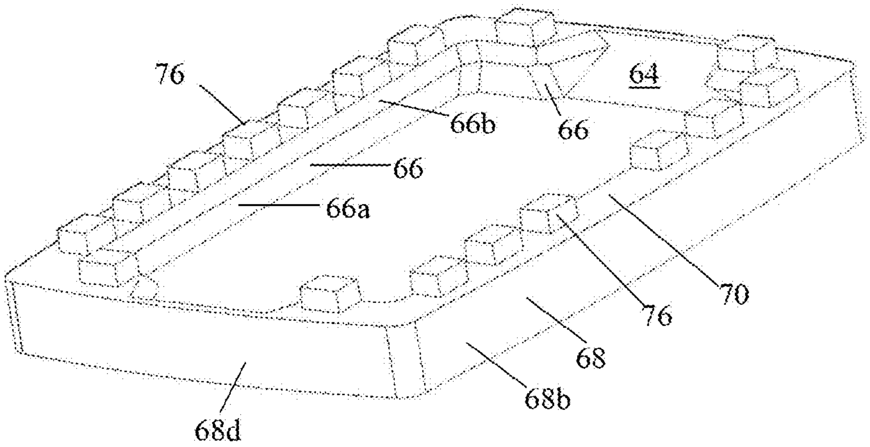
FIG. 21 is a rear top perspective view of a lens in accordance with an embodiment of the present disclosure.
Figure 22:
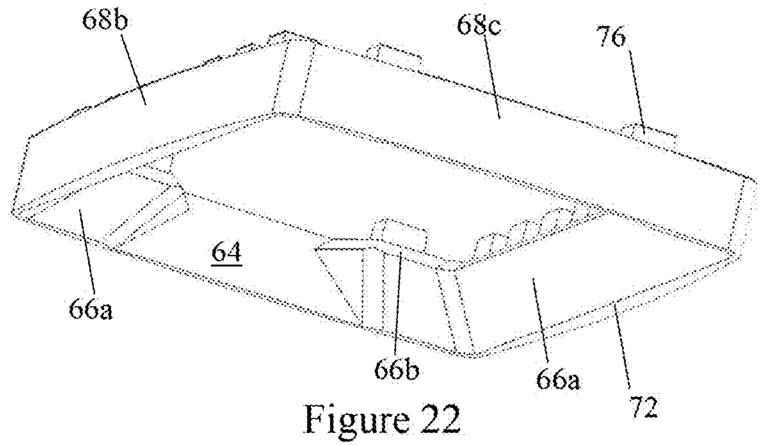
FIG. 22 is a right bottom perspective view of the lens.
Figure 23:
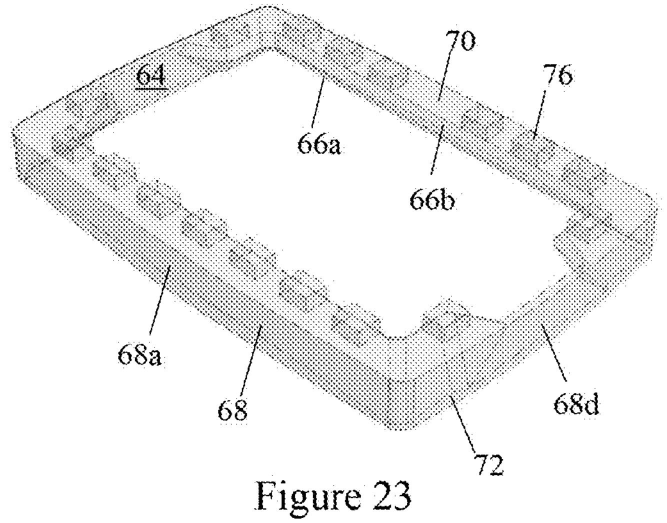
FIG. 23 is a front top perspective view of the lens.
Figure 24:
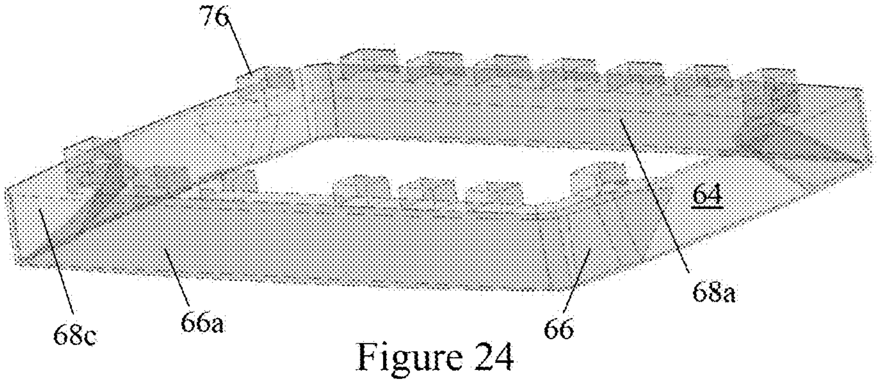
FIG. 24 is a bottom perspective view of the lens.
Figure 29:
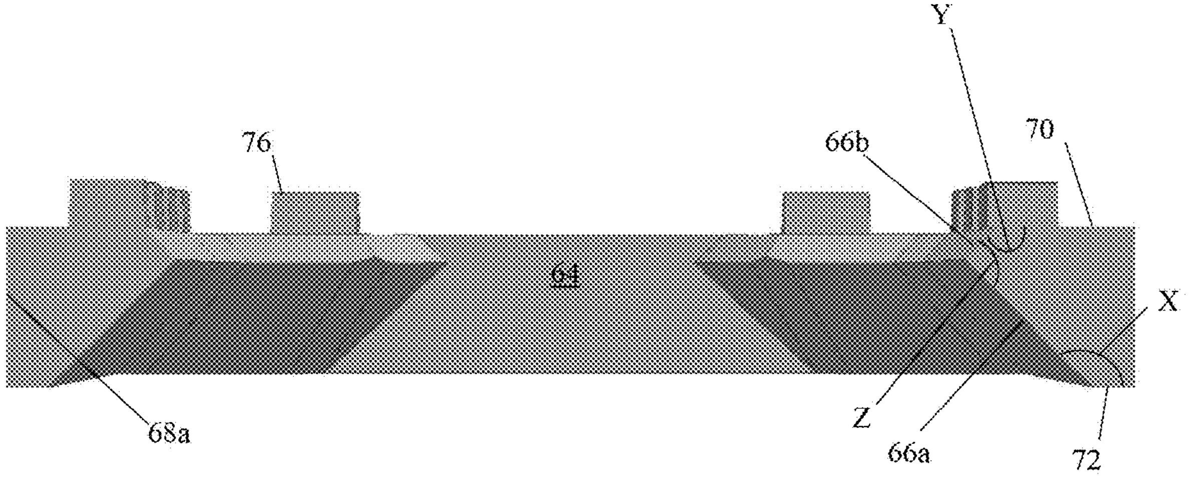
FIG. 29 is a cross-sectional view of the lens taken along line A-A of FIG. 25.

In an embodiment, the lens 64 has two opposing surfaces, including a top surface 70 and a bottom surface 72, as shown in FIGS. 21 and 22. The top surface 70 of the lens 64 is oriented parallel to the bottom surface 72 of the lens 64. The term "parallel," as used herein, indicates the top surface 70 extends in the same direction, or substantially the same direction, as the bottom surface 72 of the lens 64. FIG. 29 depicts a top surface 70 and a bottom surface 72 that are parallel to one another.

In an embodiment, the lens 64 has a bottom surface 72 that is a reflective surface. A "reflective surface" is a plane capable of reflecting light. In an embodiment, the plane is coated with a reflective material, such as a metal (e.g., nickel, chromium, aluminum, gold, silver, and combinations thereof) or a polymeric material to form a reflective surface. In an embodiment, the reflective material is vacuum-deposited on the plane to form a reflective surface.

The lens 64 includes an angled reflective surface 66. An "angled reflective surface" is a plane extending at an angle other than 90° from the top surface 70 of the lens 64, the bottom surface 72 of the lens, or combinations thereof, the plane capable of reflecting light emitted from the plurality of light elements 36. The angled reflective surface 66 may be flat or curved. In an embodiment, the angled reflective surface 66 is flat, or is not curved. FIGS. 21-29 depict a lens 64 with a flat angled reflective surface 66.

In an embodiment, the angle, X, between the bottom surface 72 and the angled reflective surface 66 is from 110°, or 115°, or 120°, or 125° to 130°, or 135°, or 140°, or 145°, or 150°, as shown in FIG. 29. In an embodiment, the angle, X, between the bottom surface 72 and the angled reflective surface 66 is 135°.

In an embodiment, the lens 64 includes from 1 to 2, or 3, or 4, or 5, or 6, or 7, or 8, or 9, or 10, or 12, or 14, or 16, or 18, or 20, or 22, or 24, or 26, or 28, or 30, or 40 angled reflective surfaces 66. For purposes of this disclosure, each angled reflective surface 66 having the same angle, X, of from 110°, or 115°, or 120°, or 125° to 130°, or 135°, or 140°, or 145°, or 150°, between the bottom surface 72 of the lens 64 and the angled reflective surface 66 shall constitute a "first angled reflective surface" 66*a*, as shown in FIGS. 21-29. However, it is understood that the first angled reflective surface 66*a* depicted in FIGS. 21-29 includes 18 individual flat angled reflective surfaces 66, as shown in FIG. 26.

In an embodiment, the angle, Y, between the top surface 70 and the angled reflective surface 66 is from 110°, or 115°, or 120°, or 125° to 130°, or 135°, or 140°, or 145°, or 150°, as shown in FIG. 29. In an embodiment, the angle, Y, between the top surface 70 and the angled reflective surface 66 is 135°.

Figure 25:
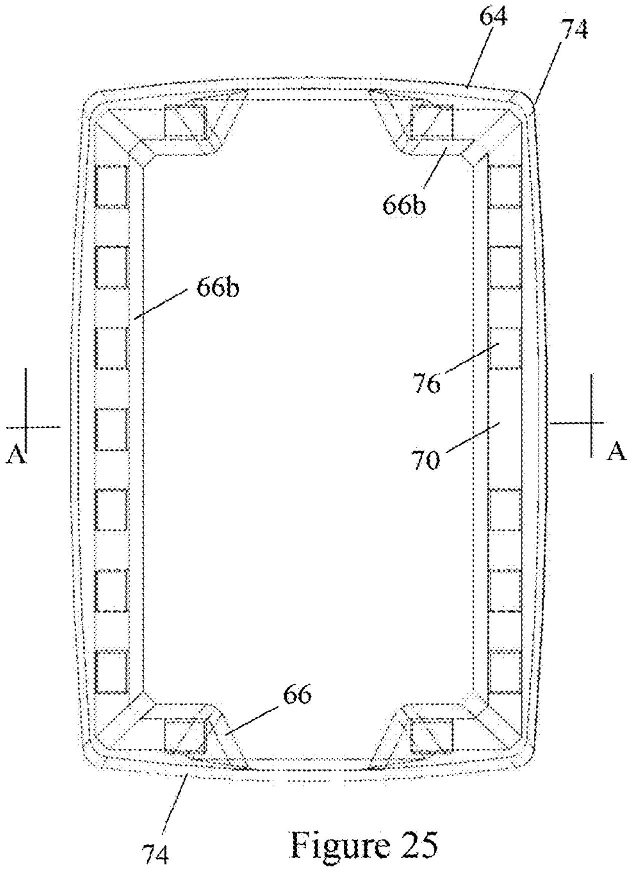
FIG. 25 is a top plan view of the lens.
Figure 26:
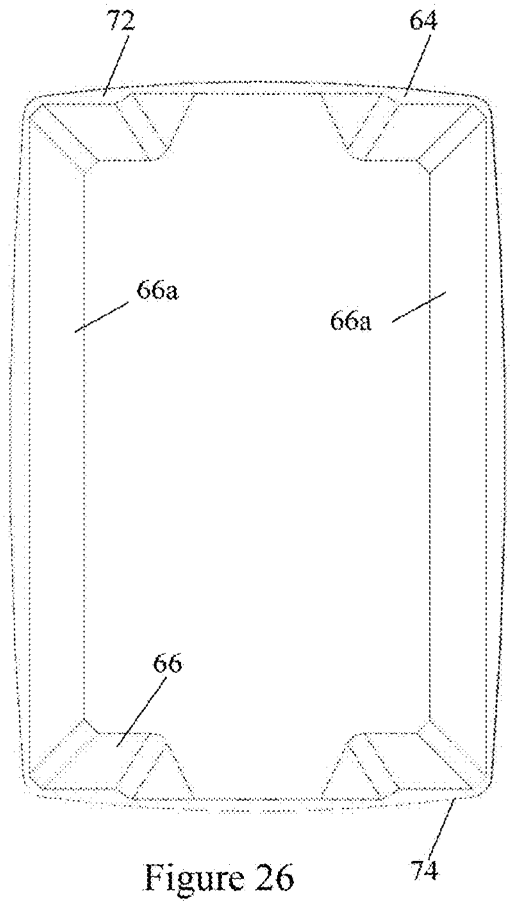
FIG. 26 is a bottom plan view of the lens.

In an embodiment, the lens 64 includes the first angled reflective surface 66*a* and a second angled reflective surface 66*b*, as shown in FIGS. 21-29. For purposes of this disclosure, each angled reflective surface 66 having the same angle, Y, of from 110°, or 115°, or 120°, or 125° to 130°, or 135°, or 140°, or 145°, or 150°, between the top surface 70 of the lens 64 and the angled reflective surface 66 shall constitute a "second angled reflective surface" 66*b*, as shown in FIGS. 21-29. However, it is understood that the second angled reflective surface 66*b* depicted in FIGS. 21-29 includes 14 individual flat angled reflective surfaces, as shown in FIGS. 21 and 25.

In an embodiment, the lens 64 includes the first angled reflective surface 66*a* and the second angled reflective surface 66*b*, and the angle, Z, between the first angled reflective surface 66*a* and the second angled reflective surface 66*b* is from 80°, or 85° to 90°, or 95°, or 100°, as shown in FIG. 29. In an embodiment, the lens 64 includes the first angled reflective surface 66*a* and the second angled reflective surface 66*b*, and the angle, Z, between the first angled reflective surface 66*a* and the second angled reflective surface 66*b* is 90°.

The first angled reflective surface 66*a* and the second angled reflective surface 66*b* may or may not be continuous around the perimeter 74 of the lens 64. FIGS. 21-29 depict a first angled reflective surface 66*a* and a second angled reflective surface 66*b* that are not continuous around the perimeter 74 of the lens 64, rather, they are discontinuous.

In an embodiment, the lens 64 includes a first angled reflective surface 66*a* and the angle, X, between the bottom surface 72 and the first angled reflective surface 66*a* is 135°. In another embodiment, the lens 64 includes a second angled reflective surface 66*b* and the angle, Y, between the top surface 70 and the second angled reflective surface 66*b* is 135°. In a further embodiment, the angle, Z, between the first angled reflective surface 66*a* and the second angled reflective surface 66*b* is 90°.

The lens 64 has a plurality of side surfaces 68. In an embodiment, the lens 64 includes from 4 to 5, or 6, or 7, or 8 side surfaces 68. In an embodiment, the lens 64 includes four side surfaces 68 that extends generally between the top housing 12 and the bottom housing 94. In an embodiment, the lens 64 includes a front side surface 68*a*, a rear side surface 68*b*, a left side surface 68*c*, and a right side surface 68*d*, as shown in FIGS. 21-24, 27 and 28. Each side surface 68 extends perpendicular to the top surface 70 and the bottom surface 72 of the lens 64, as shown in FIG. 29. A side surface 68 that extends "perpendicular" to the top surface 70 and the bottom surface 72 of the lens 64 is at an approximately 90° angle with the top surface 70 and the bottom surface 72 of the lens 64. Each side surface 68 may be flat or curved. FIG. 29 depicts a lens 64 with flat side surfaces 68.

The side surfaces 68 extend in a continuous manner around the perimeter 74 of the lens 64.

The side surfaces 68 are not reflective. In other words, light is not reflected by the side surfaces 68 of the lens 64, but rather transmits, or projects, through the side surfaces 68.

In an embodiment, the plurality of light elements 36 emit a light directed away from the bottom surface 28 of the PCBA 24 (e.g., from the top housing 12 and toward the bottom housing 94) and the light reflects off of the first angled reflective surface 66*a* of the lens 64 and projects through the plurality of side surfaces 68 of the lens 64. It is understood that the angle of incidence (i.e., the angle a light hits a reflective surface) is equal to the angle of reflection (i.e., the angle at which the light reflects off of the reflective surface). Thus, the present safety light 10 may advantageously direct its light elements 36 downward, such as at a 90° angle with the top surface 70 of the lens 64, and still project the light outward through the plurality of side surfaces 68 of the lens 64 in a direction that is parallel, or substantially parallel, to the top surface 70 of the lens 64. This configuration allows for light elements 36 to be located above the lens 64, rather than behind (i.e., parallel to) the lens, allowing for a safety light 10 with a smaller length and width compared to conventional safety lights.

Figure 27:
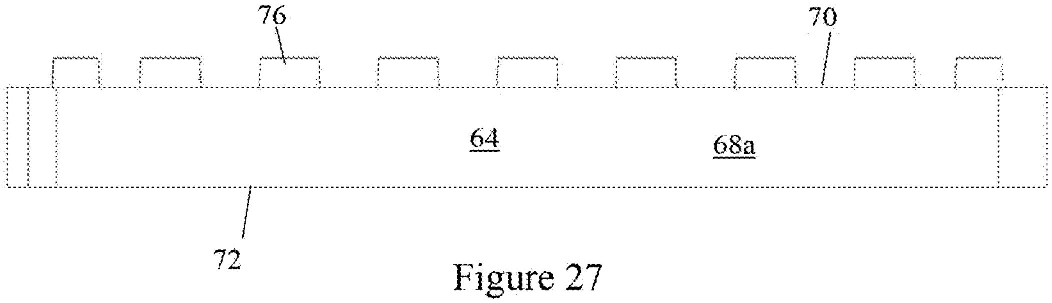
FIG. 27 is a front elevation view of the lens.
Figure 28:
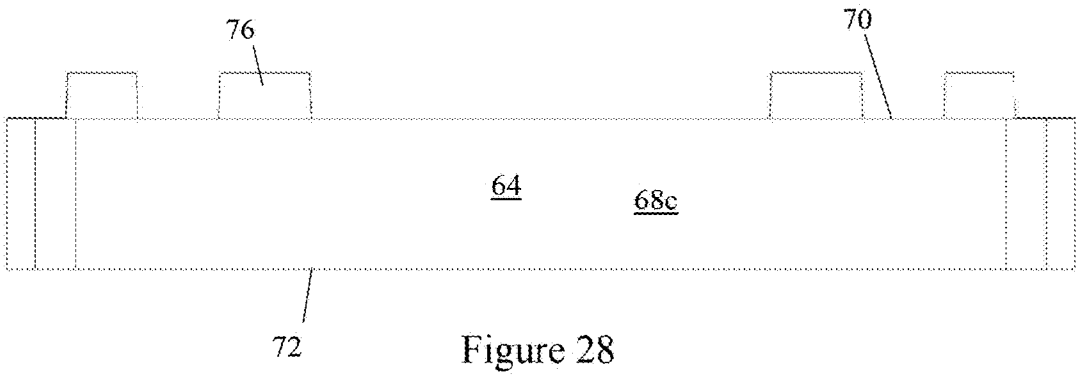
FIG. 28 is a left elevation view of the lens.

In an embodiment, the lens 64 includes a plurality of light posts 76 coupled to the top surface 70 of the lens 64, as shown in FIGS. 21, 27 and 28. The lens 64 and the light posts 76 may have an integral design or a composite design. A lens 64 with light posts 76 having an "integral design" is formed from one piece of rigid material, such as a molded piece. A lens 64 with light posts 76 having a "composite design" is formed from more than one distinct piece (or part), which upon assembly are combined. Each light post 76 is coupled to a light element 36. Thus, the safety light 10 includes the same number of light elements 36 and light posts 76. The light posts 76 advantageously reduce the separation between the lens 64 and the plurality of light elements 36, and thus reduce the amount of air present between the lens 64 and the plurality of light elements 36. Reduced air between the lens 64 and the plurality of light elements 36 reduces the amount of light dissipation and attenuation that occurs in air, resulting in more light entering the lens 64.

Each light post 76 has a shape. Nonlimiting examples of suitable shapes include square prism, rectangular prism, cylinder, frustum, pentagonal prism, trapezium prism, and combinations thereof. FIG. 21 depicts light posts 76 with a rectangular prism shape.

The lens 64 may comprise two or more embodiments disclosed herein.

Figure 80:
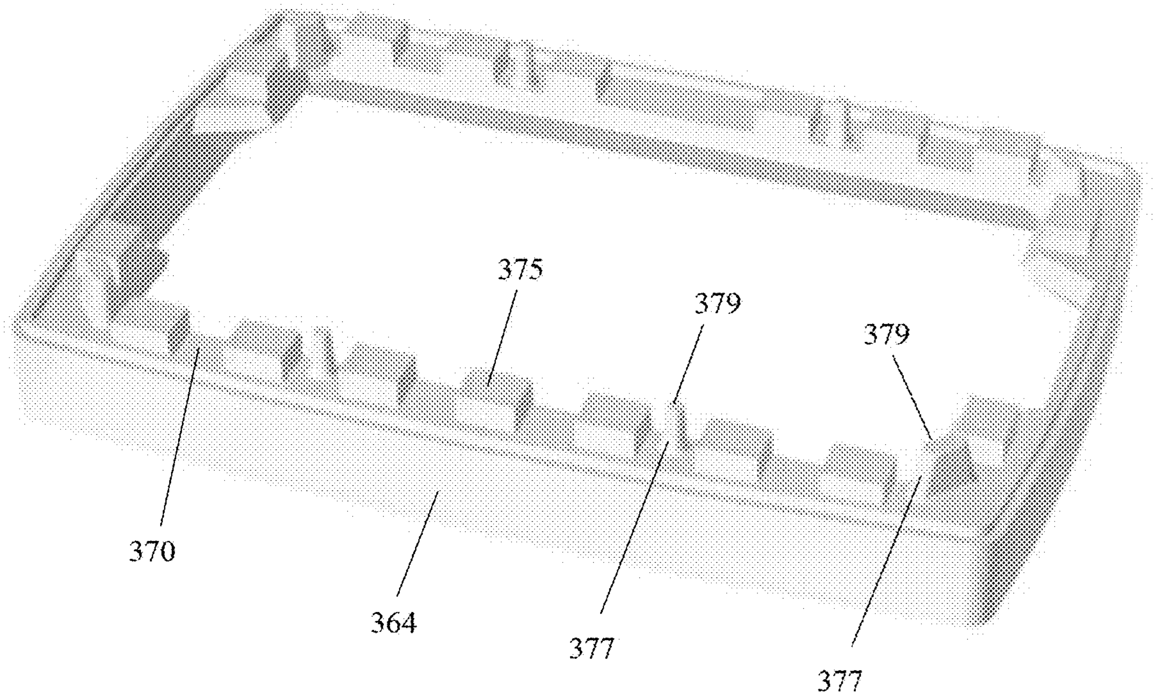
FIG. 80 is a front perspective view of a lens in accordance with another embodiment of the present disclosure.

In an embodiment, the lens 364 includes a plurality of spacing posts 377 coupled to the top surface 370 of the lens 364, as shown in FIG. 80. The lens 364 and the spacing posts 377 may have an integral design or a composite design. A lens 364 with spacing posts 377 having an "integral design" is formed from one piece of rigid material, such as a molded piece. A lens 364 with spacing posts 377 having a "composite design" is formed from more than one distinct piece (or part), which upon assembly are combined. The spacing posts 377 are positioned between the light posts 376, as shown in FIG. 80. Each spacing post 377 has a height, HS, that is the distance between the lens top surface 370 and the spacing post top surface 379. Each light post 376 has a height, HP, that is the distance between the lens top surface 370 and the light post top surface 379. Each spacing post 377 has a height, HS, that is greater than the height, HP, of each light post 376, as shown in FIG. 80. The PCBA bottom surface is in contact with the top surface 379 of each spacing post 377. When the PCBA bottom surface is in contact with the top surface 379 of each spacing post 377, a gap (i.e., a void) is present between the top surface 375 of each light post 376 and each light element. In other words, the light elements are not in direct contact with the lens 374, and further, not in direct contact with the light posts 376. The gap protects the light elements from potential damage that may be caused by direct contact between the light elements and the lens 364. As used herein, "direct contact" refers to a configuration whereby the light element is located immediately adjacent to the lens 364, the light element touches the lens 364, and no intervening structures, or substantial voids, or voids, are present between the light element and the lens 364.

In an embodiment, each light post 376 has a height, HP, that is from 1 mm, or 1.5 mm, or 1.9 mm to 2.0 mm, or 2.5 mm.

In an embodiment, each spacing post 377 has a height, HS, that is from 2.6 mm, or 2.7 mm, or 2.8 mm to 2.9 mm, or 3.0 mm, or 3.2 mm, or 3.5 mm.

In an embodiment, each light post 376 has a height, HP, that is from 1 mm, or 1.5 mm, or 1.9 mm to 2.0 mm, or 2.5 mm; and each spacing post 377 has a height, HS, that is from 2.6 mm, or 2.7 mm, or 2.8 mm to 2.9 mm, or 3.0 mm, or 3.2 mm, or 3.5 mm. In a further embodiment, each light post 376 has a height, HP, that is from 1.9 mm to 2.0 mm; and each spacing post 377 has a height, HS, that is from 2.8 mm to 2.9 mm.

In an embodiment, the lens 364 includes from 2, or 3, or 4 to 5, or 6, or 7, or 8, or 10 spacing posts 377. In a further embodiment, the lens 364 includes 8 spacing posts 377, wherein each spacing post is positioned between a light post 376.

The lens 364 may comprise two or more embodiments disclosed herein.

H. Rubber Seal

In an embodiment, the safety light 10 includes a rubber seal 78, as shown in FIGS. 1 and 30-39.

The rubber seal 78 serves as a rubberized gasket that forms a watertight or semi-watertight seal between the lens 64 and the bottom housing 94.

Figure 38:
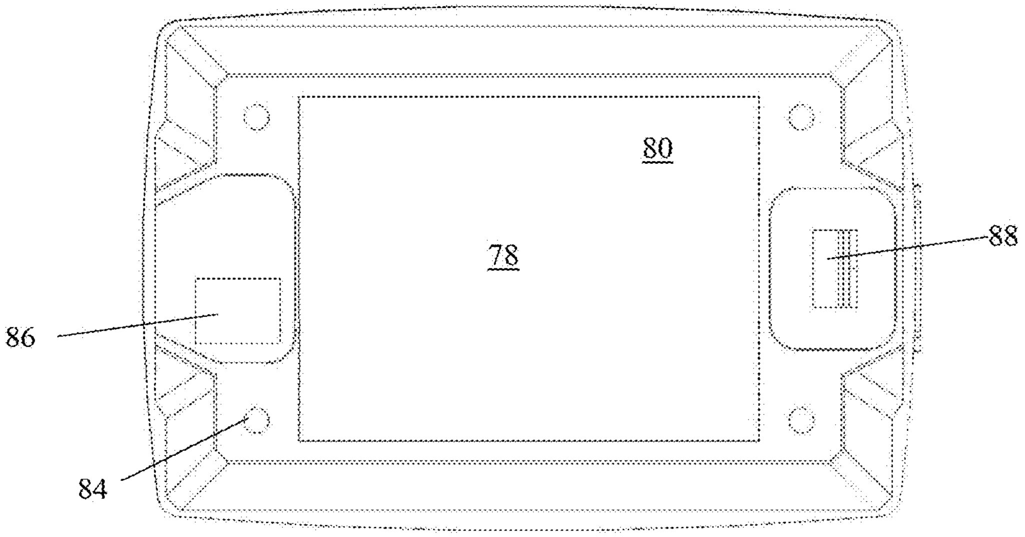
FIG. 38 is a top plan view of the rubber seal.
Figure 39:
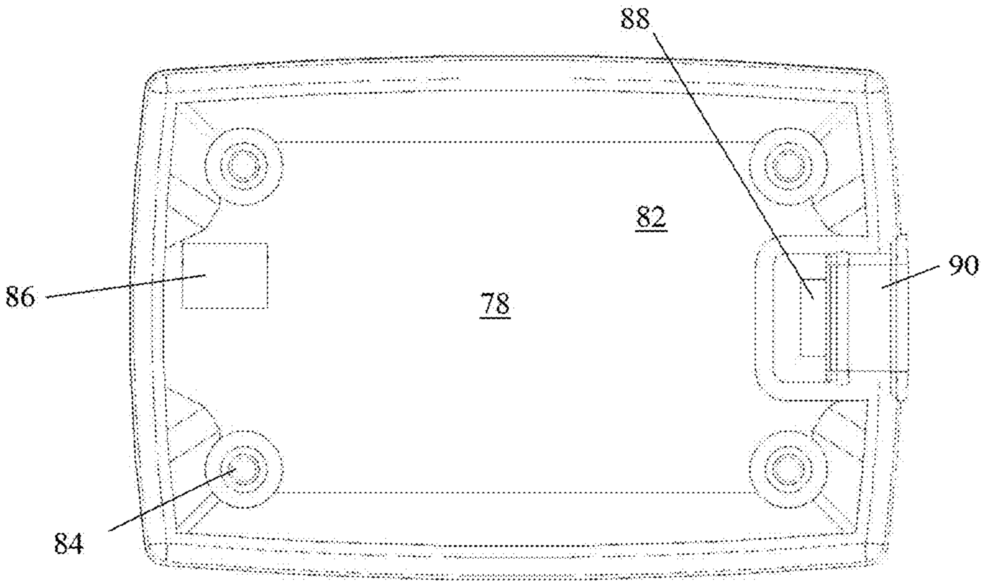
FIG. 39 is a bottom plan view of the rubber seal.

The rubber seal 78 has a cross-sectional shape. The cross-sectional shape may be any cross-sectional shape disclosed herein. The rubber seal 78 has the same cross-sectional shape as the cross-sectional shape of the top housing 12. FIGS. 38 and 39 depict a rubber seal 78 with a rectangle cross-sectional shape.

Figure 30:
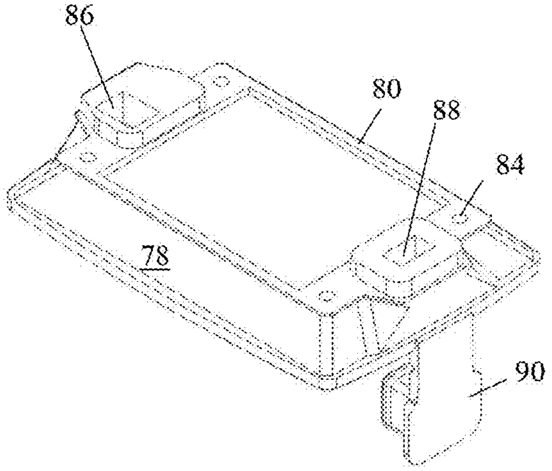
FIG. 30 is a right top perspective view of a rubber seal in accordance with an embodiment of the present disclosure.
Figure 31:
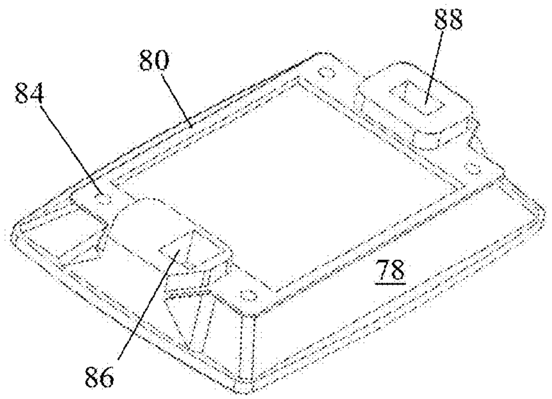
FIG. 31 is a left top perspective view of the rubber seal.
Figure 32:
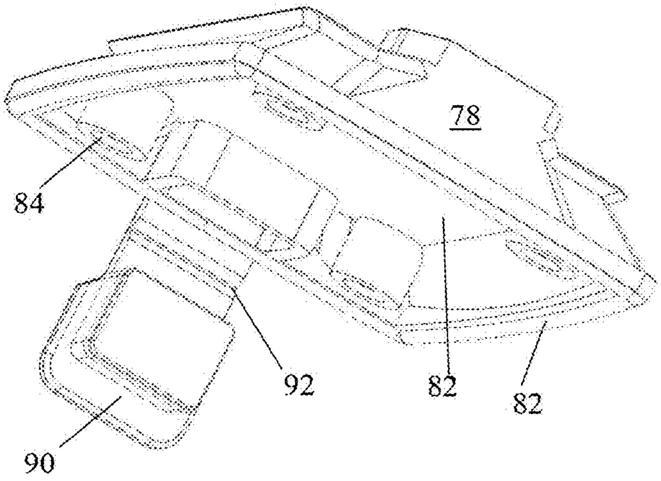
FIG. 32 is a right bottom perspective view of the rubber seal.

The rubber seal 78 has two opposing surfaces, including a top surface 80 and a bottom surface 82, as shown in FIGS. 30 and 32.

Figure 34:
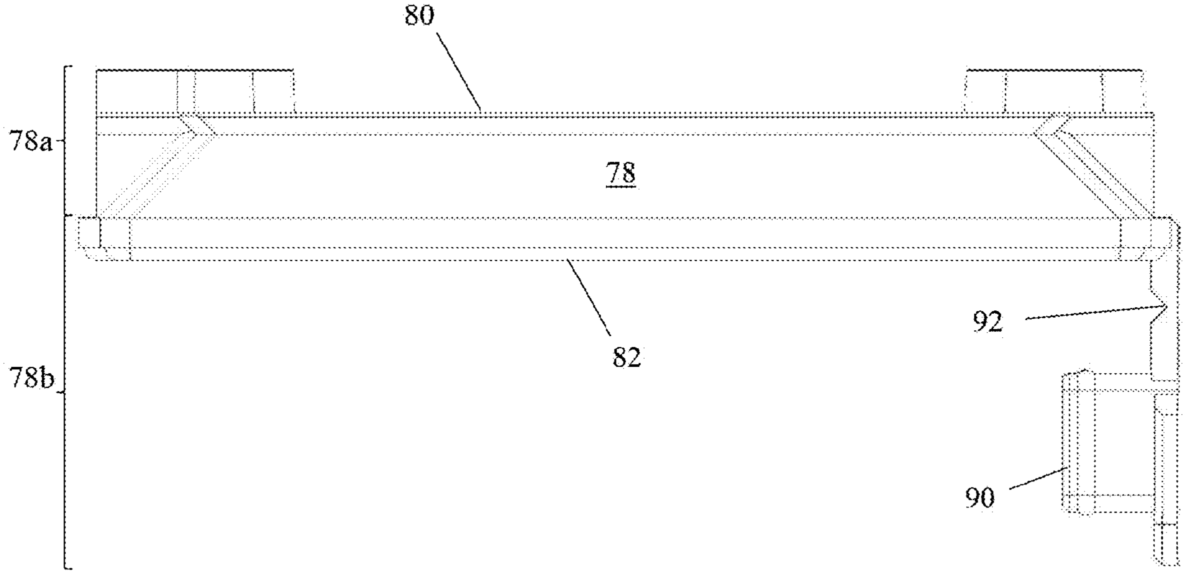
FIG. 34 is a front elevation view of the rubber seal.
Figure 35:
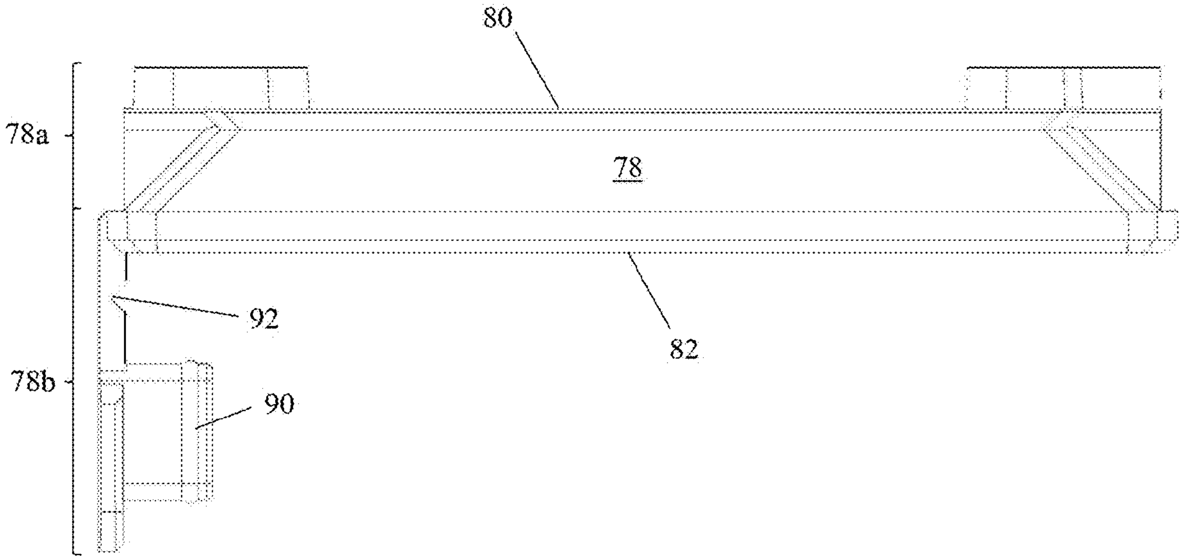
FIG. 35 is a rear elevation view of the rubber seal.
Figure 36:
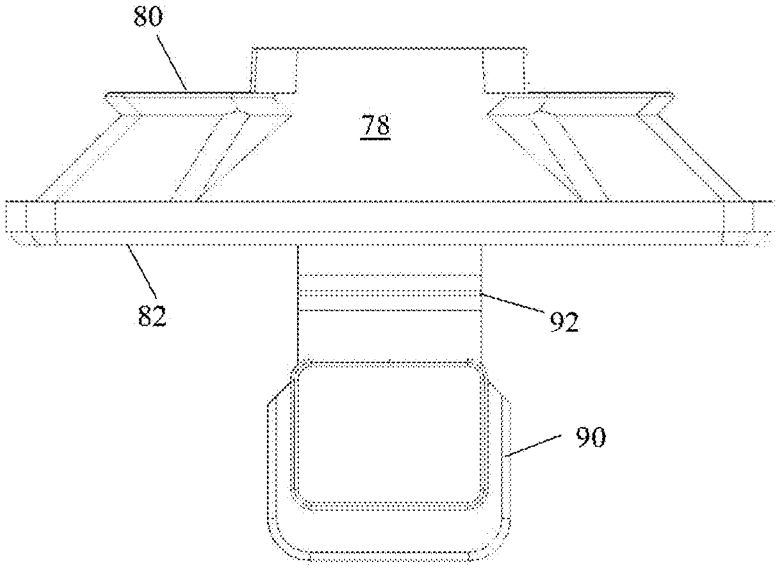
FIG. 36 is a left elevation view of the rubber seal.
Figure 37:
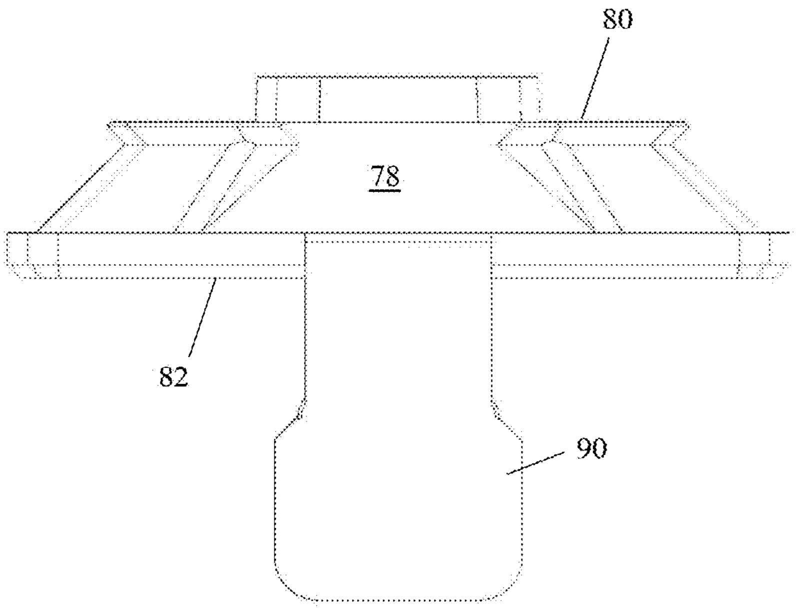
FIG. 37 is a right elevation view of the rubber seal.

In an embodiment, the rubber seal 78 has a top portion 78*a* and a bottom portion 78*b*, as shown in FIGS. 34-35. In an embodiment, the lens 64 is sized to receive the top portion 78*a* of the rubber seal 78. In an embodiment, the top portion 78*a* of the rubber seal 78 is coupled to the lens 64 and the PCBA 24.

Figure 33:
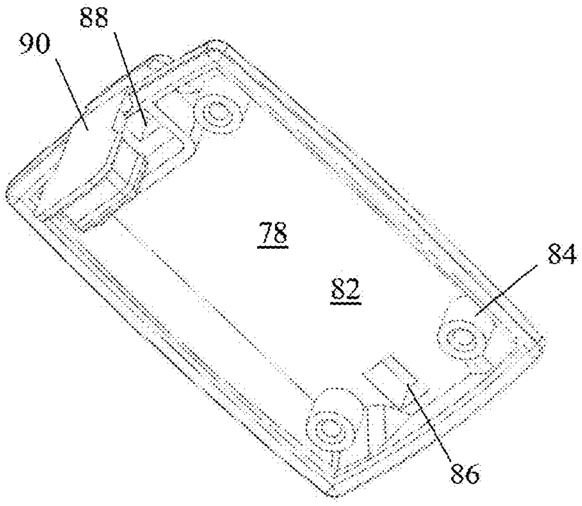
FIG. 33 is a left bottom perspective view of the rubber seal.

In an embodiment, the rubber seal 78 includes a plurality of threaded openings 84, as shown in FIGS. 30 and 33. A "threaded opening" is a void in the rubber seal 78 sized to receive a threaded fastener 114, such as a screw. The threaded opening 84 allows the threaded fastener 114 to extend through the rubber seal 78. In an embodiment, the threaded openings 84 of the rubber seal 78 align with the threaded openings 38 of the PCBA 24, which align with the threaded openings 56 of the button pad 48, which align with the threaded connector 22 of the top housing 12 such that a threaded fastener 114 may extend through the rubber seal 78, the PCBA 24, and the button pad 48 and connect to the top housing 12. In an embodiment, the rubber seal 78 includes from 2, or 3 to 4, or 5, or 6 threaded openings 84. In an embodiment, the rubber seal 78 includes four threaded openings 84.

In an embodiment, the rubber seal 78 includes a rechargeable power source opening 86, as shown in FIGS. 38 and 39. The "rechargeable power source opening" is a void in the rubber seal 78 sized to receive the rechargeable power source 32. In an embodiment, the rechargeable power source 32 is coupled to the rubber seal 78.

In an embodiment, the rubber seal 78 includes a recharging port opening 88, as shown in FIGS. 38 and 39. The "recharging port opening" is a void in the rubber seal 78 sized to receive a recharging port 34. A nonlimiting example of a suitable recharging port 34 is a Universal Serial Bus (USB) port, as shown in FIG. 41. The recharging port 34 is electrically connected to the PCBA 24 and the rechargeable power source 32.

In an embodiment, the rubber seal 78 includes a recharging port cover 90, as shown in FIGS. 32 and 33. In an embodiment, the recharging port cover 90 is attached to the bottom portion **78*b* of the rubber seal 78 by a flexible hinge 92. FIGS. 32 and 33 depict a recharging port cover 90 that is attached to the bottom portion 78*b* of the rubber seal 78 by a flexible hinge 92. The flexible hinge 92 permits access to the recharging port 34 when the recharging port cover 90 is in an open position, as shown in FIGS. 30 and 65. When the recharging port cover 90 is in a closed position, the recharging port cover 90 creates a protective seal over the recharging port 34 to prevent debris and moisture from entering the recharging port 34**.

The rubber seal 78 may comprise two or more embodiments disclosed herein.

I. Bottom Housing

The safety light 10 includes a bottom housing 94, as shown in FIGS. 42-46.

The bottom housing 94 is coupled to the lens 64. In an embodiment, the bottom housing 94 is coupled to the lens 64 via the rubber seal 78 such that the rubber seal 78 is positioned between the bottom housing 94 and the lens 64.

The bottom housing 94 is formed from a rigid material. The rigid material may be any rigid material disclosed herein.

Figure 45:
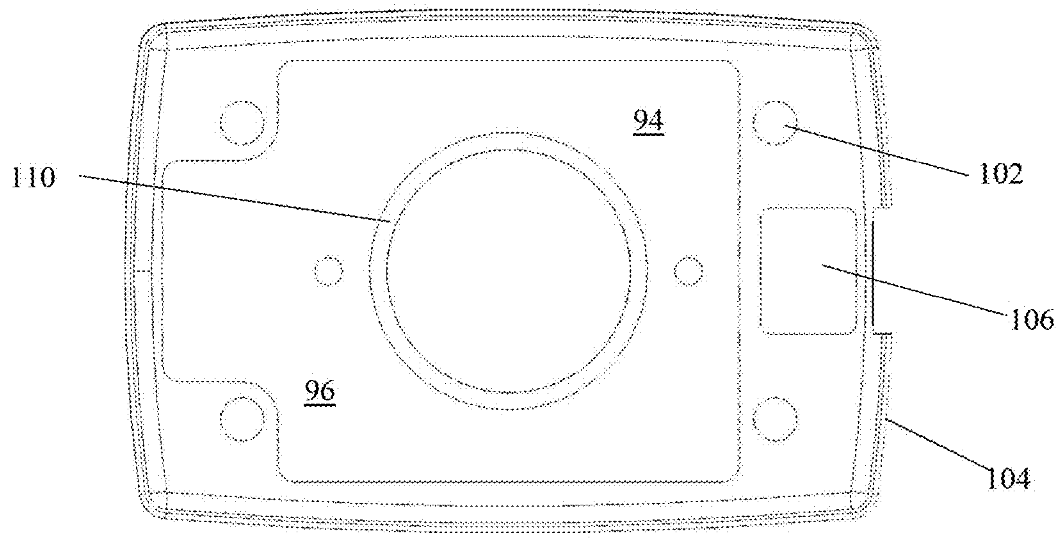
FIG. 45 is a top plan view of the bottom housing.

The bottom housing 94 has a wall 104, as shown in FIGS. 45 and 59.

Figure 42:
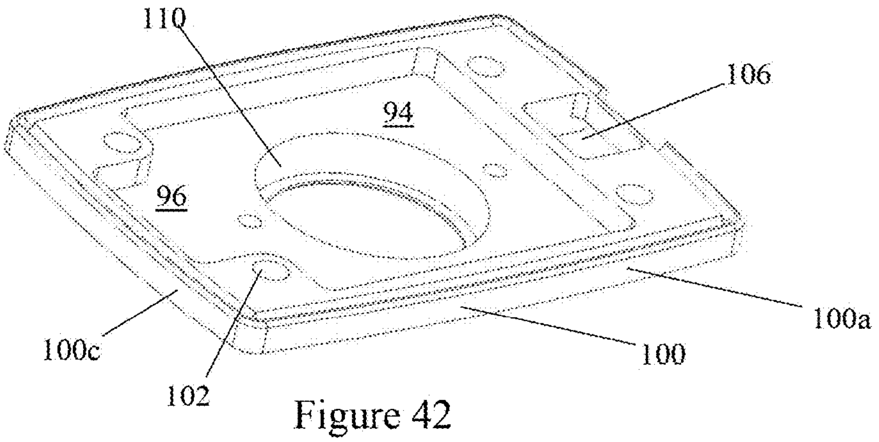
FIG. 42 is a left top perspective view of a bottom housing in accordance with an embodiment of the present disclosure.
Figure 44:
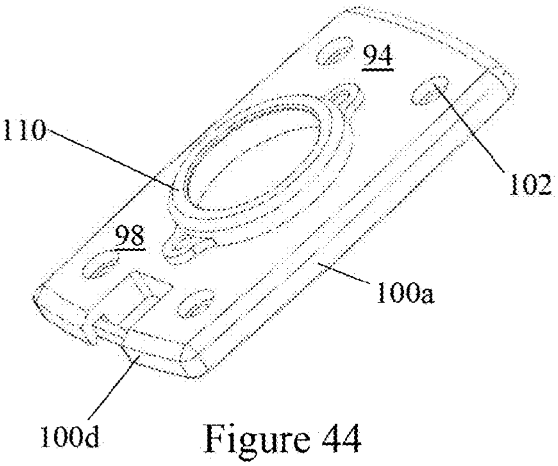
FIG. 44 is a bottom perspective view of the bottom housing.

The bottom housing 94 has two opposing surfaces, including a top surface 96 and a bottom surface 98, as shown in FIGS. 42 and 44. In an embodiment, the top surface 96 of the bottom housing 94 is coupled to the bottom surface 82 of the rubber seal 78.

Figure 43:
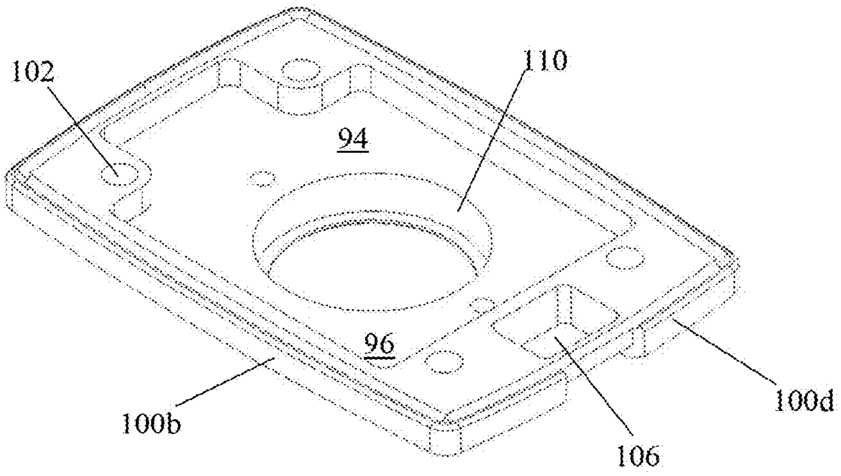
FIG. 43 is a right top perspective view of the bottom housing.

In an embodiment, the bottom housing 94 includes a plurality of side surfaces 100. In an embodiment, the side surfaces 100 include a front surface **100*a*, a rear surface 100*b*, a left surface 100*c*, and a right surface 100*d*, as shown in FIGS. 42 and 43**.

Figure 46:
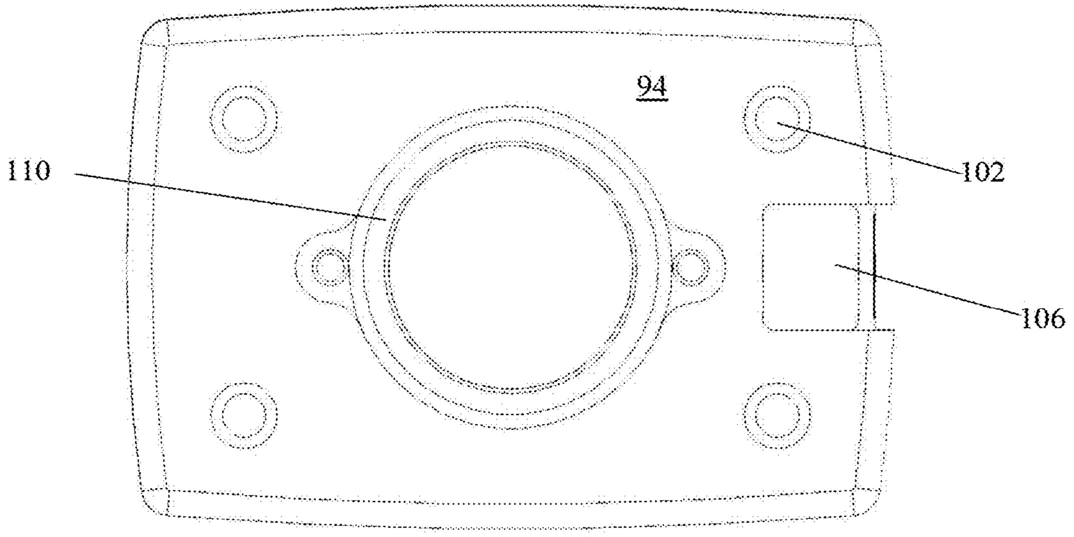
FIG. 46 is a bottom plan view of the bottom housing.

The bottom housing 94 has a cross-sectional shape. The cross-sectional shape may be any cross-sectional shape disclosed herein. The cross-sectional shape of the bottom housing 94 is the same cross-sectional shape of the top housing 12. FIGS. 45 and 46 depict a bottom housing 94 with a rectangle cross-sectional shape.

In an embodiment, the bottom housing 94 includes a plurality of threaded openings 102, as shown in FIGS. 45 and 46. A "threaded opening" is a void in the bottom housing 94 sized to receive a threaded fastener 114, such as a screw. The threaded opening 102 allows the threaded fastener, or a portion of the threaded fastener 114, to extend through the wall 104 of the bottom housing 94. In an embodiment, the threaded openings 102 of the bottom housing 94 align with the threaded openings 84 of the rubber seal 78, which align with the threaded openings 38 of the PCBA 24, which align with the threaded openings 56 of the button pad 48, which align with the threaded connector 22 of the top housing 12 such that a threaded fastener 114 may extend through the bottom housing 94, the rubber seal 78, the PCBA 24, and the button pad 48 and connect to the top housing 12. In an embodiment, the threaded opening 102 has a narrow diameter portion and a wide diameter portion such that a portion of the threaded fastener 114 (e.g., the head of a screw) cannot extend through the wall 104 of the bottom housing 94. In an embodiment, the bottom housing 94 includes from 2, or 3 to 4, or 5, or 6 threaded openings 102. In an embodiment, the bottom housing 94 includes four threaded openings 102.

In an embodiment, the bottom housing 94 includes a recharging port opening 106, as shown in FIGS. 45 and 46. The "recharging port opening" is a void in the wall 104 of the bottom housing 94 sized to receive a recharging port cover 90. The recharging port opening 106 in the bottom housing 94 is aligned with the recharging port opening 88 in the rubber seal 78.

Figure 47:
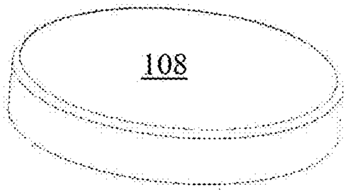
FIG. 47 is a perspective view of a magnet in accordance with an embodiment of the present disclosure.

In an embodiment, the bottom housing 94 includes a magnet 108. A nonlimiting example of a suitable magnet is shown in FIG. 47. The magnet has a shape. Nonlimiting examples of suitable shapes include square prism, rectangular prism, cylinder, frustum, pentagonal prism, trapezium prism, pyramid, and combinations thereof. FIG. 47 depicts a magnet 108 with a cylinder shape.

A safety light 10 that includes a magnet 108 may advantageously be magnetically coupled to a magnetic material or a magnetic article. Nonlimiting examples of magnetic articles include automobiles, motorcycles, bicycles, stands containing a magnet, helmets, helmet mounts, boats (e.g., kayaks, motorboats, and canoes), and mounting plates. A nonlimiting example of a mounting plate is the mounting plate disclosed in U.S. Pat. No. 9,478,108, the entire disclosure of which is incorporated by reference herein. An article may be disposed between the magnet 108 and the magnetic material or magnetic article. For example, a user's clothing item (e.g., a jacket or a shirt) may be disposed between the mounting plate and the magnet 108, wherein the magnet 108 is coupled to the mounting plate through the user's clothing item—thereby releasably attaching the safety light 10 to the user's clothing. Nonlimiting examples of suitable articles include clothing, helmets, backpacks, belts, tents, windows, boats (e.g., boat siding), containers, road signs, and combinations thereof. However, in other embodiments, a safety light may not include a magnet.

A nonlimiting example of a suitable magnet 108 is neodymium iron boron. In an embodiment, the magnet 108 is substantially encapsulated, or fully encapsulated, in a waterproof coating, such as a silicone coating.

In an embodiment, the bottom housing 94 includes a magnet bracket 110, as shown in FIGS. 42 and 44. A "magnet bracket" is a projection sized to receive and retain the magnet 108. As shown in FIGS. 43 and 44, the magnet bracket 110 includes a void in the wall 104 of the bottom housing 94, the void having a diameter that is less than the diameter of the magnet 108. The magnet bracket 110 and the bottom housing 94 may have an integral design or a composite design. In other embodiments, a safety light may not include a magnet bracket and a magnet may instead be disposed within the safety light (e.g., between a top housing and a bottom housing so that it is flush with or behind an exterior surface of the safety light (e.g., a bottom surface of a bottom housing).

Figure 61:
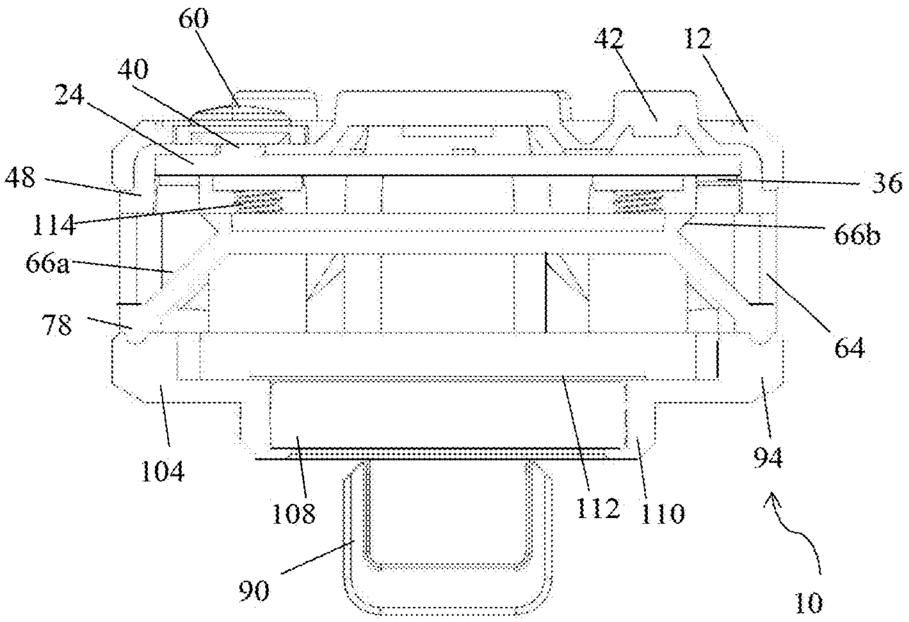
FIG. 61 is a left cross-sectional view of the safety light taken along line B-B of FIG. 56.
Figure 62:
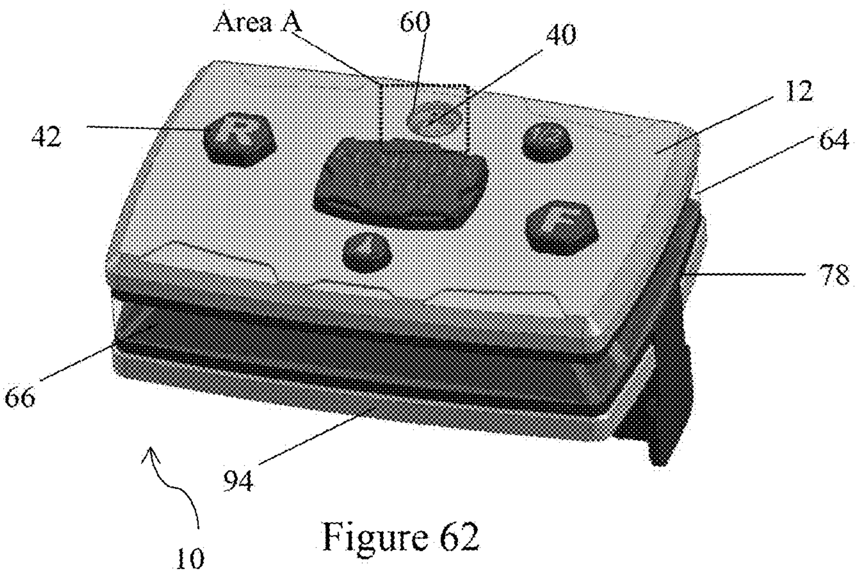
FIG. 62 is a top perspective view of a safety light in accordance with another embodiment of the present disclosure.
Figure 63:
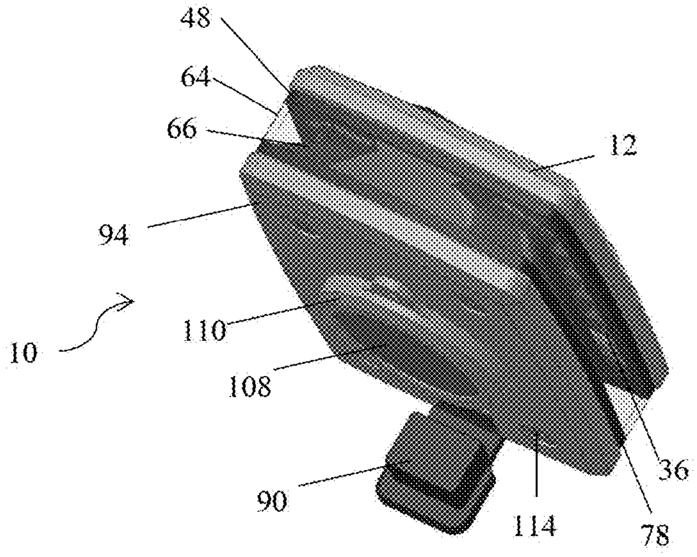
FIG. 63 is a bottom perspective view of the safety light.
Figure 64:
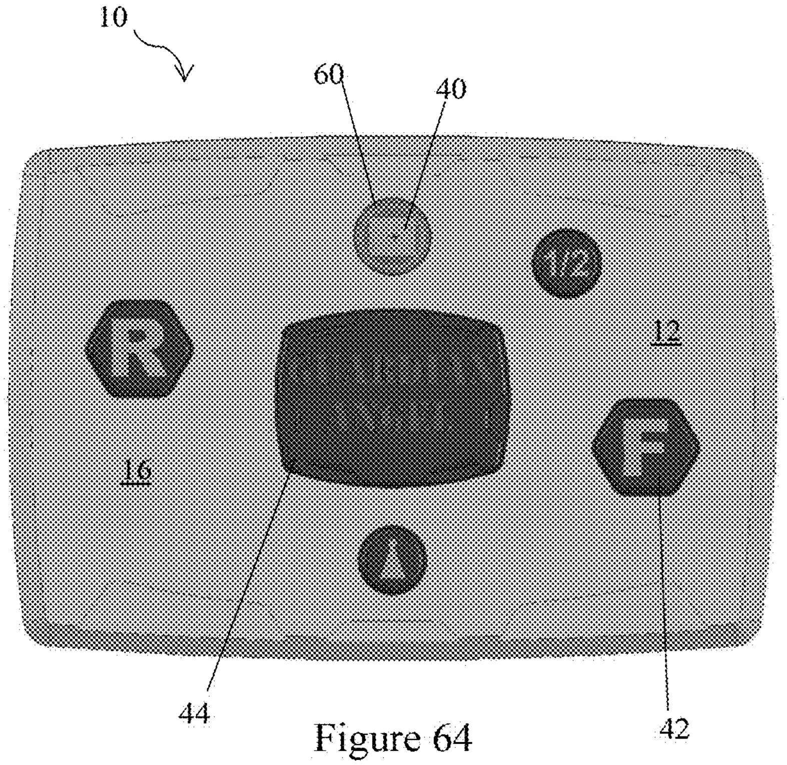
FIG. 64 is a top plan view of the safety light.

The magnet bracket 110 and the magnet 108 have reciprocal shapes. For example, when the magnet 108 has a cylinder shape, the magnet bracket 110 has a cylinder shape sized to receive and retain the magnet 108, as shown in FIG. 61.

In an embodiment, the magnet 108 is coupled to the magnet bracket 110. In another embodiment, the magnet 108 is coupled to the bottom surface 82 of the rubber seal 78. In an embodiment, the magnet 108 is coupled to the bottom surface 82 of the rubber seal 78 via an adhesive 112, as shown in FIGS. 48, 49, 59, and 61.

The bottom housing 94 may comprise two or more embodiments disclosed herein.

J. Safety Light

The present disclosure provides a safety light 10, as shown in FIGS. 1 and 50-69. The safety light 10 includes a top housing 12 having a wall 14 and a PCBA 24 coupled to the top housing 12, the PCBA 24 having a top surface 26 and a bottom surface 28. The safety light 10 also includes a plurality of light elements 36 coupled to the bottom surface 28 of the PCBA 24 and the PCBA 24 is programmed to energize the plurality of light elements 36 following depression of a first control button 42. The safety light 10 includes a lens 64 coupled to the bottom surface 28 of the PCBA 24 and the plurality of light elements 36, the lens 64 having a first angled reflective surface 66*a* and a plurality of side surfaces 68. The safety light 10 also includes a bottom housing 94 coupled to the lens 64. Accordingly, the lens 64 is arranged between the top housing 12 and the bottom housing 94 so that the side surfaces 68 extend between the top housing 12 and the bottom housing 94. In an embodiment, the safety light also includes a beacon light element 40 coupled to the top surface 26 of the PCBA 24; and a beacon light lens 60 coupled to the beacon light element 40, the beacon light lens 60 extending through the wall 14 of the top housing 12, wherein the PCBA 24 is programmed to energize the beacon light element 40 following depression of a second control button 42*b*.

Figure 48:
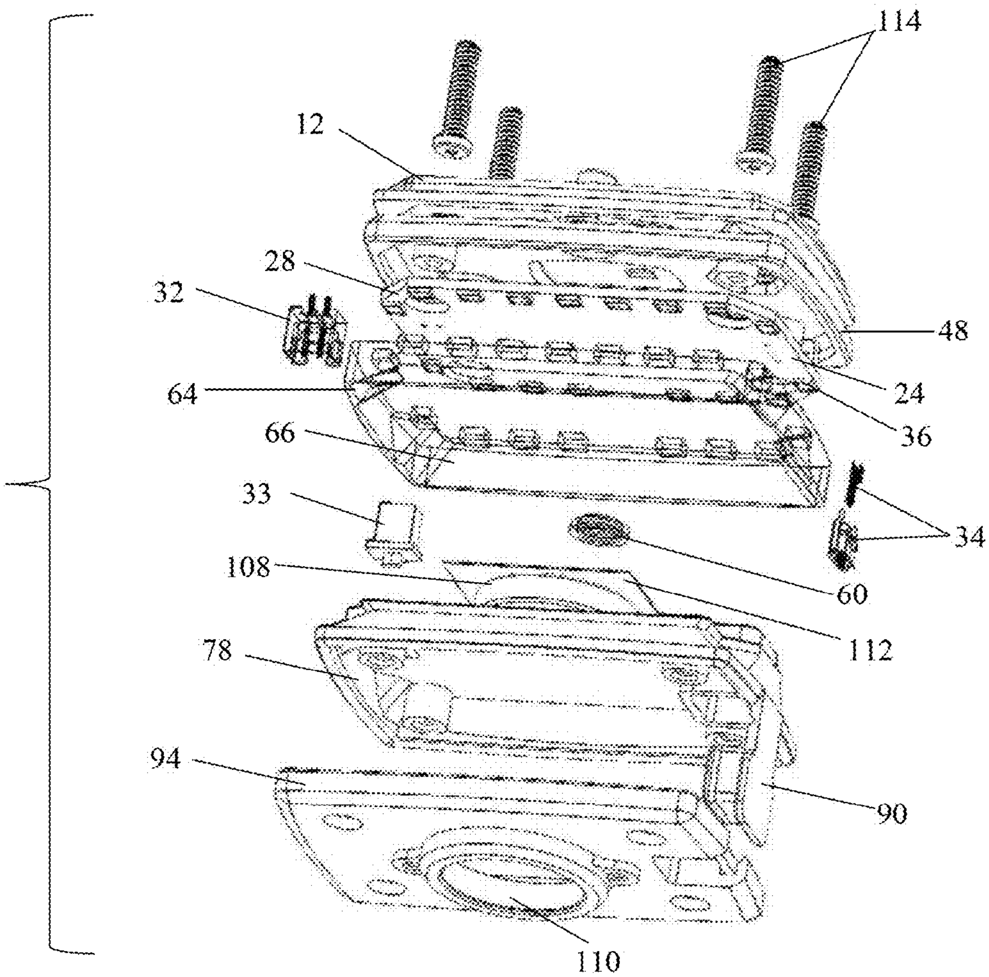
FIG. 48 is an exploded bottom perspective view of a safety light in accordance with an embodiment of the present disclosure.
Figure 49:
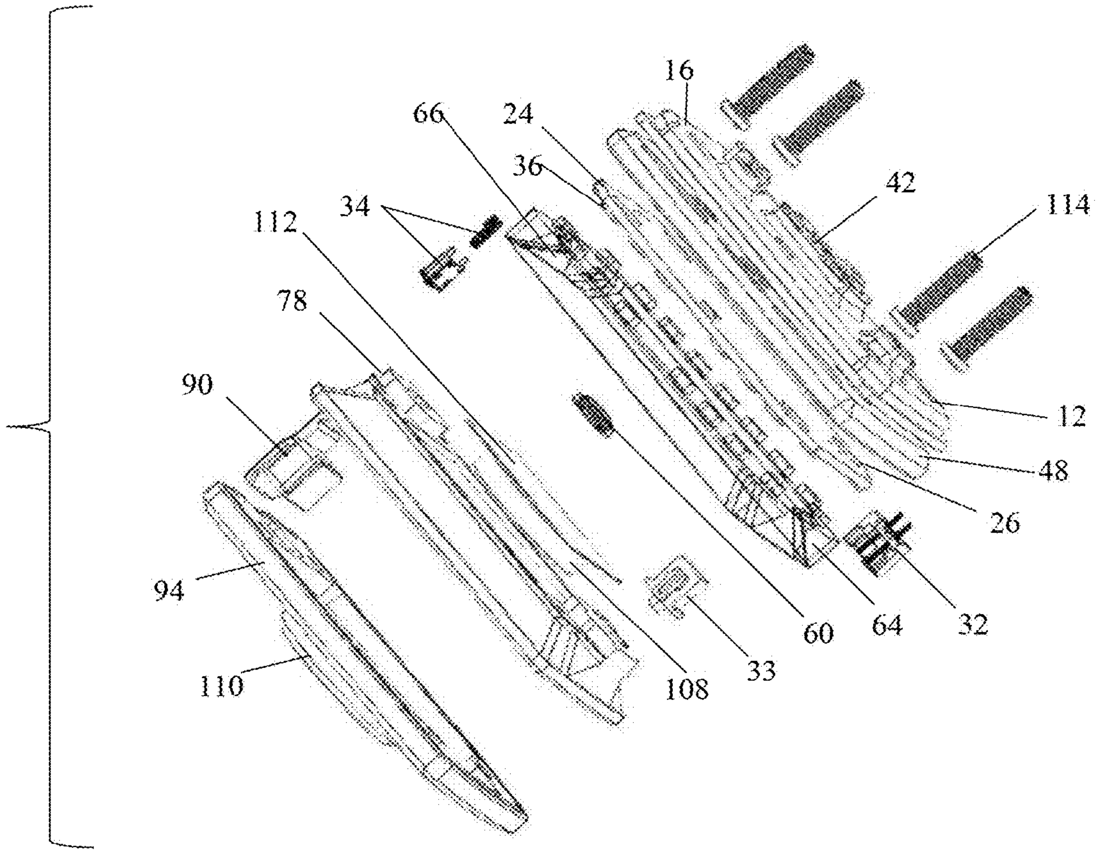
FIG. 49 is an exploded top perspective view of a safety light in accordance with an embodiment of the present disclosure.

FIGS. 48 and 49 depict exploded views of an embodiment of the present safety light 10.

In an embodiment, safety light 10 includes a top housing 12 with a wall 14 and a PCBA 24 coupled to the top housing 12. The PCBA 24 includes a top surface 26, a bottom surface 28, and a rechargeable power source 32. The safety light 10 also includes a plurality of light elements 36 coupled to the bottom surface 28 of the PCBA 24 and the PCBA 24 is programmed to energize a first group 36*a* of the plurality of light elements 36 following depression of a first control button 42*a* and a second group 36*b* of the plurality of light elements 36 following depression of a second control button 42*b*. The safety light 10 has a beacon light element 40 coupled to the top surface 26 of the PCBA 24 and the PCBA 24 is programmed to energize the beacon light element 40 following depression of a third control button 42*c*. A beacon light lens 60 is coupled to the beacon light element 40, the beacon light lens 60 extending through the wall 14 of the top housing 12. A lens 64 is coupled to the bottom surface 28 of the PCBA 24 and the plurality of light elements 36, the lens 64 having a first angled reflective surface 66*a*, a bottom reflective surface 72, and a plurality of side surfaces 68, and the angle, X, between the bottom reflective surface 72 and the first angled reflective surface 66*a* is from 110° to 150°. The safety light 10 also includes a bottom housing 94 coupled to the lens 64, the bottom housing 94 containing a magnet 108.

Figure 71:
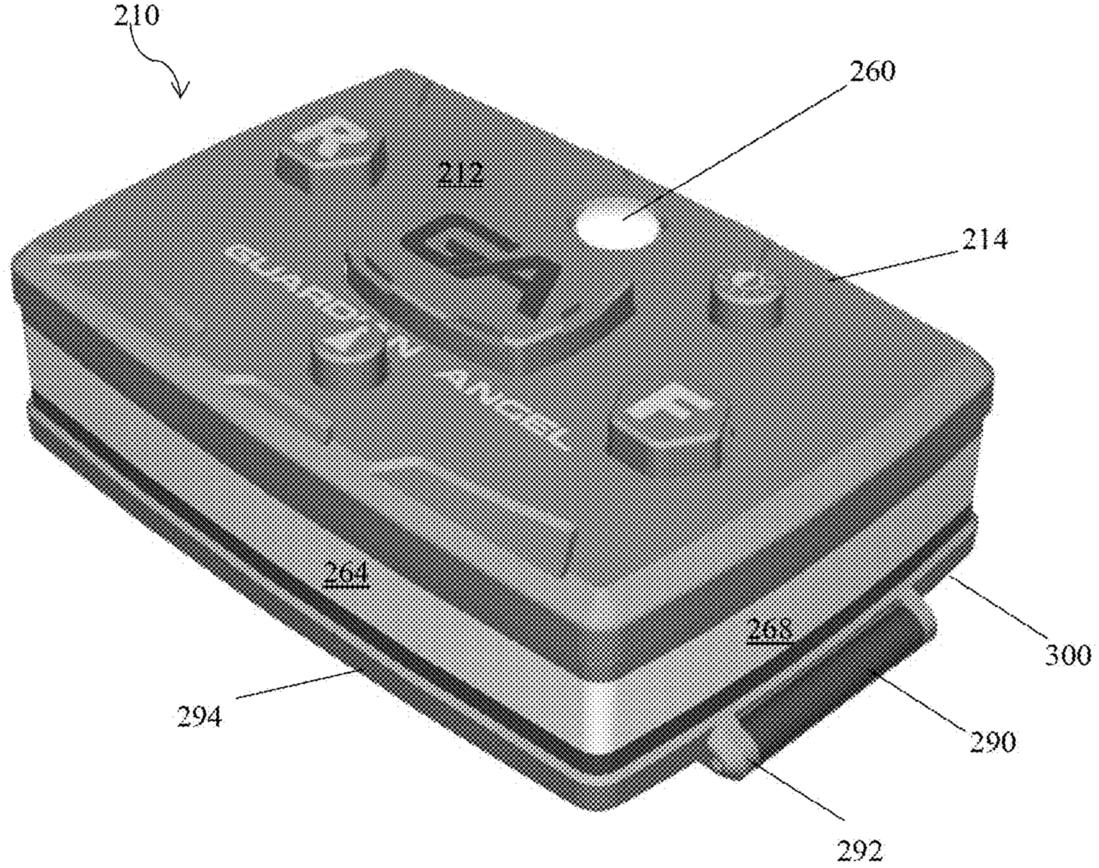
FIG. 71 is a top perspective view of a safety light in accordance with another embodiment of the present disclosure.
Figure 72:
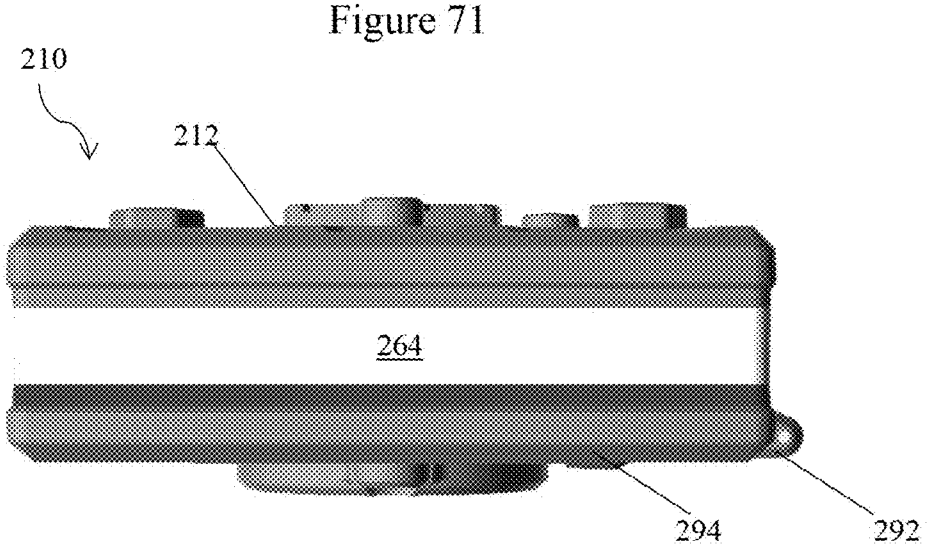
FIG. 72 is a front elevation view of the safety light.
Figure 73:
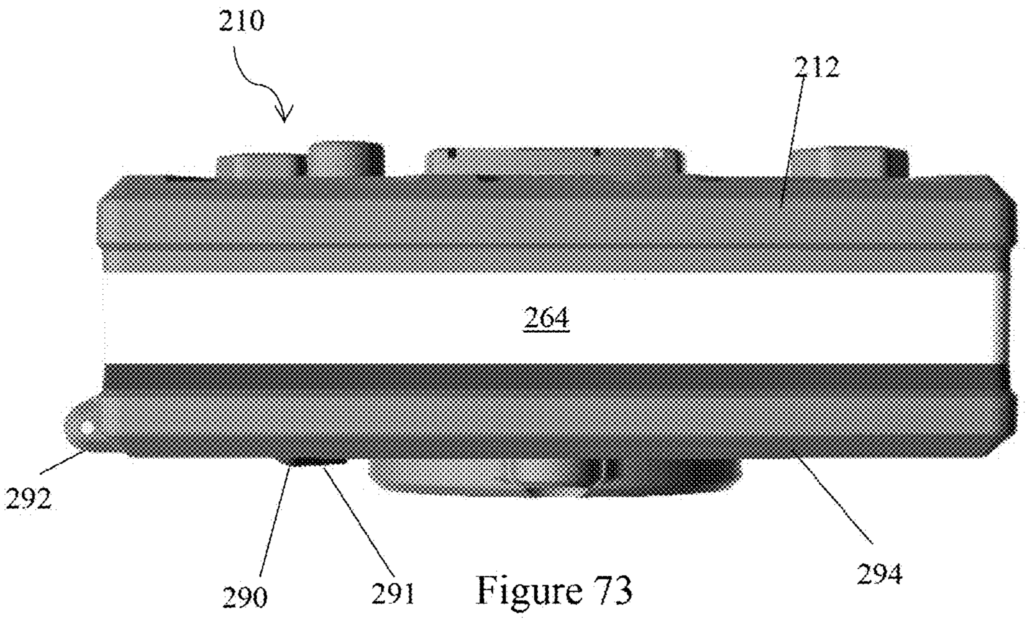
FIG. 73 is a rear elevation view of the safety light.
Figure 74:
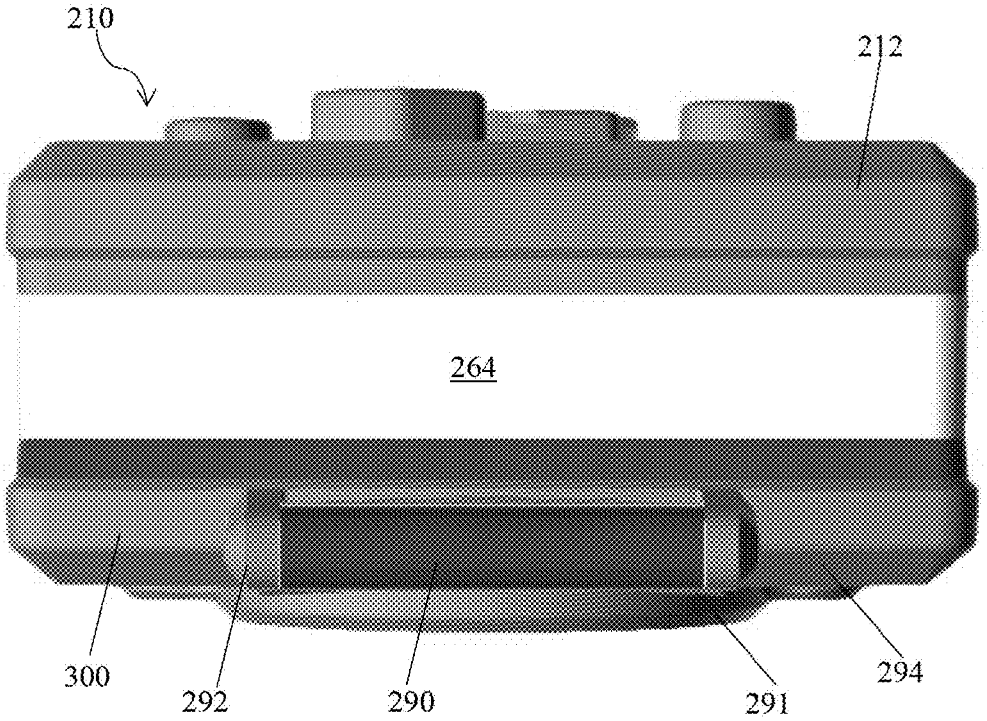
FIG. 74 is a right elevation view of the safety light.
Figure 75:
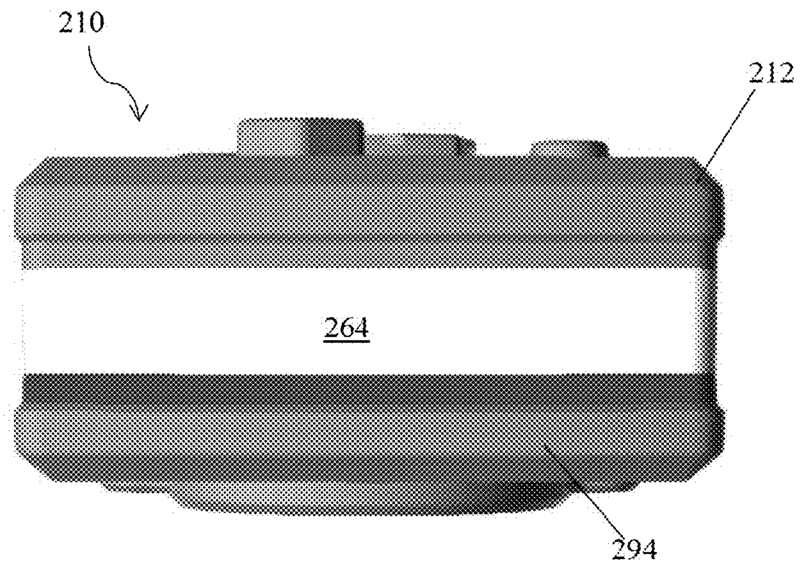
FIG. 75 is a left elevation view of the safety light.
Figure 76:
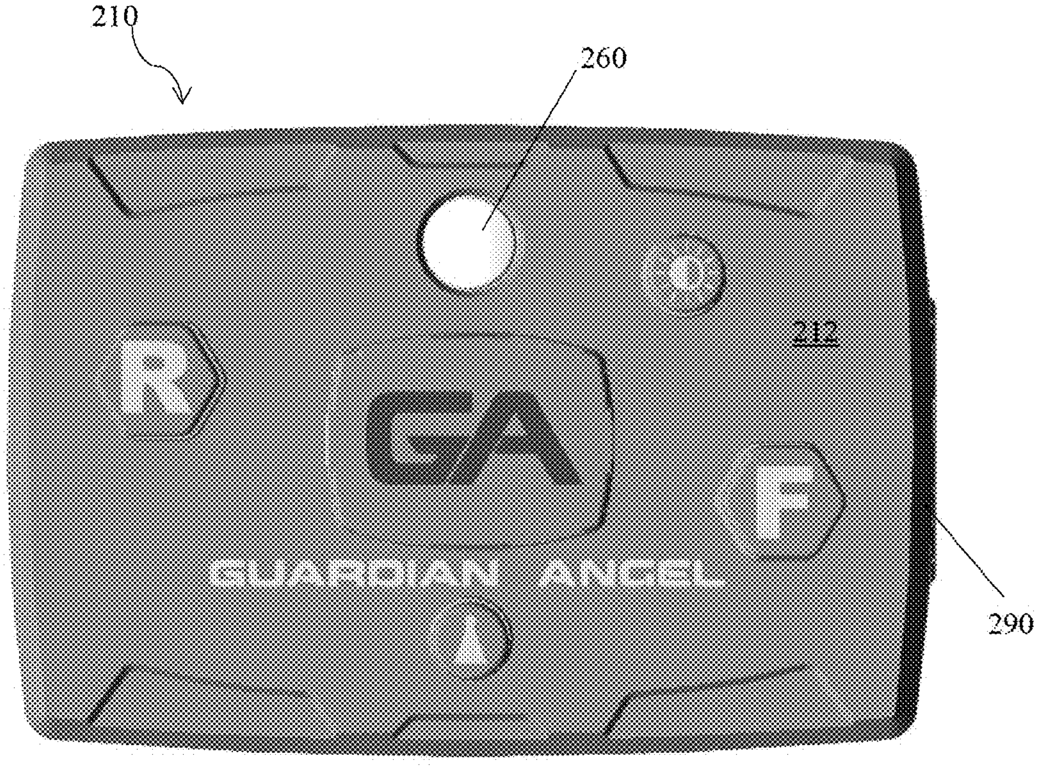
FIG. 76 is a top plan view of the safety light.
Figure 77:
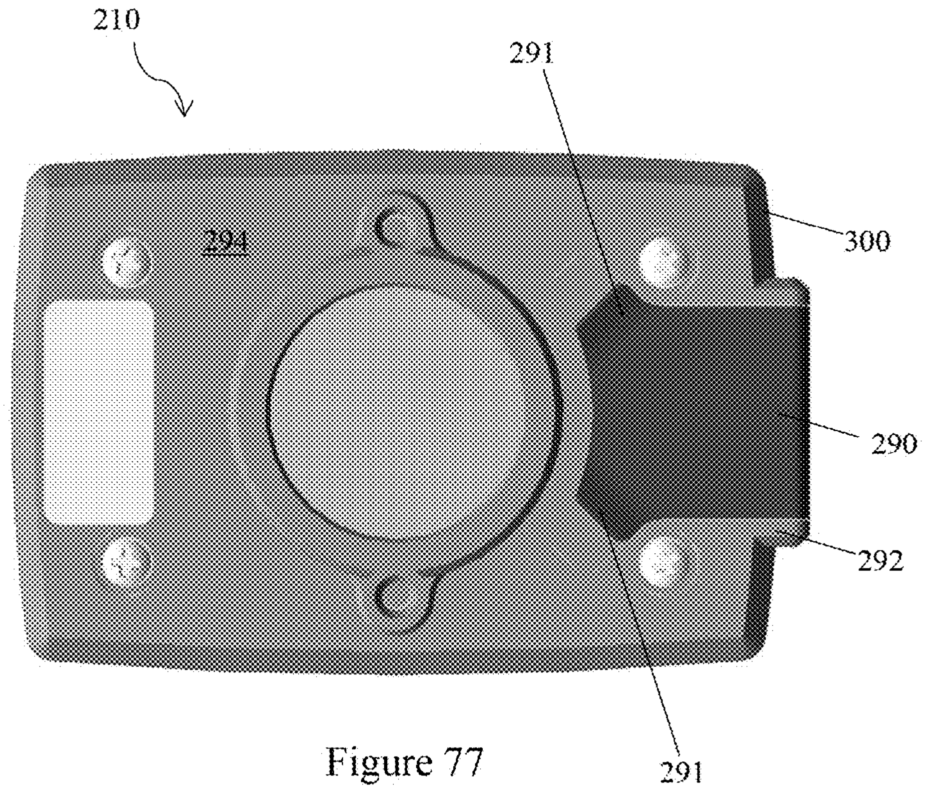
FIG. 77 is a bottom plan view of the safety light.
Figure 78:
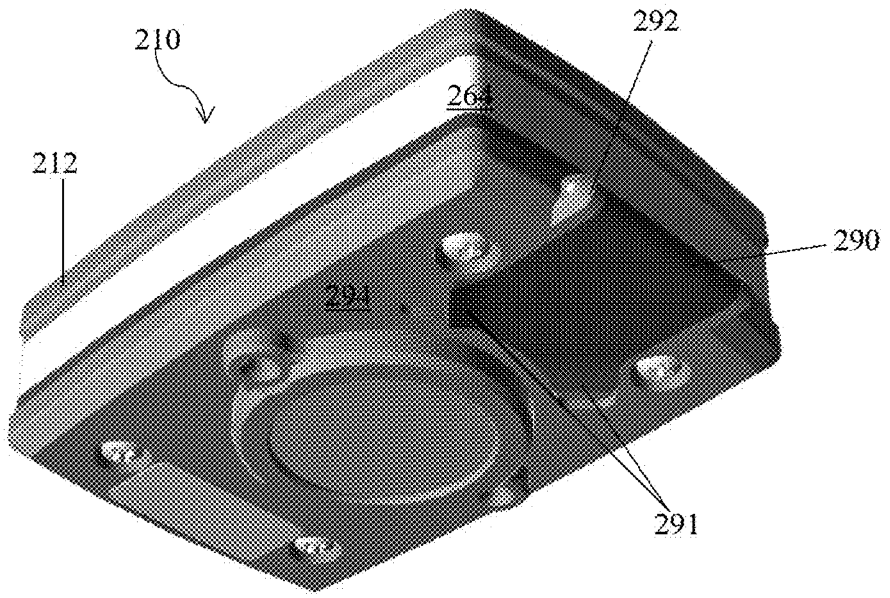
FIG. 78 is a bottom perspective view of the safety light.
Figure 79:
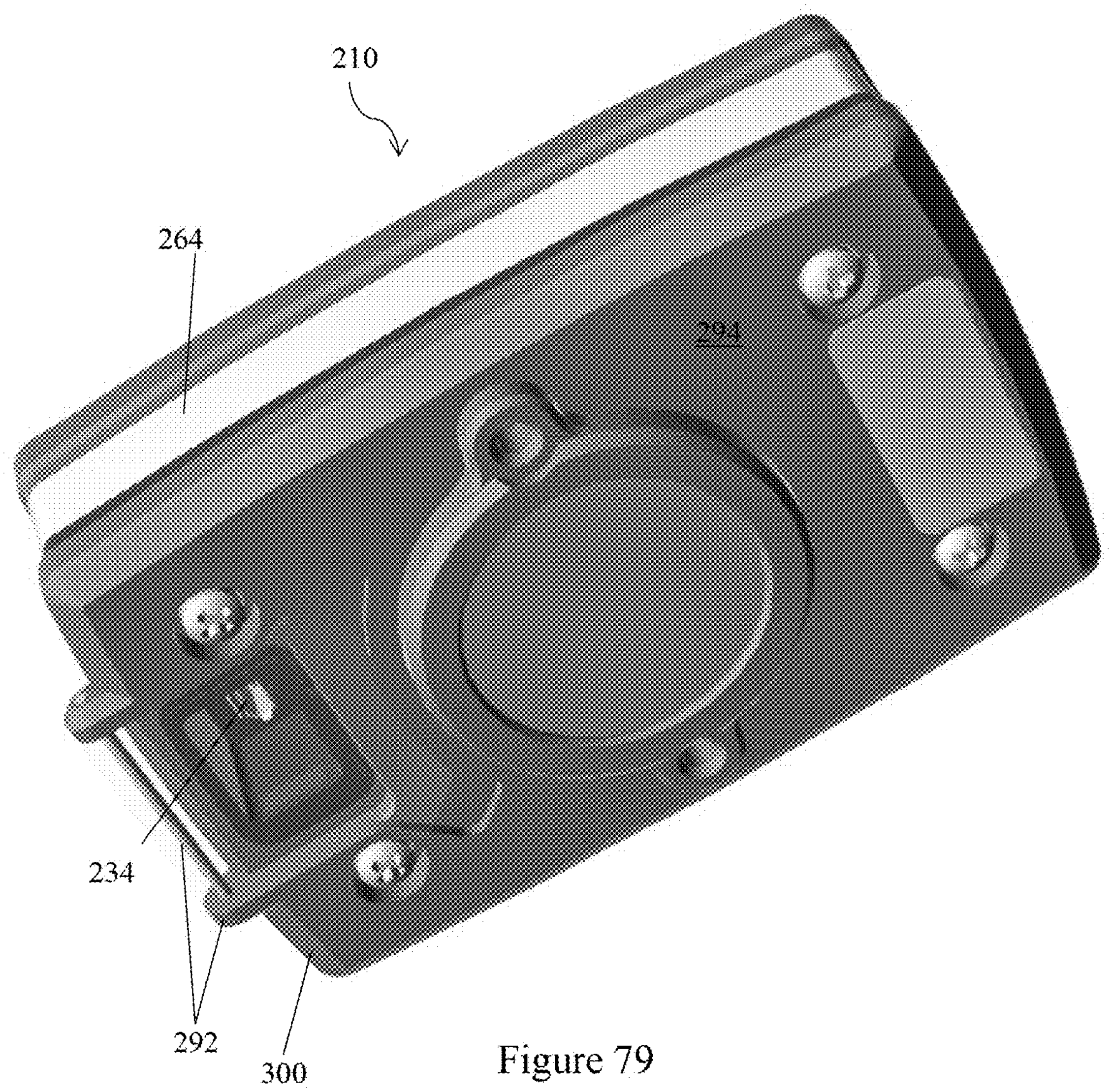
FIG. 79 is a bottom perspective view of the safety light in accordance with another embodiment of the present disclosure.

In an embodiment, the present disclosure provides a safety light 210, as shown in FIGS. 71-79. The safety light 210 includes a top housing 212 with a wall 214; a PCBA coupled to the top housing 212, the PCBA having a top surface and a bottom surface; a plurality of light elements coupled to the bottom surface of the PCBA; a lens 264 coupled to the bottom surface of the PCBA and the plurality of light elements, the lens 264 having a first angled reflective surface and a plurality of side surfaces 268; and a bottom housing 294 coupled to the lens 264. The bottom housing 294 includes a hinge 292, as shown in FIGS. 71 and 79. The hinge 292 is a projection extending from a bottom housing side surface 300. The hinge 292 is sized to receive a recharging port cover 290. FIGS. 77 and 78 depict a recharging port cover 290 that is attached to hinge 292 extending from a side surface 300 of the bottom housing 294. The recharging port cover 290 may rotate about the axis of the hinge 292. In FIGS. 77 and 78, the recharging port cover 290 is in a closed position such that the recharging port cover 290 creates a protective seal over the recharging port 234 to prevent debris and moisture from entering the recharging port 234. As shown in FIGS. 72 and 78, the recharging port cover 290 may have one or more curved ends 291. The curved ends 291 enable a user to more easily grip the recharging port cover 290 to move the recharging port cover 290 from a closed position to an open position. In an embodiment, the recharging port cover includes two curved ends 291, as shown in FIGS. 77 and 78. FIG. 79 depicts the safety light 210 in which the recharging port cover 290 is removed. As shown in FIG. 79, the recharging port 234 is open to the environment when the recharging port cover 290 is absent, or is in an open position. In other embodiments, in particular, where the safety light 210 is configured for inductive charging, the recharging port 234 and the corresponding charging portion cover 290 may not be included, or they may be provided on another portion of the safety light (e.g., on the top housing 212 or a sidewall that extends between the top housing 212 and the bottom housing 294).

In an embodiment, the safety light 210 can be provided with one or more attachments 293 that can be configured to allow the safety light 210 to couple to a support structure, such as a mounting accessory (e.g., a bracket, clip, or strap) or an external device (e.g., an electrical device such as a computer or charger). In that regard, the attachments can be configured to provide one or both of a physical connection and an electrical connection. Accordingly, the attachments 293 can be configured to orient the safety light 210 relative to an attached mounting accessory or external device, to provide a secure connection between an attached mounting accessory or external device (e.g., electronic devices including, general purpose computers, phones, vehicles, docking terminals, etc.), and to allow for the communication of a data (e.g., communication signals, software, and firmware) and electrical power (e.g., electrical current). Relatedly, an attachment 293 can be provided as an insert that is embedded (e.g., inserted into or integrally formed in) the safety light 210, or it can be formed as a protrusion or other structure that extends from the safety light 210. The one or more attachments 293 can be provided anywhere along an outer surface of the safety light 210 and the specific arrangement may vary depending on the particular application. In some cases, attachments can be arranged to provide a universal mounting area as part of lighting system that allows the safety light 210 to couple to a wide array of mounting structures and external devices.

Figure 81:
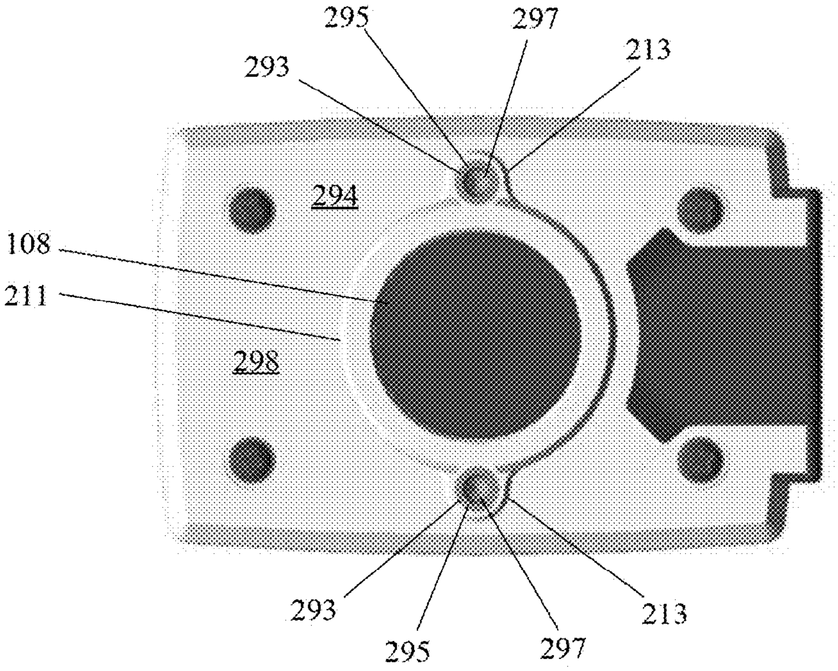
FIG. 81 is a bottom plan view of the safety light in accordance with another embodiment of the present disclosure.

As shown in FIG. 81, in an embodiment, the bottom housing 294 includes a plurality of attachments 293 disposed along a bottom surface 298 (e.g., an external surface) of the bottom housing 294, which can be configured to provide one or more physical attachment points. Specifically, each of the attachments 293 is a threaded attachment 295 having an exposed end 297, as shown in FIG. 81. The exposed end 297 is open to the environment and is configured to receive a threaded article (not shown). A "threaded attachment" is a component sized to receive a threaded article, such as a screw or a post. The threaded article may be any threaded fastener disclosed herein, including threaded articles that are part of a mounting accessory or external device. The threaded attachment 295 enables the safety light 210 to be releasably attached to a threaded article. As one particular nonlimiting example, in an embodiment, the threaded article is a post attached to a bicycle or a boat.

A threaded attachment 295 can be integrally formed with the bottom housing 294 or a threaded attachment 295 can be a separate component that is coupled to the bottom housing 294 (e.g., by a press fit connection, a threaded connection, adhesives, co-molding, ultrasonic welding, or other types of connections as known in the art). As illustrated, the threaded attachments 295 are formed from one or more rigid materials, such as metals (e.g., brass, stainless steel, etc.) and polymers, which are embedded within the bottom housing 294 so that the respective exposed ends 297 are open along the bottom surface 298 or another exterior surface (e.g., a side or top surface) of the bottom housing 294. Specifically, the threaded attachments 295 can be optionally disposed within ears 213 formed as part of a bracket 211 for a magnet 108. In accordance with the positioning of the ears 213, the threaded attachments 295 are shown being (symmetrically) spaced around a perimeter of the magnet 108 (e.g., equally and/or and circumferentially spaced). In other embodiments, the threaded attachments 295 may be arranged differently and their arrangement may not depend on a position of a magnet. For example, the threaded attachments 295 may be provided in separate projections extending from the bottom housing 294 (e.g., along the bottom surface 298), or they may not be disposed within any projection at all, and may instead be provided in one or more recesses. Additionally, the threaded attachments 295 can be spaced symmetrically or non-symmetrically along the bottom surface 298 of the bottom housing 294. In some cases, the arrangement of the threaded attachments 295 can provide for specific mounting orientations or configurations (e.g., a first orientation and a second orientation rotated approximately 90 degrees from the first orientation, or at another angle from the first orientation). Accordingly, in an embodiment, the bottom housing 294 includes from 1, or 2 to 3, or 4, or 5, or more than 5 threaded attachments 295. FIG. 81 shows a bottom housing 294 with two threaded attachments 295.

Figure 85:
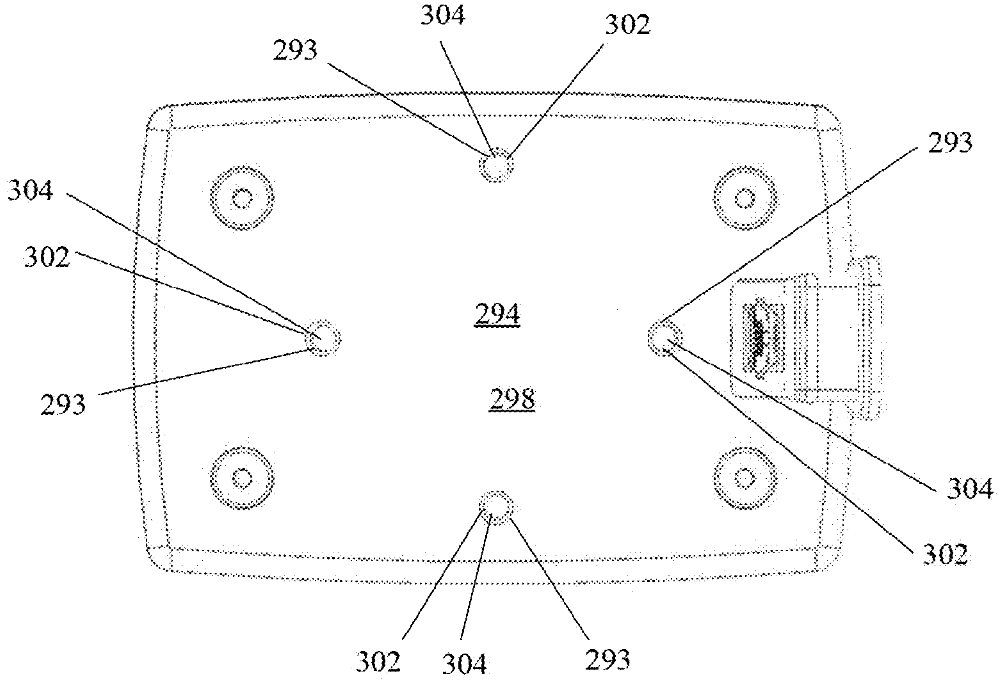
FIG. 85 is a bottom plan view of the safety light in accordance with another embodiment of the present disclosure.
Figure 86:
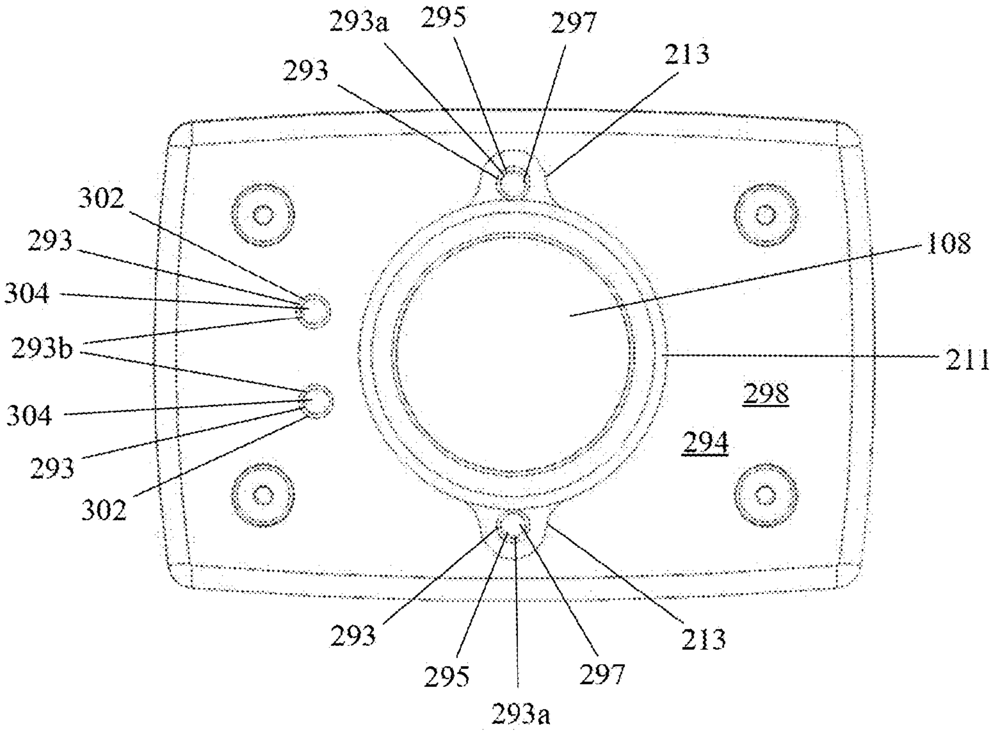
FIG. 86 is a bottom plan view of the safety light in accordance with another embodiment of the present disclosure.

As mentioned above, in an embodiment, attachments 293 can also be configured as electrodes (e.g., electrical attachments) that are configured to provide an electrical connection between the safety light 210 and a mounting accessory or another electrical device. As one particular example, the threaded attachment 295 can be brass threaded attachments that can provide both a physical connection and an electrical connection. As another example, in an embodiment shown in FIG. 85, the attachments 295 can be configured as electrodes 302 that are embedded into a bottom surface 298 of a bottom housing 294, such that an exposed end 304 of the electrode 302 is exposed to the environment. In the embodiment shown in FIG. 85, the there are four electrodes that are symmetrically spaced along the bottom surface 298 of the bottom housing 294, but the electrodes 302 can be arranged differently as required by a specific application. The electrodes 302 can extend through the bottom housing 294 to connect with a PCBA (not shown) and/or a rechargeable power source (not shown) of the safety light 210 (e.g., that are disposed within the safety light 210. In this way, the electrodes can be in electrical communication with one or both of the PCBA and a rechargeable power source, allowing an external device (e.g., a computer or charging delivery device) to communicate with safety light 210 and to charge the rechargeable power source. Relatedly, as shown in FIG. 86, in some cases, in particular, where electrodes can charge a rechargeable power source and allow an external device to communicate with the safety light, a separate recharging or communication port (e.g., recharging port 234, see FIG. 71) may not be included.

In an embodiment, a safety light may be provided with both attachments that are configured to provide a physical connection (e.g. a physical attachment, for example, a snap-fit, threaded, or magnetic connection) that secures the safety light to a mounting accessory, external device, other support structure (e.g., to a vehicle, a hard hat, a building, etc.), and attachments that are configured to provide an electrical connection (e.g., to send communication signals, to transfer electrical power, or to send data, including software and firmware). In that regard, attachments can be arranged into different groups to facilitate different types of connections when coupled to different type of mounting structures or external devices. As used herein, a "group" is defined to include one or more structures or elements. For example, in an embodiment, shown in FIG. 86, a bottom housing 294 includes two groups of attachments 293. In particular, the bottom housing 294 includes a first group of attachments 293*a* that includes threaded attachments 295 and a second group of attachments 293*b* that includes electrodes 302. In other embodiments, attachments can be grouped differently and may include, for example, both electrodes and threaded attachments.

In an embodiment, the plurality of light elements 36 emit a light directed away from the bottom surface 28 of the PCBA 24 and the light reflects off of the first angled reflective surface 66*a* of the lens 64, 264 and projects through the plurality of side surfaces 68, 268 of the lens 64, 264.

In an embodiment, the safety light 10, 210 is capable of projecting light through each of the lens side surfaces 68 (68*a*, 68*b*, 68*c*, 68*d*) (268). In another embodiment, the safety light 10, 210 is capable of projecting light through each of the lens side surfaces 68 (68*a*, 68*b*, 68*c*, 68*d*) (268) and the beacon light lens 60 (260 in FIG. 71).

In an embodiment, the safety light 10, 210 is configured to emit audio signals.

In an embodiment, the safety light 10, 210 is configured with GPS capability.

In an embodiment, the safety light 10, 210 further includes a securing mechanism (not shown) coupled to the top housing 12, 212 and/or the bottom housing 94, 294.

Nonlimiting examples of securing mechanisms include pins, clips, clamps, clasps, belts, snaps, ties, lanyards, Velcro, and combinations thereof.

In an embodiment, the safety light 10, 210 is wearable. A "wearable" safety light is capable of being attached to a user, such as to a user's clothing, helmet, or accessory (e.g., a backpack).

In an embodiment, the safety light 10, 210 is coupleable to a magnetic article (e.g., a magnetic mounting accessory).

In an embodiment, the safety light 10, 210 has a weight of from 50 grams (g), or 60 g, or 70 g, or 75 g to 80 g, or 85 g, or 90 g, or 100 g, or 120 g, or 150 g.

Figure 50:
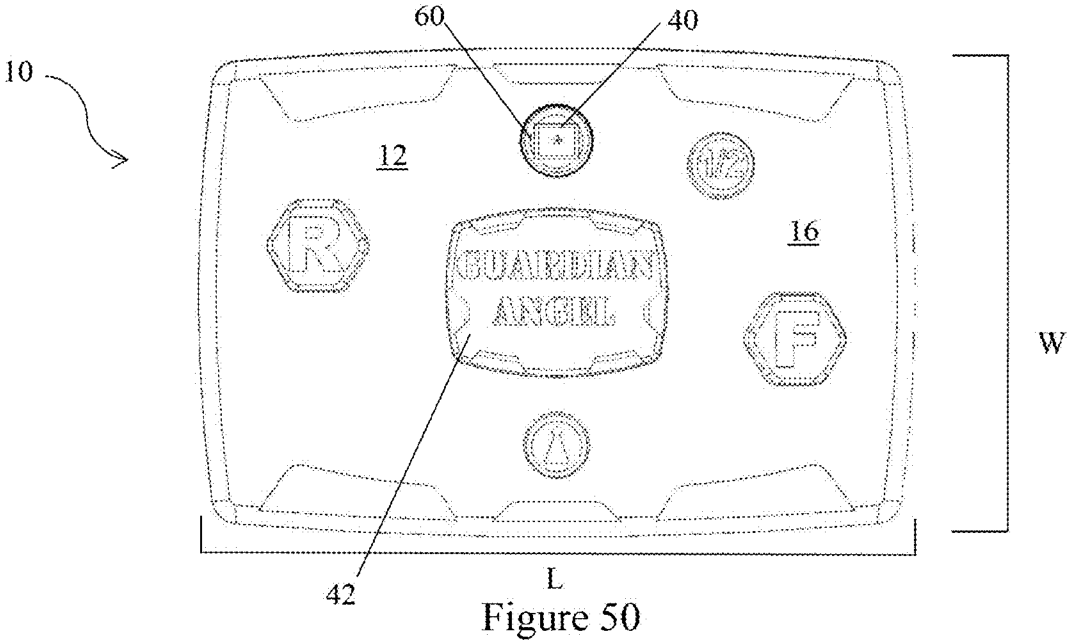
FIG. 50 is a top plan view of a safety light in accordance with an embodiment of the present disclosure.
Figure 51:
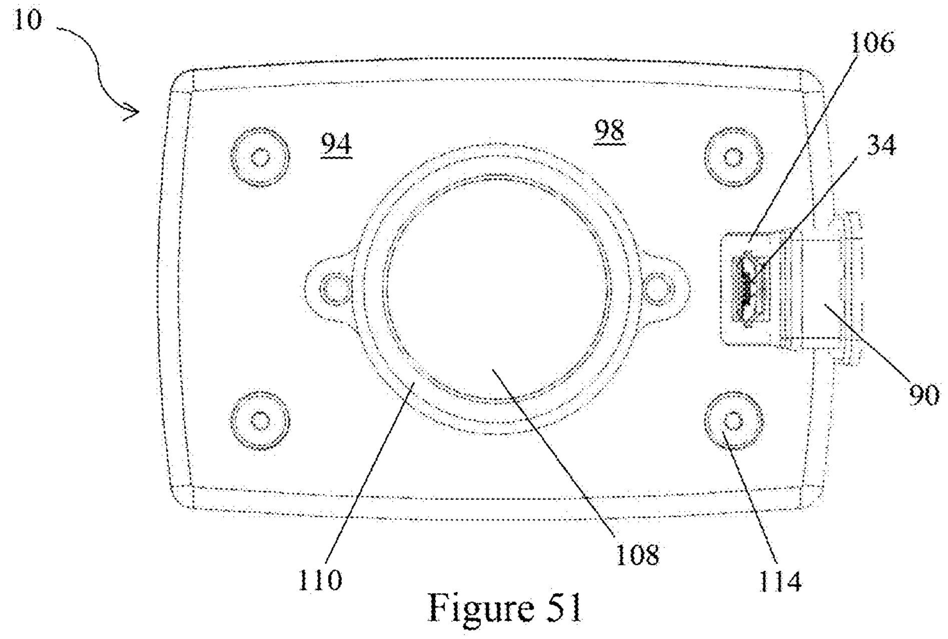
FIG. 51 is a bottom plan view of the safety light.

The safety light 10, 210 has a length, L, as shown in FIG. 50. In an embodiment, the safety light 10, 210 has a length, L, from 2.54 cm (1 inch (in)) to 91.44 cm (36 in). In an embodiment, the safety light 10, 210 has a length, L, from 2.54 cm (1 in), or 3.81 cm (1.5 in) to 5.08 cm (2 in), or 6.35 cm (2.5 in), or 7.62 cm (3 in), or 8.89 cm (3.5 in), or 10.16 cm (4 in), or 11.43 cm (4.5 in), or 12.7 cm (5 in), or 13.97 cm (5.5 in), or 15.24 cm (6 in). In another embodiment, the safety light 10, 210 has a length, L, from 10.16 cm (4 in), or 11.43 cm (4.5 in), or 12.7 cm (5 in), or 13.97 cm (5.5 in), or 15.24 cm (6 in), or 25.4 cm (10 in) to 30.48 cm (12 in), or 35.56 cm (14 in), or 38.1 cm (15 in), or 40.64 cm (16 in), or 45.72 cm (18 in), or 50.8 cm (20 in), or 60.96 cm (24 in), or 76.2 cm (30 in), or 81.28 cm (32 in), or 91.44 cm (36 in).

The safety light 10, 210 has a width, W, as shown in FIG. 50. In an embodiment, the safety light 10, 210 has a width, W, from 0.635 cm (0.25 in) to 30.48 cm (12 in). In an embodiment, the safety light 10, 210 has a width, W, from 0.635 cm (0.25 in), or 1.27 cm (0.5 in), or 1.905 cm (0.75 in) to 2.54 cm (1 in), or 3.81 cm (1.5 in), or 5.08 cm (2 in), or 7.62 cm (3 in), or 8.89 cm (3.5 in), or 10.16 cm (4 in). In another embodiment, the safety light 10, 210 has a width, W, from 7.62 cm (3 in), or 8.89 cm (3.5 in), or 10.16 cm (4 in), or 12.7 cm (5 in) to 13.97 cm (5.5 in), or 15.24 cm (6 in), 16.51 cm (6.5 in), or 17.78 cm (7 in), or 19.05 cm (7.5 in), or 20.32 cm (8 in), or 21.59 cm (8.5 in), or 22.86 cm (9 in), or 24.13 cm (9.5 in), or 25.4 cm (10 in), or 27.94 cm (11 in), or 30.48 cm (12 in).

Figure 52:
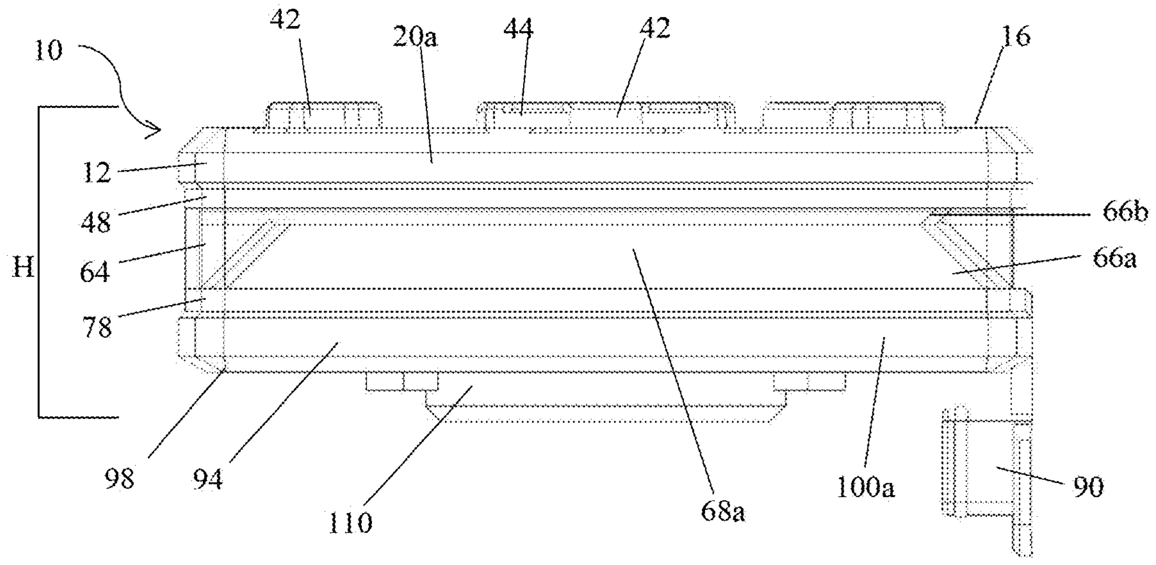
FIG. 52 is a front elevation view of the safety light.
Figure 53:
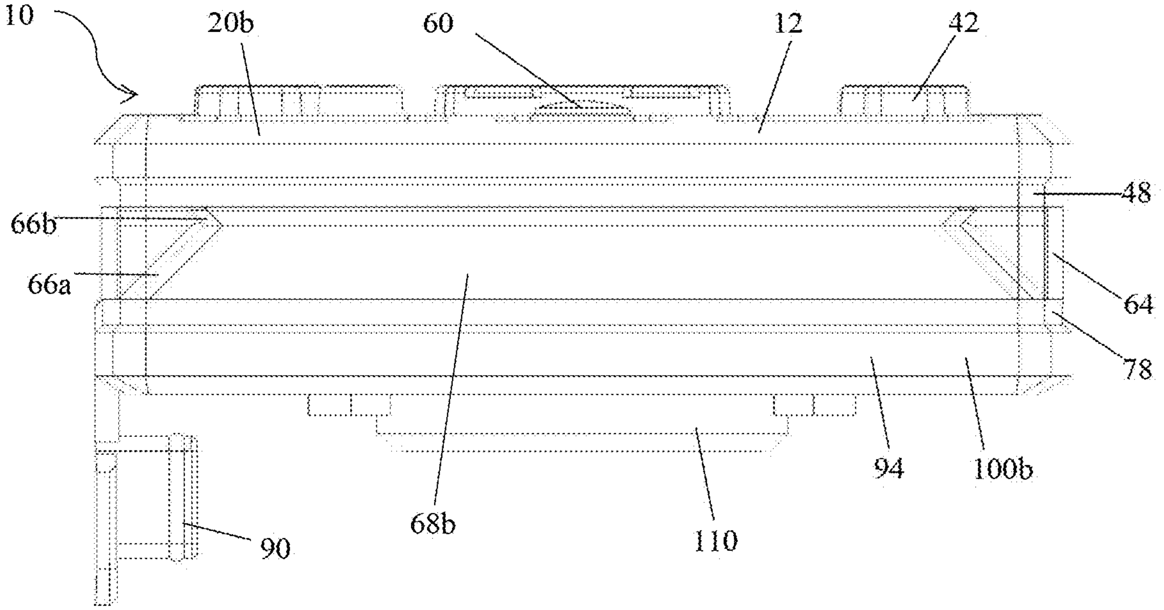
FIG. 53 is a rear elevation view of the safety light.
Figure 54:
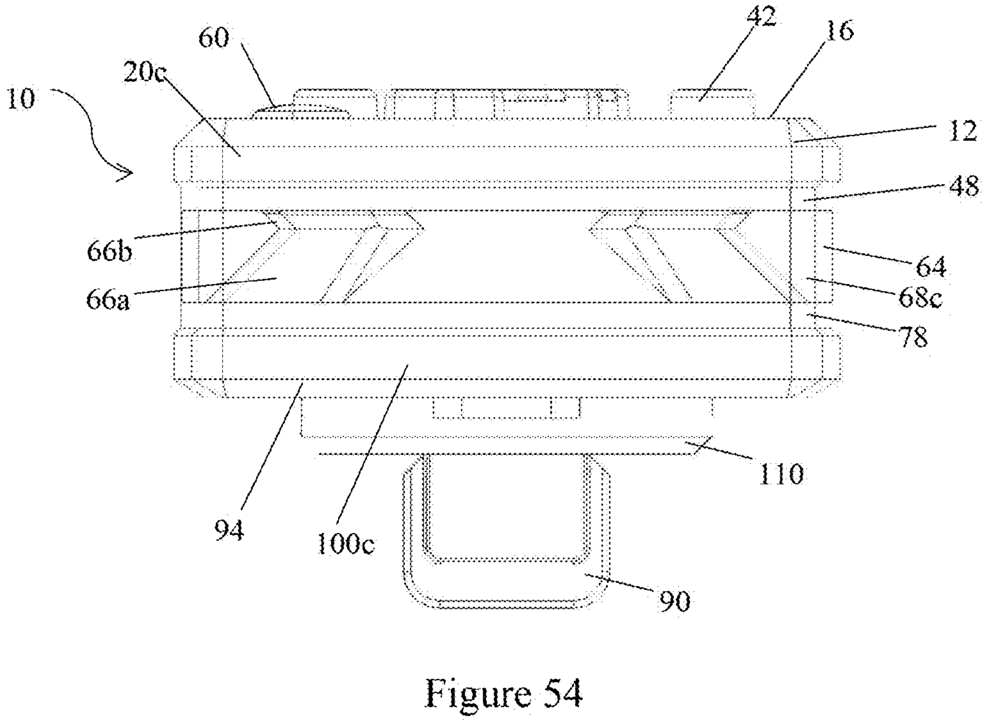
FIG. 54 is a left elevation view of the safety light.
Figure 55:
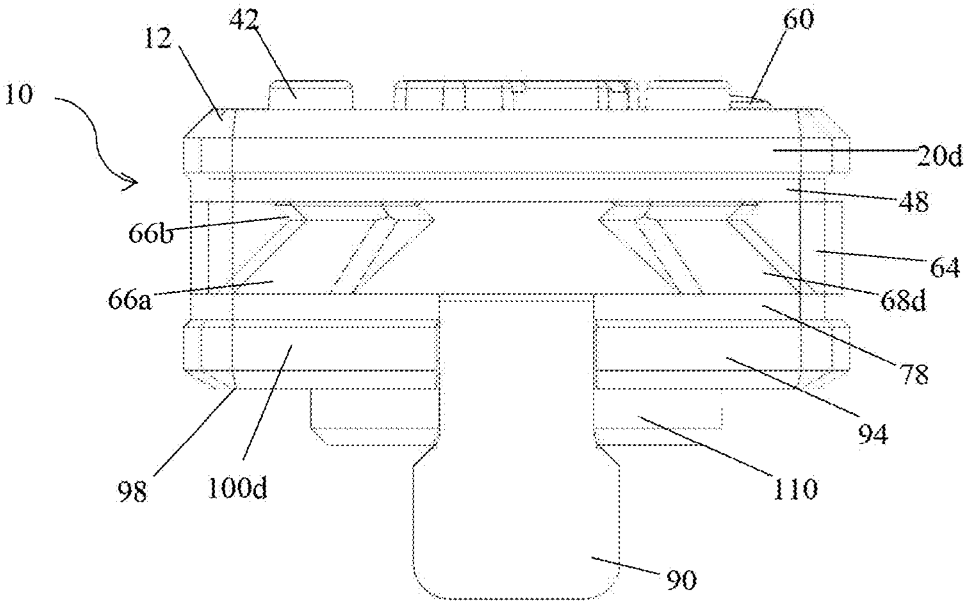
FIG. 55 is a right elevation view of the safety light.
Figure 56:
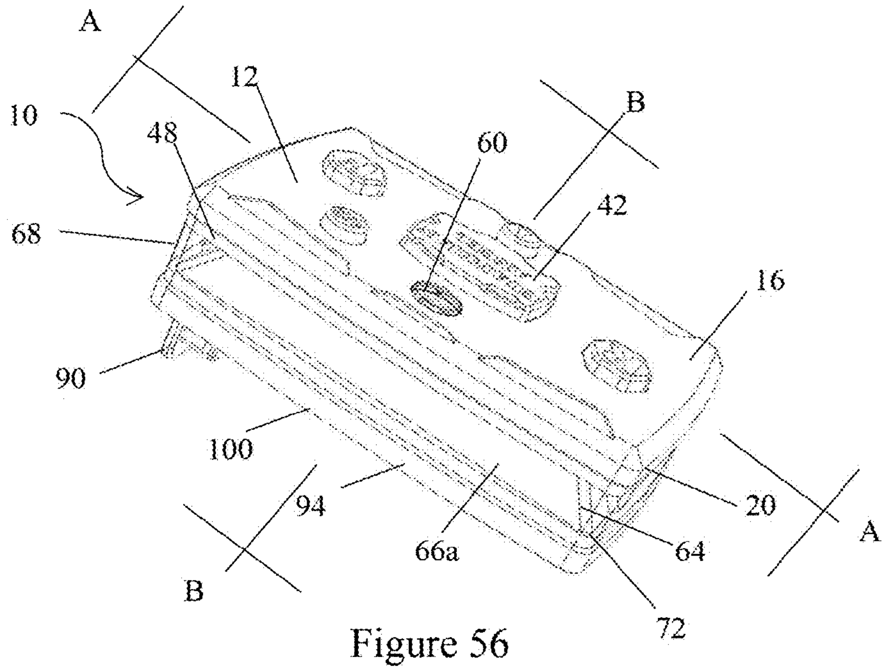
FIG. 56 is a rear top perspective view of the safety light.
Figure 57:
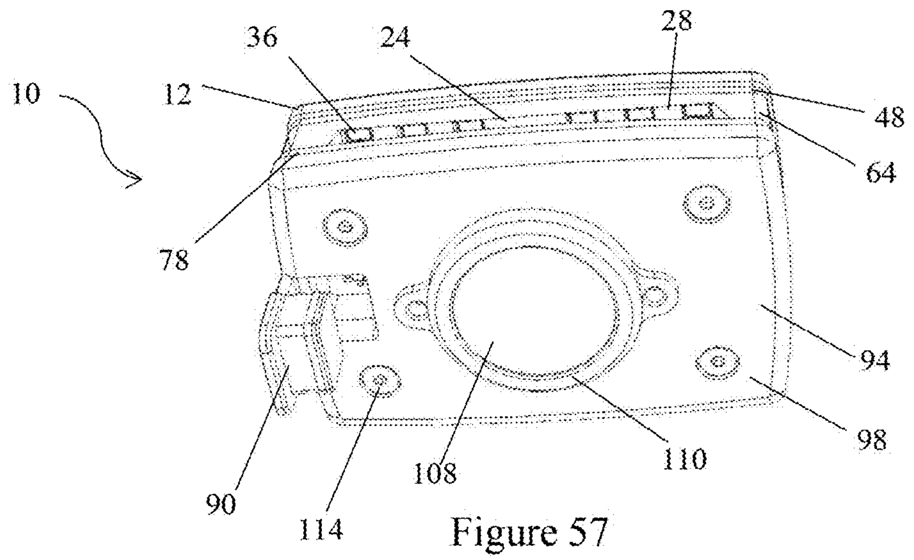
FIG. 57 is a rear bottom perspective view of the safety light.
Figure 58:
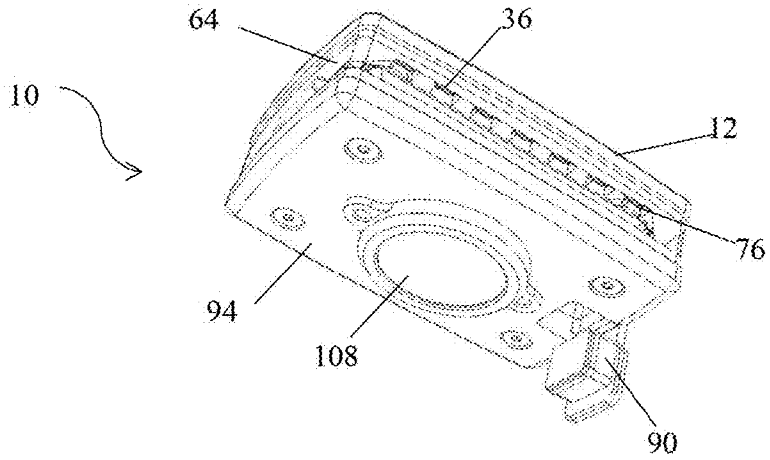
FIG. 58 is a front bottom perspective view of the safety light.

The safety light 10, 210 has a height, H, as shown in FIG. 52. The height, H, of the safety light 10, 210 excludes the height of the recharging port cover 90. In an embodiment, the safety light 10, 210 has a height, H, from 0.635 cm (0.25 in) to 30.48 cm (12 in). In an embodiment, the safety light 10, 210 has a height, H, from 0.635 cm (0.25 in), or 1.27 cm (0.5 in) to 1.905 cm (0.75 in), or 2.54 cm (1 in), or 3.175 cm (1.25 in), or 3.81 cm (1.5 in), or 4.445 cm (1.75 in), or 5.08 cm (2 in). In another embodiment, the safety light 10, 210 has a height, H, from 2.54 cm (1 in), or 3.175 cm (1.25 in), or 3.81 cm (1.5 in), or 4.445 cm (1.75 in), or 5.08 cm (2 in) to 6.35 cm (2.5 in), or 7.62 cm (3 in), or 8.89 cm (3.5 in), or 10.16 cm (4 in), or 12.7 cm (5 in) to 13.97 cm (5.5 in), or 15.24 cm (6 in), 16.51 cm (6.5 in), or 17.78 cm (7 in), or 19.05 cm (7.5 in), or 20.32 cm (8 in), or 21.59 cm (8.5 in), or 22.86 cm (9 in), or 24.13 cm (9.5 in), or 25.4 cm (10 in), or 27.94 cm (11 in), or 30.48 cm (12 in).

In an embodiment, the safety light 10, 210 has a length, L, from 2.54 cm (1 inch (in)) to 91.44 cm (36 in); a width, W, from 0.635 cm (0.25 in) to 30.48 cm (12 in); and a height, H, from 0.635 cm (0.25 in) to 30.48 cm (12 in). In another embodiment, the safety light 10, 210 has a length, L, from 2.54 cm (1 inch (in)) to 10.16 cm (4 in); a width, W, from 0.635 cm (0.25 in) to 8.89 cm (3.5 in); and a height, H, from 0.635 cm (0.25 in) to 4.445 cm (1.75 in).

In an embodiment, the safety light 10, 210 has:

(i) a length, L, from 2.54 cm (1 in), or 3.81 cm (1.5 in) to 5.08 cm (2 in), or 6.35 cm (2.5 in), or 7.62 cm (3 in), or 8.89 cm (3.5 in), or 10.16 cm (4 in), or 11.43 cm (4.5 in), or 12.7 cm (5 in), or 13.97 cm (5.5 in), or 15.24 cm (6 in);

(ii) a width, W, from 0.635 cm (0.25 in), or 1.27 cm (0.5 in), or 1.905 cm (0.75 in) to 2.54 cm (1 in), or 3.81 cm (1.5 in), or 5.08 cm (2 in), or 7.62 cm (3 in), or 8.89 cm (3.5 in), or 10.16 cm (4 in); and (iii) a height, H, from 0.635 cm (0.25 in), or 1.27 cm (0.5 in) to 1.905 cm (0.75 in), or 2.54 cm (1 in), or 3.175 cm (1.25 in), or 3.81 cm (1.5 in), or 4.445 cm (1.75 in), or 5.08 cm (2 in).

The present disclosure is directed to a safety light 10, 210 containing a top housing 12, 212 with a wall 14, 214; a PCBA 24 coupled to the top housing 12, 212, the PCBA 24 having a top surface 26 and a bottom surface 28; a plurality of light elements 36 coupled to the bottom surface 28 of the PCBA 24; a lens 64, 264 coupled to the bottom surface 28 of the PCBA 24 and the plurality of light elements 36, the lens 64, 264 having a first angled reflective surface **66*a* and a plurality of side surfaces 68, 268; and a bottom housing 94, 294 coupled to the lens 64, 264. However, the skilled artisan understands an alternative embodiment includes a safety light with a bottom housing having a top surface and a bottom surface; a PCBA coupled to the bottom housing, the PCBA having a top surface and a bottom surface; a plurality of light elements coupled to the top surface of the PCBA; a lens coupled to the top surface of the PCBA and the plurality of light elements, the lens having a first angled reflective surface and a plurality of side surfaces 68**; and a top housing coupled to the lens. In this alternative embodiment, each light element coupled to the top surface of the PCBA emits a light directed away from, or in opposite direction from, the bottom housing and the light reflects off of the first angled reflective surface of the lens and projects through the plurality of side surfaces of the lens.

The safety light 10, 210 may comprise two or more embodiments disclosed herein.

It is specifically intended that the present disclosure not be limited to the embodiments and illustrations contained herein, but include modified forms of those embodiments, including portions of the embodiments and combinations of elements of different embodiments as come within the scope of the following claims.

The invention claimed is:

1. A light system, comprising:
a top housing;
a bottom housing;
a side surface extending between the top housing and the bottom housing;
an angled reflective surface arranged between the top housing and the bottom housing; and
a lighting element arranged between the top housing and the angled reflective surface, the lighting element configured to direct light toward the bottom housing to reflect off of the angled reflective surface and out of the side surface.

2. The light system of claim 1 further comprising a lens arranged between the top housing and the bottom housing, and defining the side surface.

3. The light system of claim 2, wherein the side surface is one of a plurality of side surfaces defined by the lens, the plurality of side surfaces forming a perimeter of the lens.

4. The light system of claim 2, wherein the angled reflective surface is integrally formed with the lens.

5. The light system of claim 2 further comprising a gasket between the lens and the bottom housing to form a seal therebetween.

6. The light system of claim 1, wherein the lighting element is secured to a printed circuit board assembly that is configured to couple to the top housing.

7. The light system of claim 6, wherein the printed circuit board assembly includes an opening configured to receive a threaded connector of the top housing.

8. The light system of claim 7 further comprising a fastener configured to extend through a bottom opening formed in the bottom housing and through the opening in the printed circuit board assembly to couple with the threaded connector of the top housing.

9. The light system of claim 6, wherein the printed circuit board assembly includes a control button configured to activate the lighting element, and wherein the top housing defines an opening configured to receive the control button.

10. The light system of claim 9, wherein the control button includes a button pad configured to be received by the opening in the top housing.

11. The light system of claim 10, wherein the button pad is a gasket configured to form a seal with the top housing.

12. The light system of claim 1, wherein the bottom housing includes one or more attachments configured to couple to a support structure.

13. A light system, comprising:

a top housing;

a bottom housing;

a lens arranged between the top housing and the bottom housing, the lens defining a perimeter that includes a plurality of side surfaces extending between the top housing and the bottom housing;

a reflective surface arranged between the top housing and the bottom housing; and a lighting element arranged between the top housing and the reflective surface, the lighting element configured to direct light toward the bottom housing to reflect off of the reflective surface and out of at least one of the plurality of side surfaces.

14. The light system of claim 13, wherein the reflective surface is a planar reflective surface that is angled between 110 degrees and 150 degrees relative to a bottom surface of the lens.

15. The light system of claim 13, wherein the reflective surface is one of a plurality of reflective surfaces, each of the plurality of reflective surfaces being aligned with a corresponding one of the plurality of side surfaces.

16. The light system of claim 13 further comprising a rechargeable power source, wherein the bottom housing defines a recharging port opening configured to receive a recharging port for recharging the rechargeable power source.

17. A light system, comprising:

a top housing including a connector;

a bottom housing opposite the top housing;

a lens arranged between the top housing and the bottom housing, the lens defining a side surface between the top housing and the bottom housing;

a printed circuit board assembly arranged between the top housing and the lens, the printed circuit board assembly including a first opening configured to receive the connector; and a lighting element coupled to the printed circuit board assembly and configured to direct light out of the side surface.

18. The light system of claim 17, wherein the connector is configured to receive a fastener to secure the lens between the top housing and the bottom housing, the fastener extending though a second opening formed in the bottom housing to engage with the connector.

19. The light system of claim 17 further including a magnet coupled to the bottom housing.

20. The light system of claim 17 further comprising a reflective surface arranged between the top housing and the bottom housing, wherein the lighting element is arranged to direct light to reflect off of the reflective surface and out of the side surface.

* * * * *